(12) United States Patent
Uetabira

(10) Patent No.: US 9,523,191 B2
(45) Date of Patent: Dec. 20, 2016

(54) MOBILE TERMINAL BOOTH

(71) Applicant: INTERMAN Corporation, Kagoshima (JP)

(72) Inventor: Shigeki Uetabira, Kagoshima (JP)

(73) Assignee: INTERMAN Corporation, Kagoshima (JP)

( * ) Notice: Subject to any disclaimer, the term of this patent is extended or adjusted under 35 U.S.C. 154(b) by 0 days.

(21) Appl. No.: 14/906,167

(22) PCT Filed: Jul. 24, 2014

(86) PCT No.: PCT/JP2014/069631
§ 371 (c)(1),
(2) Date: Jan. 19, 2016

(87) PCT Pub. No.: WO2015/012379
PCT Pub. Date: Jan. 29, 2015

(65) Prior Publication Data
US 2016/0160498 A1  Jun. 9, 2016

(30) Foreign Application Priority Data

Jul. 25, 2013  (JP) .................................. 2013-154211

(51) Int. Cl.
*E04B 1/86* (2006.01)
*E04B 1/82* (2006.01)
(Continued)

(52) U.S. Cl.
CPC ............. *E04B 1/8218* (2013.01); *B32B 19/00* (2013.01); *E04B 1/86* (2013.01); *E04B 1/99* (2013.01); *E04H 1/125* (2013.01); *E04H 1/14* (2013.01); *G10K 11/16* (2013.01); *G10K 11/168* (2013.01); *E04B 1/6137* (2013.01); *E04B 2001/8461* (2013.01)

(58) Field of Classification Search
CPC ................................ G10K 11/004; E04B 1/86
(Continued)

(56) References Cited

U.S. PATENT DOCUMENTS 329,909  A  *  11/1885  Johnson .................... E04B 1/86
                                                              181/198
1,948,755  A  *  2/1934  Gullicksen ................ E04H 1/14
                                                              181/198
(Continued)

FOREIGN PATENT DOCUMENTS

FR             2127182 A5     10/1972
JP          2008-38342 A       2/2008
(Continued)

OTHER PUBLICATIONS

International Search Report dated Oct. 7, 2014 from corresponding Int'l Application No. PCT/JP2014/069631; 2 pgs.

*Primary Examiner* — Forrest M Phillips
(74) *Attorney, Agent, or Firm* — Maier & Maier, PLLC

(57) ABSTRACT

A mobile terminal booth which provides an area where a mobile terminal can be used in a public place. This mobile terminal booth is provided with a sound absorbing unit which is placed in a public place and partially partitions a space as viewed from the above where a user of a mobile terminal can have a telephone conversation. The sound absorbing unit is made of a laminate consisting of a plurality of sound absorbing layers. The sound absorbing layers are joined together in the form of the laminate with a viscous adhesive which does not solidify after formation of said laminate, and maintains its viscosity when the mobile terminal booth is used.

18 Claims, 41 Drawing Sheets

(51) Int. Cl.
*B32B 19/00* (2006.01)
*E04H 1/14* (2006.01)
*E04H 1/12* (2006.01)
*G10K 11/168* (2006.01)
*G10K 11/16* (2006.01)
*E04B 1/99* (2006.01)
*E04B 1/61* (2006.01)
*E04B 1/84* (2006.01)

(58) Field of Classification Search
USPC .......................................................... 181/198
See application file for complete search history.

(56) References Cited

U.S. PATENT DOCUMENTS

| | | | |
|---|---|---|---|
| 2,397,609 A | 4/1946 | Leadbetter | |
| 3,694,974 A * | 10/1972 | Eckel | E04B 1/8218 181/198 |
| 4,961,294 A * | 10/1990 | Cameron | E04H 1/14 52/27 |
| 5,182,883 A * | 2/1993 | Amberson | E04H 1/14 52/27 |
| 7,883,763 B2 * | 2/2011 | Tinianov | B32B 27/14 156/291 |
| 8,495,851 B2 * | 7/2013 | Surace | B32B 7/12 428/464 |
| 8,678,133 B2 * | 3/2014 | Clausi | B32B 25/14 156/60 |
| 8,978,314 B2 * | 3/2015 | Uetabira | E04H 1/14 52/145 |

FOREIGN PATENT DOCUMENTS

| | | |
|---|---|---|
| JP | 2008-255722 A | 10/2008 |
| JP | 3171016 U | 10/2011 |
| WO | 2012/137353 A1 | 10/2012 |

* cited by examiner

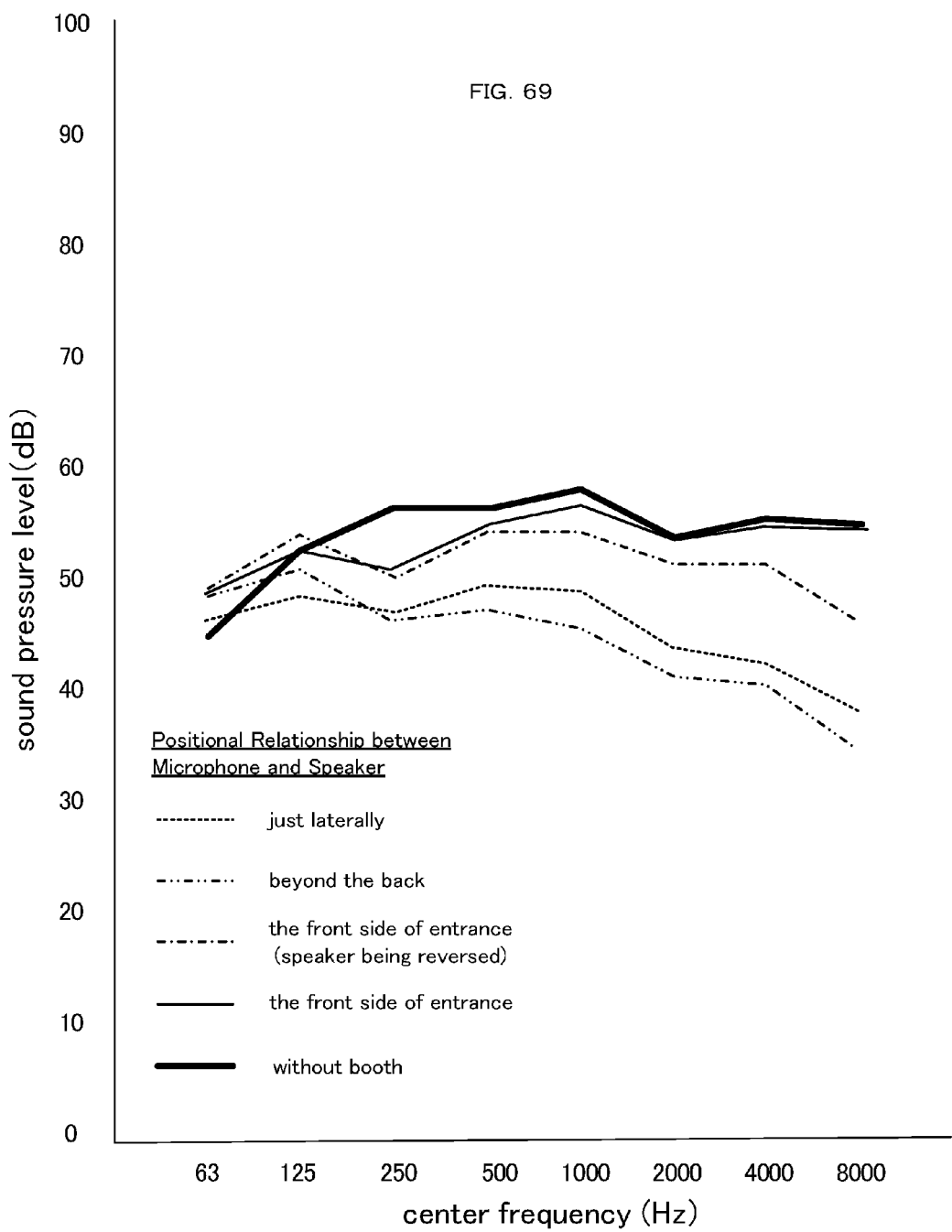

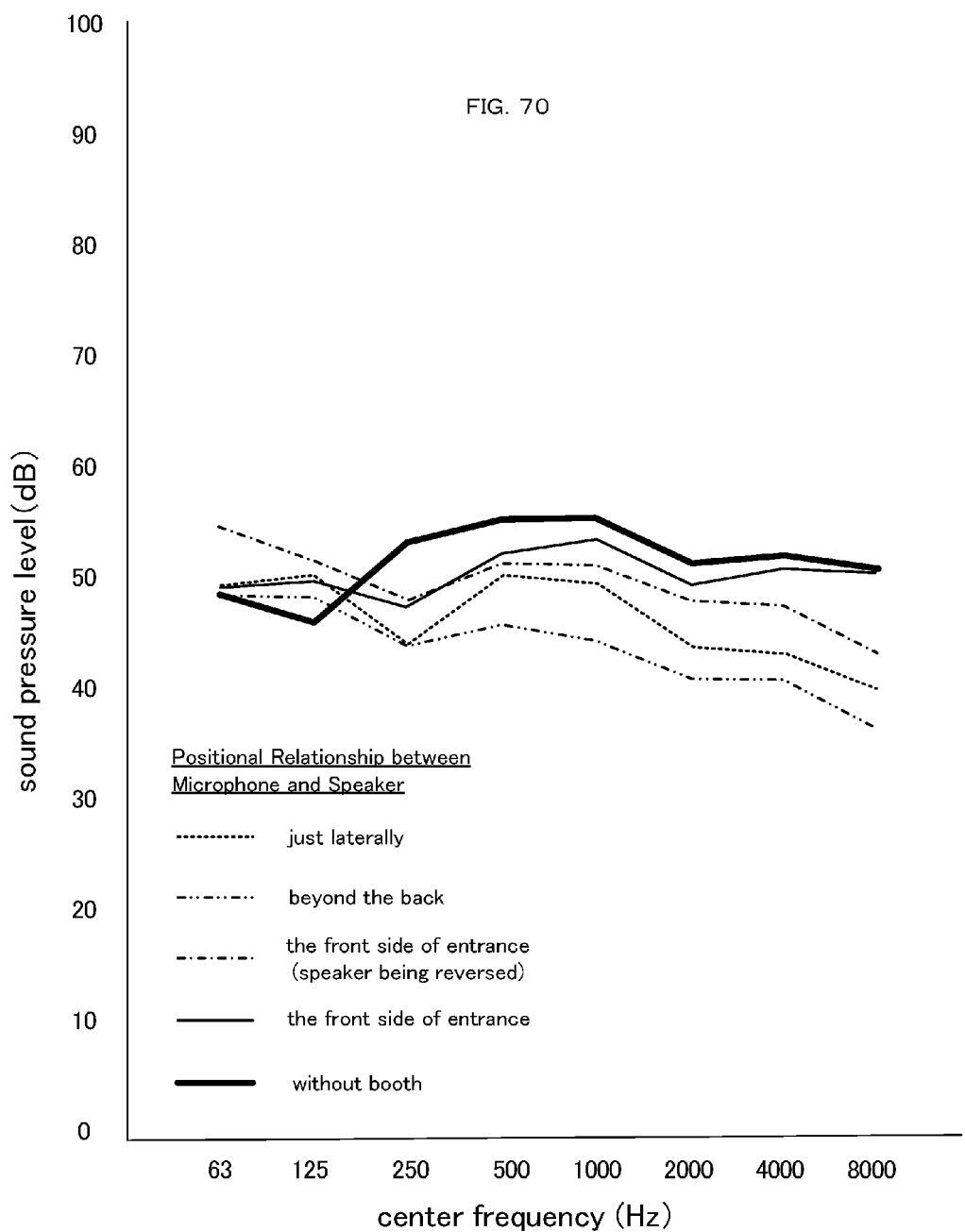

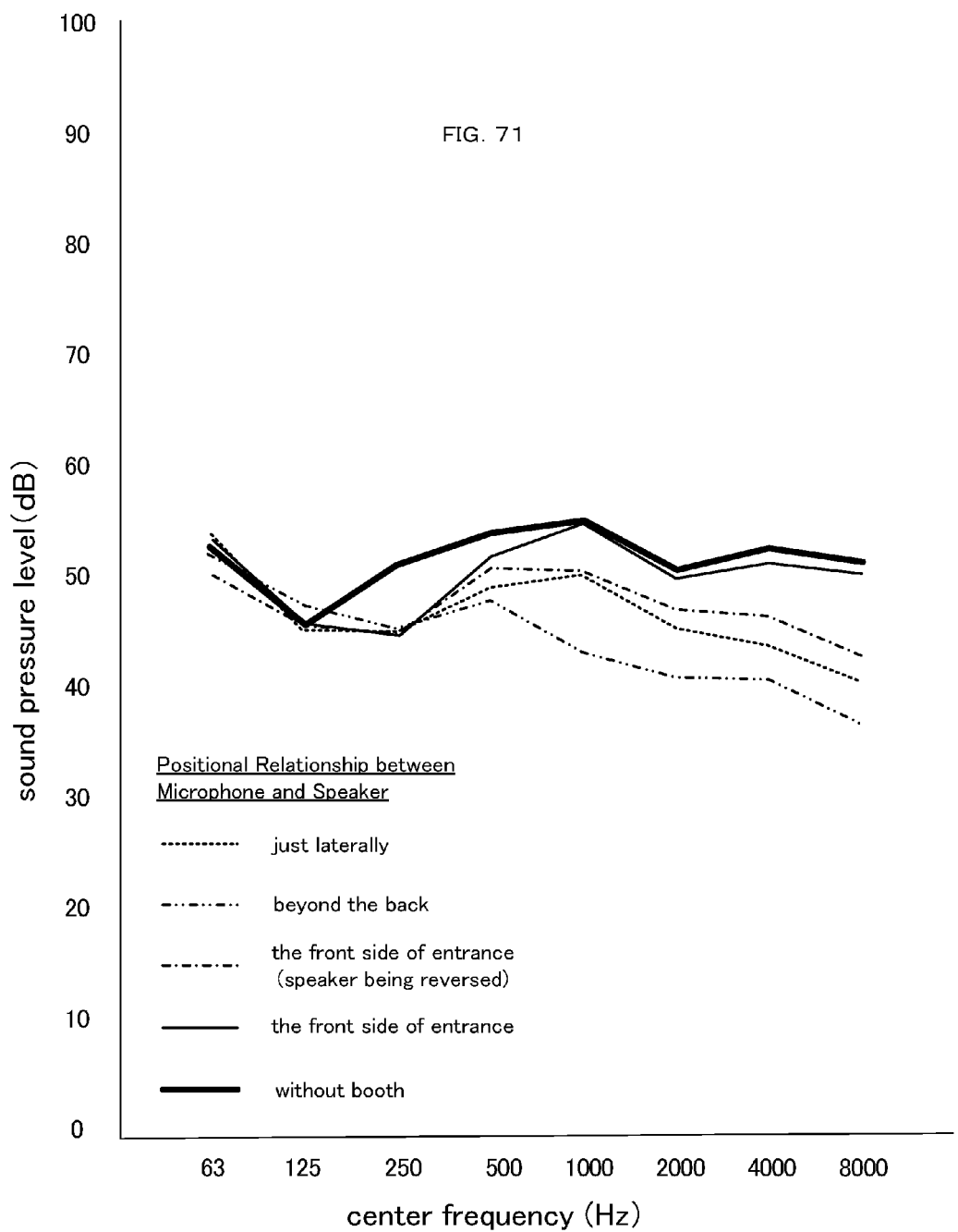

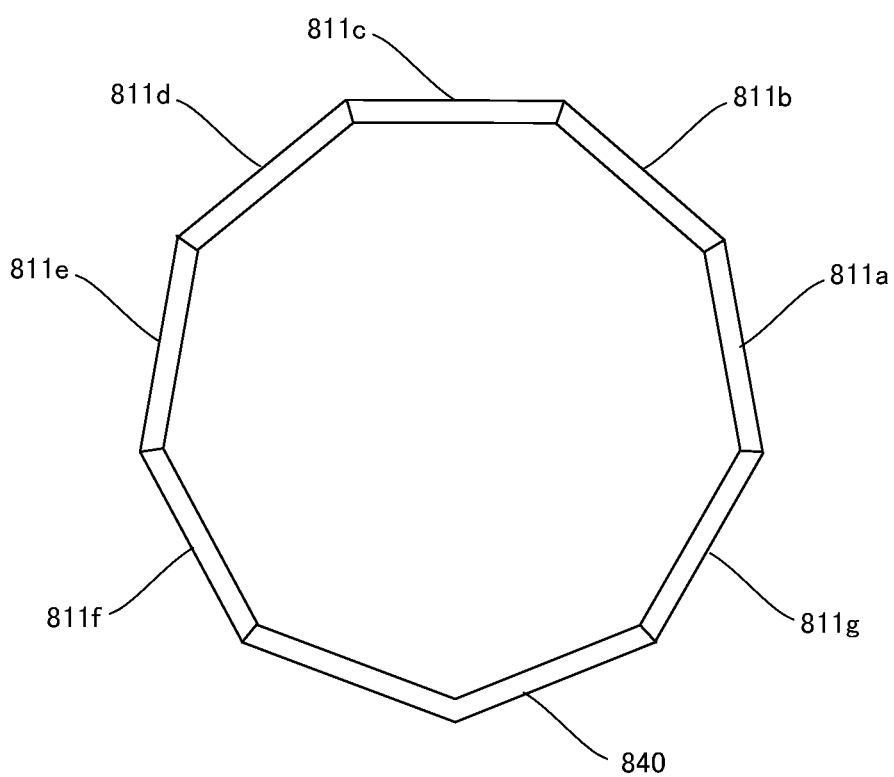

MOBILE TERMINAL BOOTH

FIELD OF THE INVENTION

The present invention relates to a mobile terminal booth, and assembling method and assembly kit of the same for providing an area where a mobile terminal can be comfortably used in a public area or the like.

BACKGROUND ART

Currently, the penetration rate of cellular phones and smartphones has exceeded 100 percent of the Japanese population, and almost all the Japanese have communication devices at all times. Such mobile terminals are convenient to make it possible to collect and transmit information or have telephone conversations, for example, by using spare time effectively on the move. In fact, a significant proportion of people in a park, a building, a street or the like public area are using mobile terminals for some purposes.

PRIOR ART LITERATURE

Patent Document

[Non-Patent Document 1] Internet

SUMMARY OF INVENTION

Problems to be Solved by the Invention

However, when a person has a telephone conversation on the move with a mobile terminal, it is common that the person talks beside other passengers, unlike having a telephone conversation with a public phone in a telephone booth. Accordingly, it is often difficult to hear the other person's voice in loud places, e.g., in a crowded street.

Even in a station yard or in a building, noise tends to be reverberating in the enclosed space so that it is sometimes difficult to talk in a relaxed way. Usually, when having a telephone conversation, a person moves close to a wall or the like where noise seems to be somewhat smaller. The noise level near a wall, however, is never small because of reverberating sound reflected from the wall. The reverberating sound often makes it difficult also for the person at the other end to hear the voice. On the other hand, however, it is not a good idea to have a conversation in the middle of a walkway.

Also, since the conversation may be heard by others nearby, there is some reluctance to talk a personal fact. Furthermore, it is not well-mannered and often an annoyance to other passengers to use a mobile terminal or have telephone conversation while walking.

There are commercially available booths for cellular phones similar to conventional public phone rooms (Non-Patent Document 1). Such conventional phone booths are cuboid boxes forming a confined space provided with a door. The sides of such a box are formed of walls using a glass from the viewpoint of security and giving the space an open feeling. The inside space is completely confined because it is believed that a noiseless space is created only by shutting out the space from the outside.

However, this consideration is not true at least in the case where a comfortable space is wanted for the purpose of using a mobile terminal. The confined structure forms a reverberation space in which noise is reverberating. The sound entering through the glass plates is not so large, but tends to make an inside person feel loud the reverberation. Particularly, the voice and other sound output from this inside person also become such reverberating noise. Also, a substantial space has to be prepared in order to install such a box provided with a door. In addition, the production cost is relatively high. Furthermore, it seems somewhat heavy to lightly install and use the box.

It is therefore an object of the present invention to provide a small-sized mobile terminal booth in which a mobile terminal can be used with comfort and no hesitation and an open feeling is given.

Measures to Solve the Problems

In order to accomplish the object as described above, a mobile terminal booth of the present invention comprises: a sound absorbing unit which partially partitions a public space as viewed from the above to provide a space a user of a mobile terminal can have a telephone conversation, wherein said sound absorbing unit is made of a laminate consisting of a plurality of sound absorbing layers.

Furthermore, in a preferred embodiment, said sound absorbing layers are joined together in the form of said laminate with an adhesive.

Still further, in a preferred embodiment, said adhesive is a viscous adhesive which does not solidify after formation of said laminate, maintains its viscosity when the mobile terminal booth is used.

Still further, in a preferred embodiment, said laminate is formed with a resin sheet interposed between each adjacent ones of said sound absorbing layers.

Still further, in a preferred embodiment, said resin sheet is a vinyl film having a thickness of 0.1 mm to 0.5 mm.

Still further, in a preferred embodiment, said resin sheet is provided with a plurality of openings, wherein said sound absorbing layers are directly adhered with each other by said adhesive through said openings, and indirectly adhered with each other by said adhesive through said resin sheet other than said openings.

Still further, in a preferred embodiment, said sound absorbing unit is provided with an entrance at a corner which is always opened without providing a door.

Still further, in a preferred embodiment, said sound absorbing layers are made from at least one of a needle felt, bestray, softray, glass wool, thermo wool, phenol resin, and polyurethane.

Still further, in a preferred embodiment, there is further provided a plurality of support posts which support said sound absorbing unit at a predetermined height.

Still further, in a preferred embodiment, said sound absorbing unit consists of a plurality of sound absorbing panels which are joined to confine said partitioned space.

Still further, in a preferred embodiment, said sound absorbing panel includes a sound absorbing member and a support panel on which said sound absorbing member is mounted, and the outer side of said support panel is at least partially opened.

Still further, in a preferred embodiment, the outer side of said support panel is provided with a sound blocking surface.

Still further, in a preferred embodiment, said support panel is an aluminum panel.

Still further, in a preferred embodiment, there is further provided a roof member which covers the top of said mobile terminal booth and encloses the inside space of said mobile terminal booth from the above.

Still further, in a preferred embodiment, said sound absorbing unit is in the form of an arc in a plan view.

Still further, in a preferred embodiment, said sound absorbing unit is in the form of a polygon in a plan view.

Still further, in a preferred embodiment, said polygon is a rectangle, a square or a pentagon and has at least part of one side thereof which is opened.

Effects of the Invention

In accordance with the mobile terminal booth of the present invention, the sound absorbing unit partially confines and provide a private space where a mobile terminal can be used in a comfortable manner. The mobile terminal booth consists mainly of a sound absorbing unit confining a private space with an entrance opening, so that users do not feel suffocated in a narrow space with unpleasant reverberating sound and can use a mobile terminal with comfort and less stress. Furthermore, the voice does not leak in the backward direction beyond the sound absorbing unit, and is absorbed in the mobile terminal booth without being reflected in the forward direction. Accordingly, the user need hardly worry about others who may hear conversation, and cause a nuisance to others nearby even if speaking loudly. On the other hand, the person at the other end of conversation can hear the voice clearly without reflection noise. Furthermore, since noise is reduced, voice can be reached to the other end of the line even if speaking in a small voice.

BRIEF DESCRIPTION OF DRAWINGS

FIG. 69 is a view for showing the result of the evaluation experiment shown in FIG. 65.

FIG. 70 is a view for showing the result of the evaluation experiment shown in FIG. 65.

FIG. 71 is a view for showing the result of the evaluation experiment shown in FIG. 65.

FIG. 72 is a view for showing a mobile terminal booth in accordance with the present invention having a polygonal columnar sound absorbing unit.

MODE FOR CARRYING OUT THE INVENTION

In what follows, a mobile terminal booth in accordance with several embodiments of the present invention will be explained with reference to the accompanying drawings.

This mobile terminal booth can be installed in station yards, lobbies of buildings, streets or the like. When making a call, a user of a cellular phone can get away from reverberating sound by entering this mobile terminal booth to have telephone conversation. It is also possible to have conversation while preventing content of the conversation from being heard by others nearby. Furthermore, the user can use a cellular phone without worrying about other people who might be looking at the user.

Embodiment 1

Figure 1:
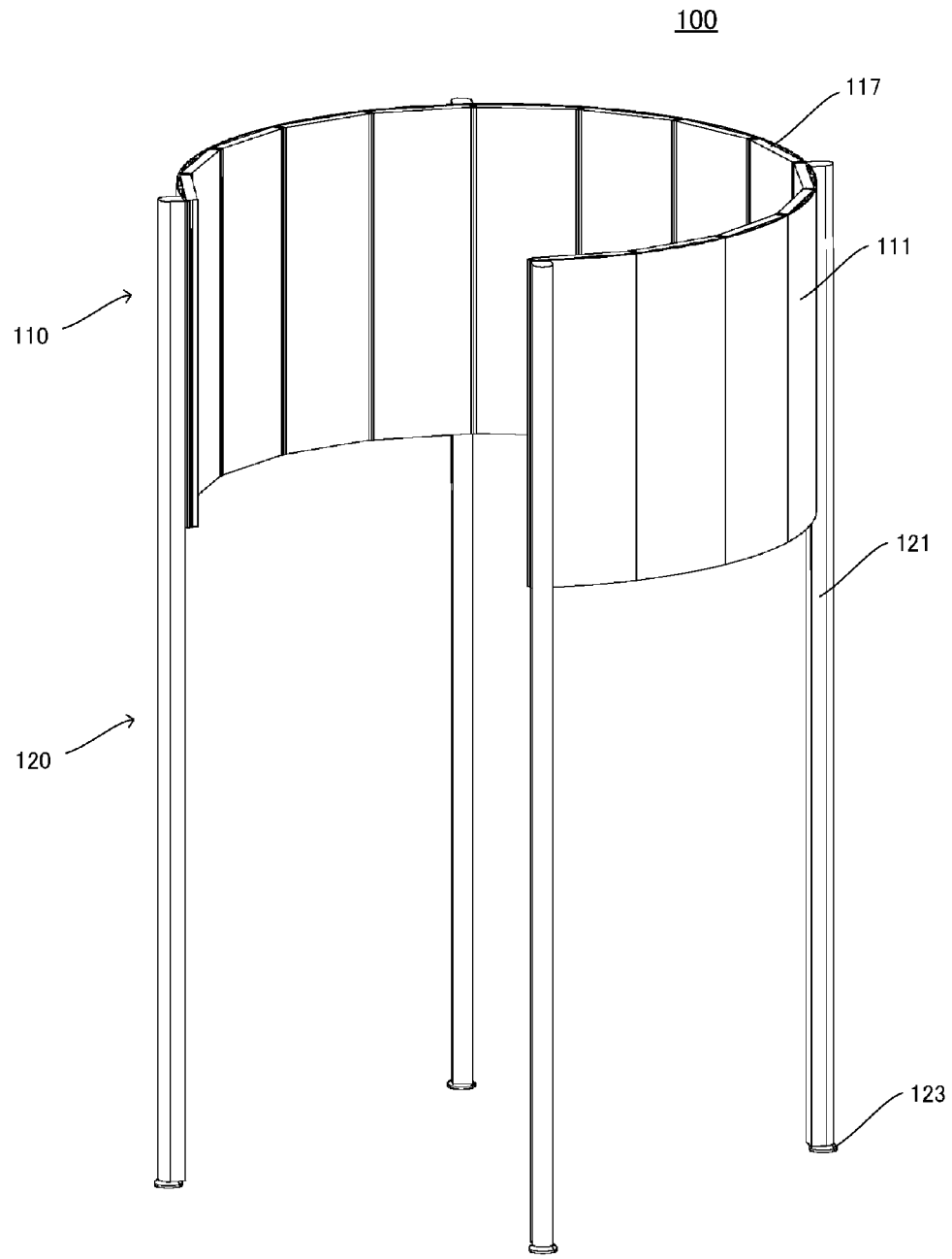
FIG. 1 is a perspective view for showing a mobile terminal booth in accordance with an embodiment 1 of the present invention.

FIG. 1 is a perspective view for showing a mobile terminal booth in accordance with a first embodiment of the present invention. This mobile terminal booth 100 includes a sound absorbing unit 110 in the form of a cylinder having a front opening, and a support frame 120 for supporting the sound absorbing unit 110. Each of them can be carried as several constituent parts and assembled in an installation site.

The sound absorbing unit 110 can be assembled by connecting a number of plate-like sound absorbing panels 111 in the form of an arch. Each sound absorbing panel is, for example, 20 cm wide, 60 cm high and 3 cm thick. Also, the support frame 120 includes four pipes (support posts) to be vertically connected to the sound absorbing unit 110, and adjuster foots 123 attached to the bottom surfaces of the pipes 121.

If the length of the pipes 121 is 180 cm, the lower end of the sound absorbing unit 110 is located 120 cm from the floor. The sound absorbing unit 110 is effective when it is slightly taller than the position of the ears of the user. Generally speaking, the upper end of the plate-like sound absorbing panel 111 is located 10 to 15 cm higher than the average height of the country where the mobile terminal booth 100 is installed.

Figure 2:
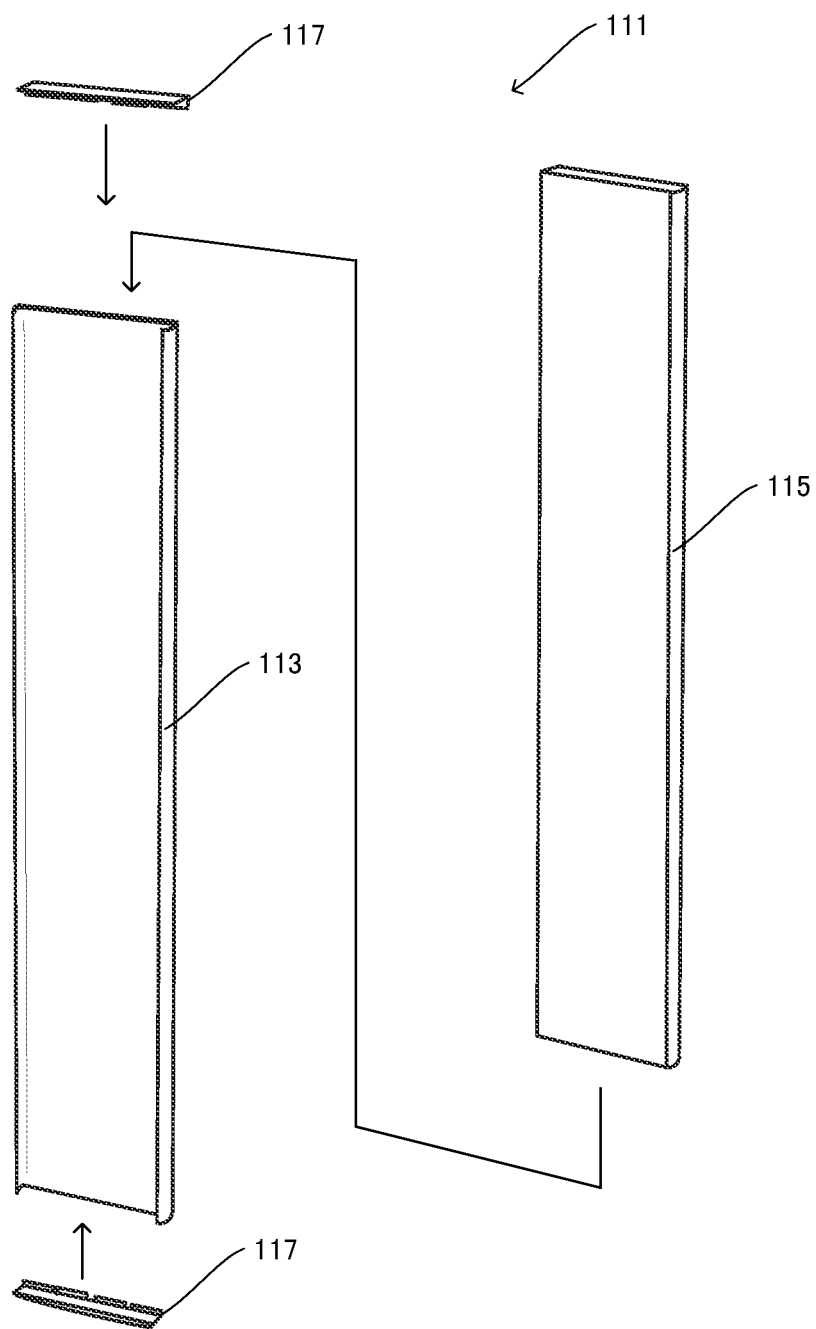
FIG. 2 is an exploded perspective view for showing the structure of the plate-like sound absorbing panel in accordance with the embodiment 1 of the present invention.

As illustrated in FIG. 2, the plate-like sound absorbing panel 111 is assembled by mounting a sound absorbing member 115 on an aluminum panel (support panel) 113. This sound absorbing member 115 is "Room Creator" which House 119 co. Ltd. has sold. After mounting the sound absorbing member 115 on the aluminum panel 113, panel caps 117 are fitted onto the top and bottom ends of the aluminum panel 113. Also, as illustrated in the figure, the plate-like sound absorbing panels 111 are connected to each other in the form of a cylinder having an opening in the front side. In this case, the angle subtended by the opening and as seen from the center of the cylinder is 90 to 120 degrees, i.e., ¼ to ⅓ of the circumference. This angle range is important for this purpose.

With respect to the term "sound insulation", in general, two capabilities has to be taken into consideration. One of them is the absorption capability of absorbing sound waves incident on the panel by converting the incident sound waves to thermal energy. The other is the reflection capability of blocking sound waves incident on the panel by reflecting the incident sound waves and preventing them from entering inside.

Both are effective to prevent sound from leaking one side to the other side. What's required of a sound insulating wall is to prevent sound from leaking. However, when enjoying music and so forth, sound reverberates with the sound insulating wall so that the space becomes not comfortable, and the bandwidth of reproduced sound is narrowed.

When a person is about to use a cellular phone, he often moves to a position near a wall or a corner which seems relatively noiseless. However, such a position is not a better position in terms of a sound environment because sound reverberation occurs in the position. Accordingly, from the viewpoint of the purpose, the absorption capabilities are particularly important.

Figure 3:
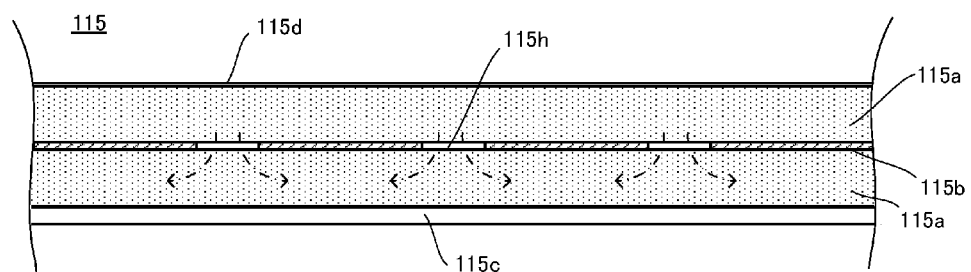
FIG. 3 is a cross sectional view for showing the sound absorbing structure of a sound absorbing member used in the mobile terminal booth of the embodiment 1.

"Room Creator" (sound absorbing member 115) is an excellent sound controlling material and has a sound absorbing structure as illustrated in FIG. 3. The sound absorbing structure includes a pair of sound absorbing sheets 115a bonded as a laminate together with an intervening thin vinyl film 115b (resin sheet) therebetween. The vinyl film 115b functions as a sound scattering. The sound absorbing sheet 115a is made of a needle felt which functions as a sound absorbing material. Other sound absorbing material includes glass wool, thermo wool, bestray, softray, phenol resin, and polyurethane. The thickness of the sound absorbing sheet 115a is for example 1 to 2 cm, and the thickness of the vinyl film 115b is for example 0.1 mm through 0.5 mm. Furthermore, the back side of the sound absorbing member 115 is covered by a soft polyvinyl chloride plate 115c. Also, the other inner side is covered by a cloth 115d. The total thickness of the sound absorbing member 115 is thereby about 2 to 4 cm.

Figure 4:
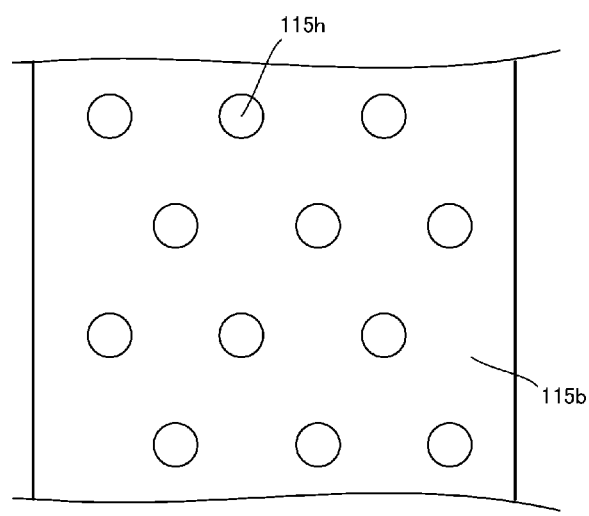
FIG. 4 is a plan view for showing openings opened through a vinyl film which is inserted between the sound absorbing member shown in FIG. 3.

As illustrated in FIG. 4, the vinyl film 115b is provided with a number of openings 115h. For example, the diameter of each opening 115h is 2 cm, and adjacent ones thereof are located 7 cm distant from each other. With the openings 115h, the incident sound waves can be effectively scattered in the lateral direction to enhance the sound absorbing capabilities of the sound absorbing sheet 115a. In addition, the openings 115h allow part of the incident sound waves to pass through the vinyl film 115b to control the balance between reflection and transmission, such that they functions as a sound controlling means.

The vinyl film 115b and the sound absorbing sheets 115a are joined with a viscous adhesive. The viscous adhesive is applied also between the sound absorbing sheets 115a through the openings 115h. While maintaining a certain viscosity, this viscous adhesive intervenes between the vinyl film 115b and the sound absorbing sheet 115a with a certain viscosity being maintained. Also, while maintaining a certain viscosity, this viscous adhesive intervenes between the sound absorbing sheets 115a through the openings 115h. In other words, it is important that, even when the sound absorbing member 115 is used, the viscous adhesive shall not entirely be solidified but can maintain its slimy state.

This sound absorbing structure is described in International Patent Application No. PCT/JP2011/58944, and capable of absorbing incident sound waves in a wide range from very low frequencies to very high frequencies. Particularly, for this purpose, it is important that the sound absorbing structure can substantially dump sound pressure levels at 500 Hz or higher frequencies which phone users feels noisy. On the other hand, it is considered difficult to maintain sound absorbing capabilities at low frequencies. Even if only high frequency components are dumped, it is an unnatural sound environment so that when entering the booth, the user feels somewhat incommodity. Contrary to this, if sound components are uniformly dumped, the user feels a natural sound environment and, even though confined, receive the impression that the space is expanded.

The sound absorbing member 115 may be formed by the use of the sound absorbing structure as described in International Patent Published Application (WO2006/134654). This sound absorbing structure is characterized in that the incident sound waves are passed through a passage constructed by a wall whose cross section is gradually decreased from the sound entry side. That is, the opening area of the passage perpendicular to the direction of the incident sound waves is gradually decreased from the sound entry side to form a narrowing passage. This structure is useful in that it can absorb wide band sound waves.

Figure 5:
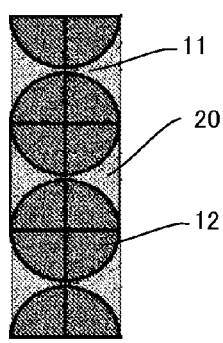
FIG. 5 is a view for showing the sound absorbing structure as described in International Patent Published Application (WO2006/134654).

FIG. 5 is a view for showing the sound absorbing structure as described in International Patent Published Application (WO2006/134654). As illustrated in this sectional view, a number of cylindrical sound absorbing members 12 are arranged with a sound absorbing material 20 to fill the space. In this case of the sound absorbing member 115, each cylindrical sound absorbing member 12 is a cylinder made of an acrylate resin. The cylindrical sound absorbing members 12 are slightly distant from each other to form a narrowing passage 11 (gap). The longitudinal direction of the sound absorbing members 12 is aligned with in the longitudinal direction of the plate-like sound absorbing panel 111, which is then covered with a fabric to make up the sound absorbing member 115.

The reverberating sound can be dumped in the mobile terminal booth by the use of the sound absorbing member 115 as described above to make it possible to have telephone conversation in a quiet environment.

Figure 6:
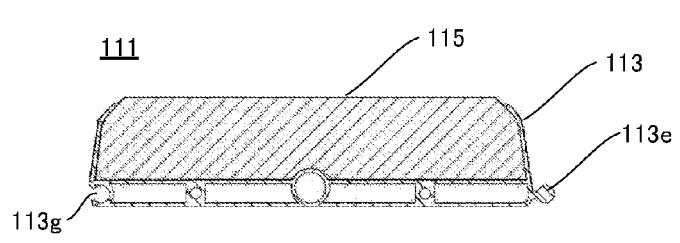
FIG. 6 is a cross sectional view for showing the structure of the plate-like sound absorbing panel used in the mobile terminal booth of the embodiment 1.
Figure 7:
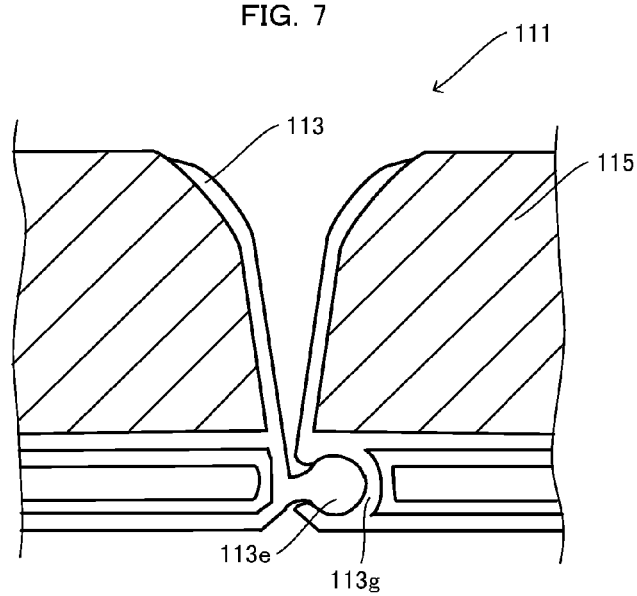
FIG. 7 is a partial cross-sectional view for showing the structure of the plate-like sound absorbing panel used in the mobile terminal booth of the embodiment 1.

As illustrated in the cross sectional view of FIG. 6 and the expanded cross sectional view of FIG. 7, the plate-like sound absorbing panel 111 is provided with a cylindrical lobe 113e projected from one side of the aluminum panel 113, and a lobe receptor 113g formed in the other side of the aluminum panel 113 and capable of pivotally engaging with the lobe receptor 113g. Each adjacent ones of the plate-like sound absorbing panel 111 are linked by inserting and sliding the cylindrical lobe 113e into the corresponding lobe receptor 113g in the longitudinal direction. The pipes 121 are connected to the plate-like sound absorbing panel 111 by screw clamp on the side surface of the plate-like sound absorbing panel 111.

The sound absorbing panels are joined in the form of an arc so that the incident sound waves from the rear and lateral sides can be dumped. On the other hand, the sound waves incident from the front side, i.e., through the opening of the arc cannot be directly dumped. However, when a person feels suffocated in a narrow space, it results from reverberating sound in many cases. For example, many people do unexpectedly not feel noisy in an outdoor open place even when a multitude of people are gathered.

This sound absorbing structure is characterized in that incident sound waves are scattered in lateral directions to dump reverberating sound so that the space is felt as if it extending outwards through the panel. Accordingly, in the case of this mobile terminal booth having the sound absorbing structure (as described in PCT/JP2011/58944 or WO2006/134654), a comfortable space can be provided without making shrill noise which would be reverberating inside if the booth were designed to form a completely closed structure.

The applicant has made two prototypes of this mobile terminal booth, and verified the sound absorbing capabilities thereof by experiments. The prototypes were placed in a room having an area of 132 square meters and a height of 2.7 meters. The tools for the experiments were Pro tools LE7 (hereinafter referred to as PT) as a recorder and a signal generator, AKG C451 as a microphone, Digidesign 002 as a microphone amplifier and SONY SMS-1P as a powered speaker.

First, the microphone was placed in the center position of the prototypes (i.e., the center of the cylinder formed of the plate-like sound absorbing panels), and the speaker was placed 3 meters distant from the opening of the panel. Pink noise generated by PT was reproduced from the speaker, and the reproduced sound was recorded through the microphone for 30 seconds. The recording format was 24 bits and 48 kHz. The sound data recorded by PT was stored as data of 16 bits and 44.1 kHz, and frequency analyzed (FFT) was performed by "Wave Spectra" (Windows (registered trademark) software).

The experiments were conducted with two prototypes of mobile terminal booths. One of the prototypes has been made of twenty four plate-like sound absorbing panels having a width of 10 cm. The other prototype has been made of eight plate-like sound absorbing panels having a width of 30 cm. The height of each type of panel was 60 cm. The same experiments were conducted with a booth made from concrete panels in place of the above mobile terminal booth.

As experimental results, there were little substantial differences between 10 cm and 30 cm widths of the plate-like sound absorbing panels. However, when the gaps between the plate-like sound absorbing panels increased, there were observed small differences at 1 kHz or higher frequencies which might be influenced by reflection at the gaps.

In the case of the comparative example using the concrete panels, the sound pressure levels were higher than those of the prototypes using the plate-like sound absorbing panels throughout all the frequency range as measured. Particularly, the differential sound pressure levels between the comparative example and the prototypes were up to a maximum of 20 dB in the audible frequency range. These differences were clearly felt by ears. As a result, it was found that the plate-like sound absorbing panel is significantly effective for inhibiting reverberating sound.

Furthermore, comparative experiments were conducted with the plate-like sound absorbing panels having a width of 30 cm and simply arranged in a flat plane to form an absorbing wall, and the same plate-like sound absorbing panels arranged in a cylinder having an opening to form a 270° arc. As a result, there were significant differences mainly around 300 Hz and 550 Hz, and 2 kHz through 4 kH. The frequency components around 300 Hz and 550 Hz correspond to muffled sounds so that, in the case of telephone conversations with cellular phones, it is greatly influenced by these frequency components whether or not voices can be heard clearly. Accordingly, by arranging the panels in a circle, it is understood that voices can be heard easily. This is true also for the person at the other end.

Furthermore, in either experiment, the sound pressure levels at 10 kHz or higher frequencies were higher than those at lower frequencies by about 20 dB. This seems because of sound reflection on the surface of the plate-like sound absorbing panel or sound reflection at the gap between adjacent panels. Incidentally, while the height of each type of panel was 60 cm, the reduction of the sound pressure levels can be further increased by making use of higher panels as well as reflection from the opening.

Meanwhile, the aforementioned structure is effective to dump sound waves other than those reflected inside the mobile terminal booth. For example, the rear (outside) surface of the sound absorbing unit is made of the aluminum panel 113 which reflects and blocks sound waves incident from outside. The aluminum panel 113 therefore improves the sound reduction effect of the mobile terminal booth against the sound waves entering through the mobile terminal booth. A convenient sound field can thereby be provided in which cellular phone users can have telephone conversations with comfort and less stress. Needless to say, the aluminum panel can be replaced with another sound blocking panel such as that made of a metal or alloy, e.g., steel, duralumin, titanium, or a non-metallic material, e.g., reinforced plastic material, wood or the like.

Embodiment 2

Figure 8:
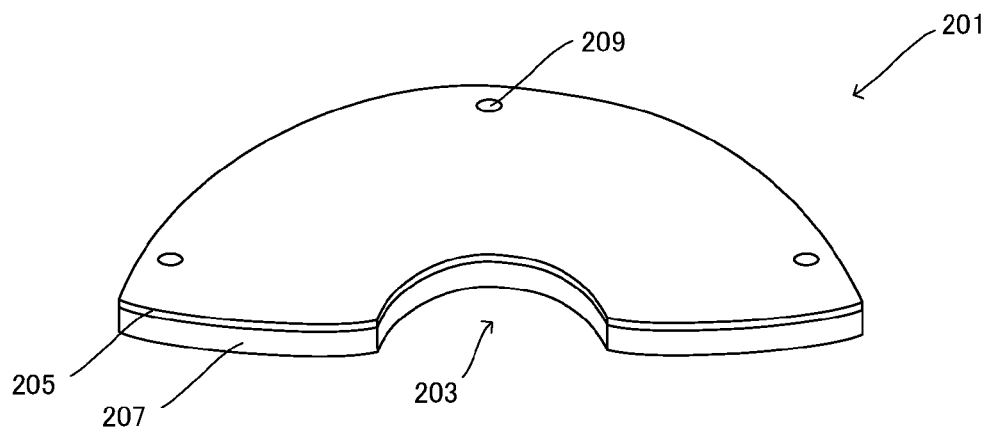
FIG. 8 is a plan view for showing a roof member which is used for the mobile terminal booth of an embodiment 2 of the present invention.
Figure 9:
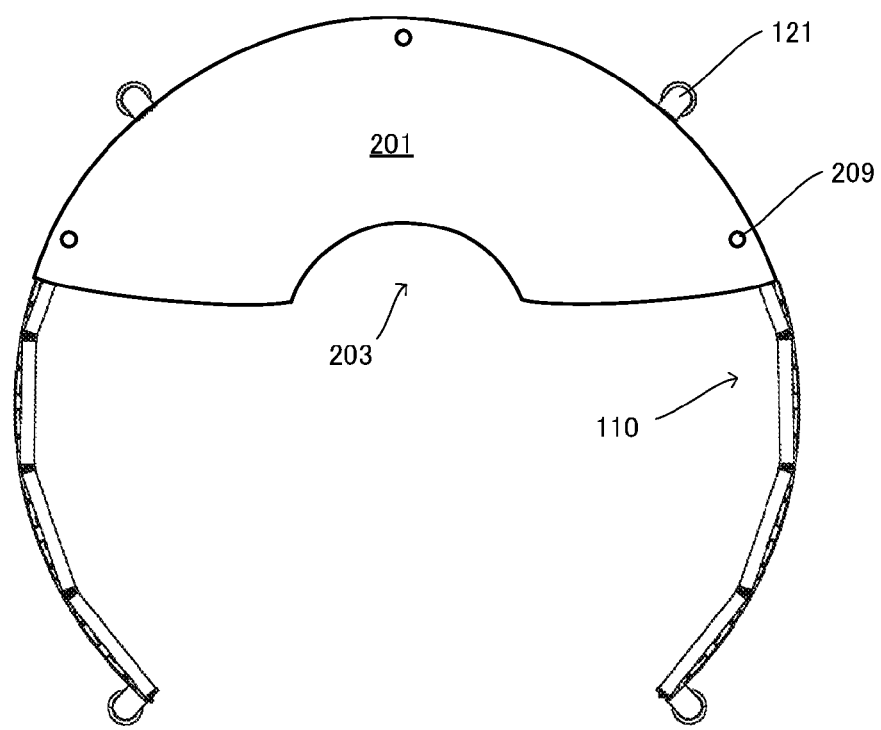
FIG. 9 is a plan view for showing the mobile terminal booth of the embodiment 2 of the present invention.

This embodiment 2 includes a roof member further provided on the mobile terminal booth of the embodiment 1. As illustrated in FIG. 8, this roof member 201 is formed in the shape of a semicircle disk having a semicircular cut-out portion 203. The roof member 201 has a total area covering 30% to 40% of the upper opening of the cylindrical mobile terminal booth. FIG. 9 is a plan view as seen from the above for showing the mobile terminal booth 100 of the embodiment 1 on which the roof member 201 is attached.

The roof member 201 is simply mounted on the mobile terminal booth so that its strength need not be so high. Accordingly, the roof member 201 consists of a sound absorbing member 207 mounted on a base plate 205 made of aluminum or a plastic material such as ABS resin. The sound absorbing member 207 is made of "Room Creator" as described above. The base plate 205 is provided with three through-holes 209 along its periphery, and can be fixed to the mobile terminal booth with screws which are inserted through the through-hole 209 into internal threads (not shown in the figure) which are formed through the panel caps 117.

Figure 10:
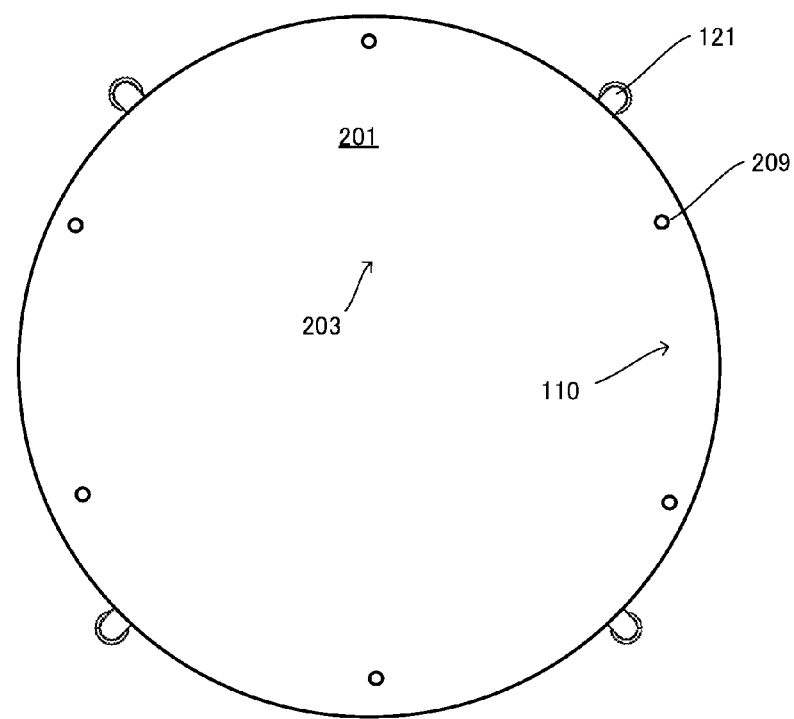
FIG. 10 is a plan view for showing another example of a roof member which is used for the mobile terminal booth of the embodiment 2.

With the roof member 201, it is possible to block sound waves entering from the above and make the inside space more silient. Since the roof member 201 covers only part of the upper opening of the mobile terminal booth rather than all the area of the upper opening, it is possible to have outside light enter the mobile terminal booth and give the inside space an open feeling. Needless to say, if the roof member 201 is designed to cover all the area of the upper opening as illustrated in FIG. 10, the sound blocking performance can be further improved.

Embodiment 3

Figure 11:
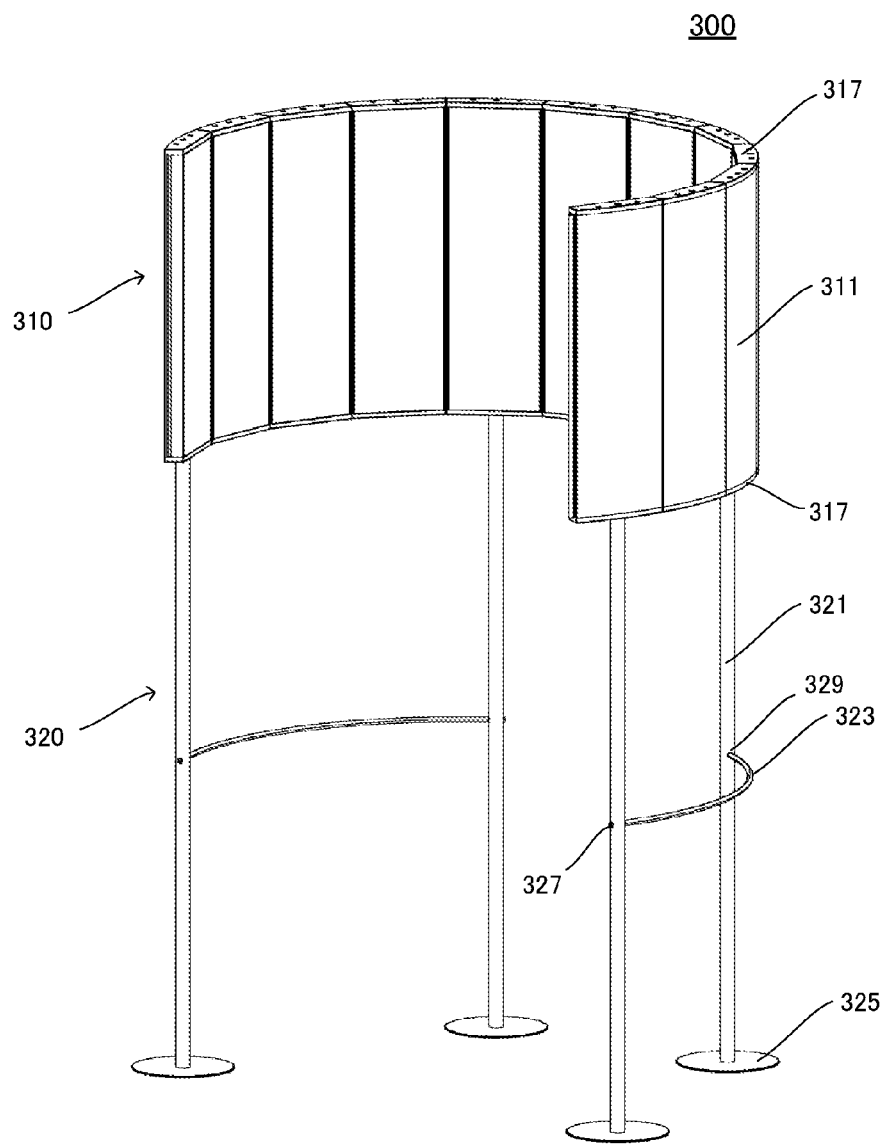
FIG. 11 is a perspective view for showing the mobile terminal booth in accordance with an embodiment 3.

FIG. 11 is a perspective view for showing a mobile terminal booth in accordance with the embodiment 3. The difference between this mobile terminal booth 300 and the mobile terminal booth 100 of the embodiment 1 is that a support frame 320 is fixed to the bottom of a sound absorbing unit 310. In what follows, the differences from the embodiment 1 will be described.

The sound absorbing unit 310 can be assembled by connecting a number of plate-like sound absorbing panels 311 in the form of an arch. Each sound absorbing panel is 20 cm wide and 60 cm high. Also, the support frame 320 includes four pipes to be vertically connected to the sound absorbing unit 310, arch members 323 each of which links the centers of two of the pipes 321 together, and disk plates 325 attached to the bottom surfaces of the pipes 321. The disk plates 325 are provided with rubber sheets attached to the bottom surface of the disk plates 325. The length of the pipes 321 is 120 cm.

The tops of the pipes 321 are provided with male threads (not shown in the figure), and fixed by engaging with female threads which are located in the corresponding positions of the panel caps 317. The pipes 321 are formed with through-holes 329 through which the arch members 323 can be inserted. The arch members 323 can be inserted into and fixed to the pipes 321 with hex nuts 327.

Figure 12:
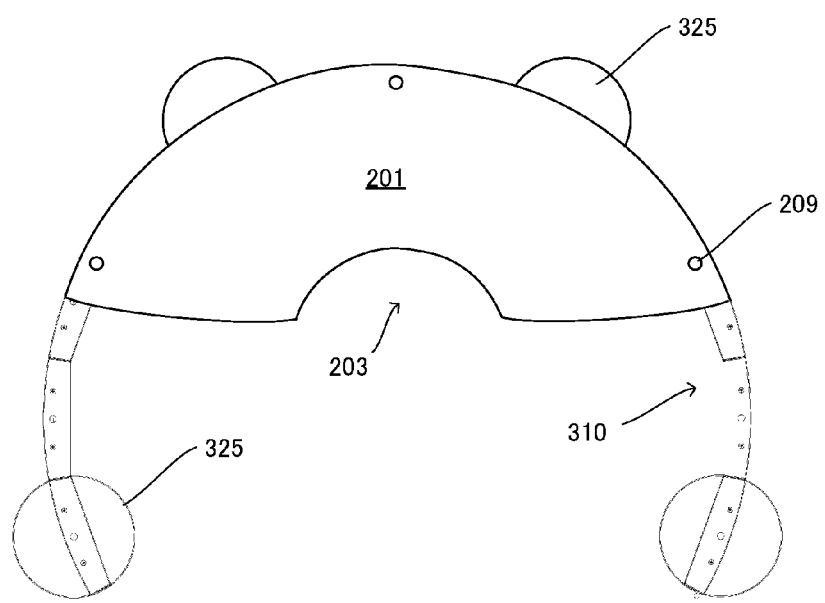
FIG. 12 is a plan view for showing the mobile terminal booth in accordance with the embodiment 3 on which a roof member is mounted.

Furthermore, the lower ends of the pipes 321 are provided with female threads (not shown in the figure) and fixed to the disk plates 325 by means of male threads (not shown in the figure) projected upward from the top surfaces of the disk plates 325. This structure makes the mobile terminal booth appearing simple and elegant with the sound absorbing unit 310 and having a sufficient strength with the arch members 323. Meanwhile, the roof member 201 as described in the embodiment 2 can be mounted on the mobile terminal booth of this embodiment (refer to FIG. 12).

Embodiment 4

In this embodiment 4, several modifications of the above embodiments will be explained. In the case of the embodiment 1, the sound absorbing unit 110 has a cross section in the form of a circle having an opening. However, the sound absorbing unit can be shaped to have a cross section in the form of a polygon (such as a rectangle, a square, a pentagon) is removed. One side of this polygon is at least partially opened.

Figure 13:
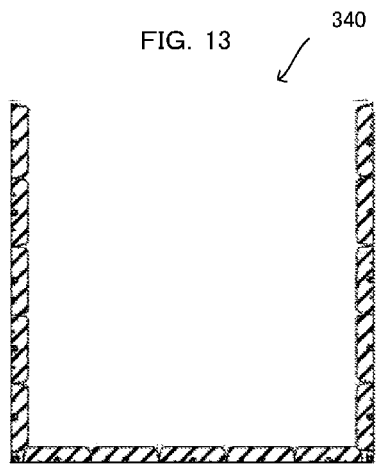
FIG. 13 is a cross sectional view for showing a modification example of the sound absorbing unit of the mobile terminal booth explained as an embodiment 4.

For example, as illustrated in the plan view of FIG. 13, the space utilization of the sound absorbing unit 340 can be maximized by making use of a squared form in cross section to provide more choices of where the mobile terminal booth is placed. Then, the user-friendliness can be improved when assembling, installing and utilizing the mobile terminal booth. Alternatively, as illustrated in the plan view of FIG. 14, the front opening can be narrowed in order to improve the sound controlling performance.

Figure 15:
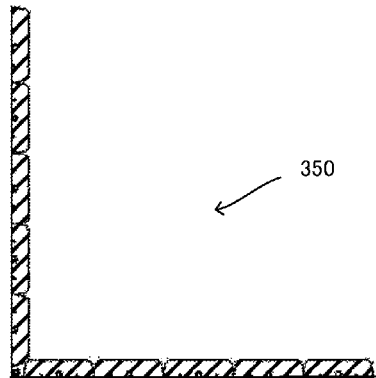
FIG. 15 is a cross sectional view for showing a further modification example of the sound absorbing unit of the mobile terminal booth explained as the embodiment 4.

On the other hand, the sound absorbing unit can be shaped in the form of a two-panel screen (or having an L-shaped cross section) as illustrated in the plan view of FIG. 15. This configuration provides a sense of openness where a user can make use of the mobile terminal booth with ease as if the user simply steps to a wall. In addition, the cost can be minimized.

Figure 14:
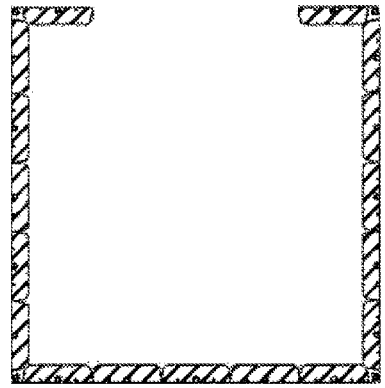
FIG. 14 is a cross sectional view for showing another modification example of the sound absorbing unit of the mobile terminal booth explained as the embodiment 4.
Figure 16:
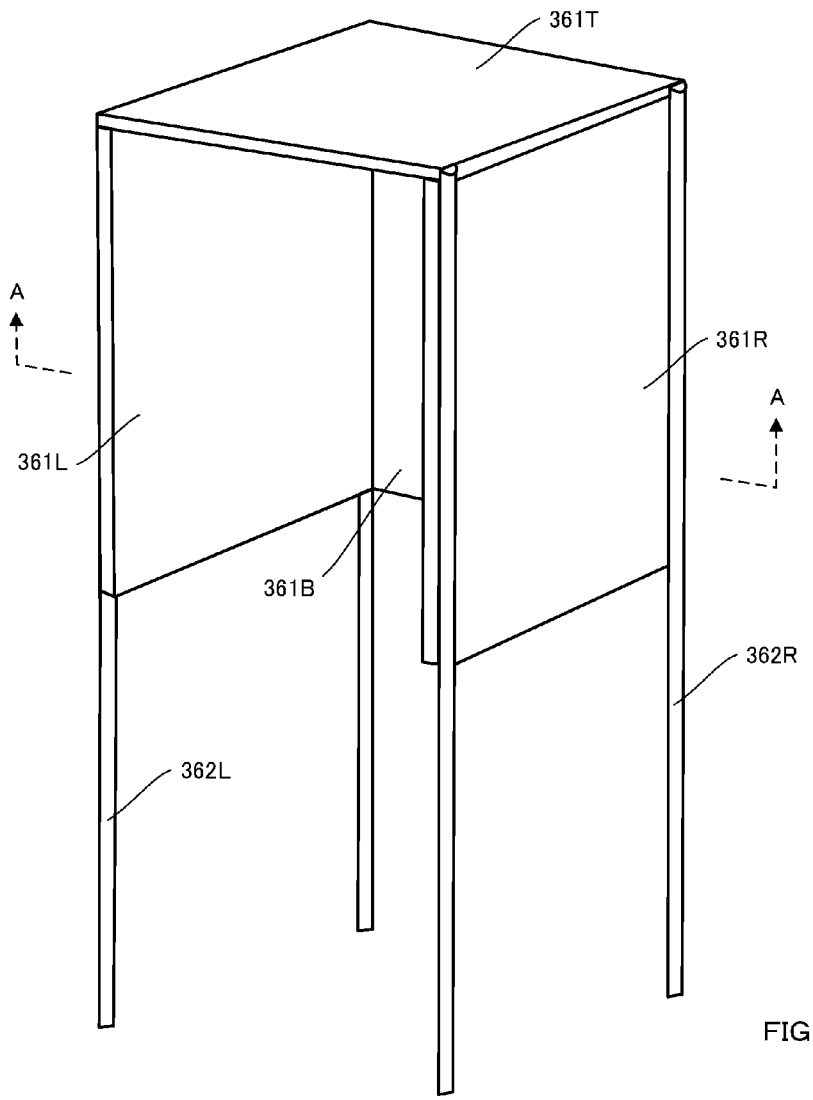
FIG. 16 is a view for showing a further modification example of the mobile terminal booth explained as the embodiment 4.
Figure 17:
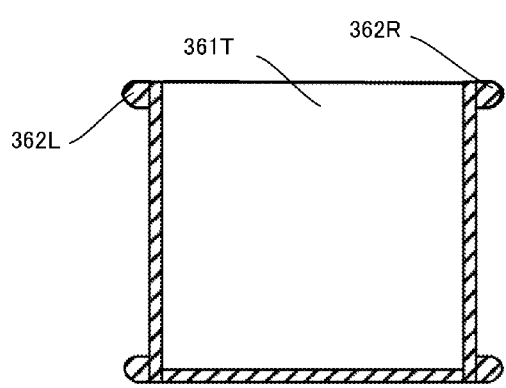
FIG. 17 is a cross sectional view, taken along line A-A of FIG. 16, for showing the sound absorbing unit.

The sound absorbing units as illustrated above can be constructed by basically combining the same plate-like sound absorbing panels. However, the structures as illustrated in FIGS. 13 through 15 can be constructed also by the use of a single larger plate-like sound absorbing panel for each side of the squared form in place of a number of small panels as described above. In this case, the number of steps for assembling a sound absorbing unit can be significantly reduced, and the silent performance can be improved due to a few number of joint portions. FIG. 16 is a perspective view for showing a mobile terminal booth with a sound absorbing unit consisting of left, right and back panels 361L, 361R and 361B each of which is made of a single larger plate-like sound absorbing panel. Also, FIG. 17 is a cross sectional view, taken along line A-A of FIG. 16, for showing the sound absorbing unit. A pair of support posts are attached to the opposite edges of each of the left and right sides 361L and 361R. Meanwhile, this mobile terminal booth is provided further with a roof member 361T on the top of the sound absorbing unit.

Figure 18:
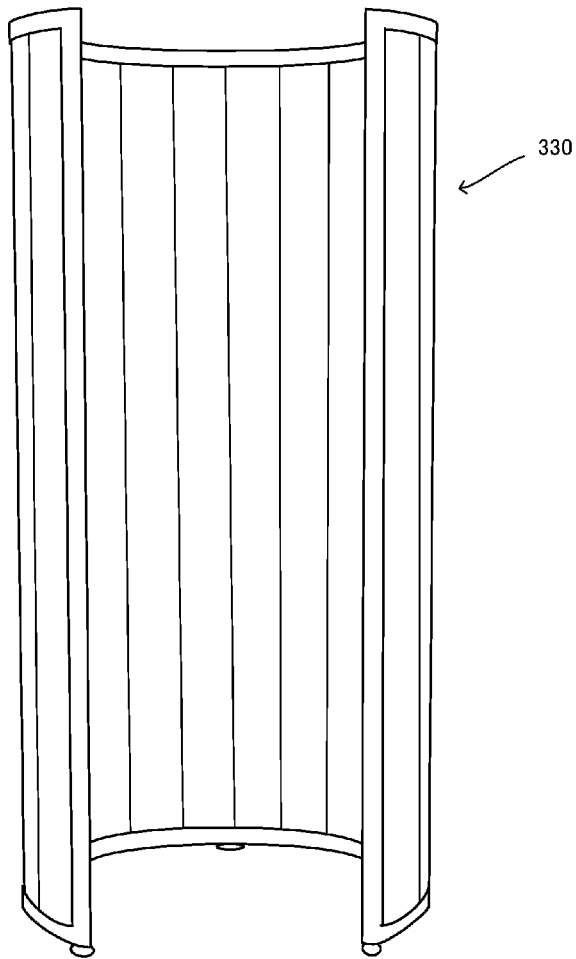
FIG. 18 is a front view for showing a further modification example of a mobile terminal booth explained as the embodiment 4.

Furthermore, the sound absorbing unit 110 of the embodiment 1 can be extended downward to the floor as a sound absorbing unit 330 as illustrated in FIG. 18. In this case, the sound absorbing performance can be furthermore improved such that more quiet space can be created. Particularly, a woman is no longer worried about other people's eyes since her legs are hidden by the sound absorbing unit 330. The roof member 201 of the embodiment 2 can be mounted also on the mobile terminal booth shown in FIG. 18 to create a more quiet space.

Figure 19:
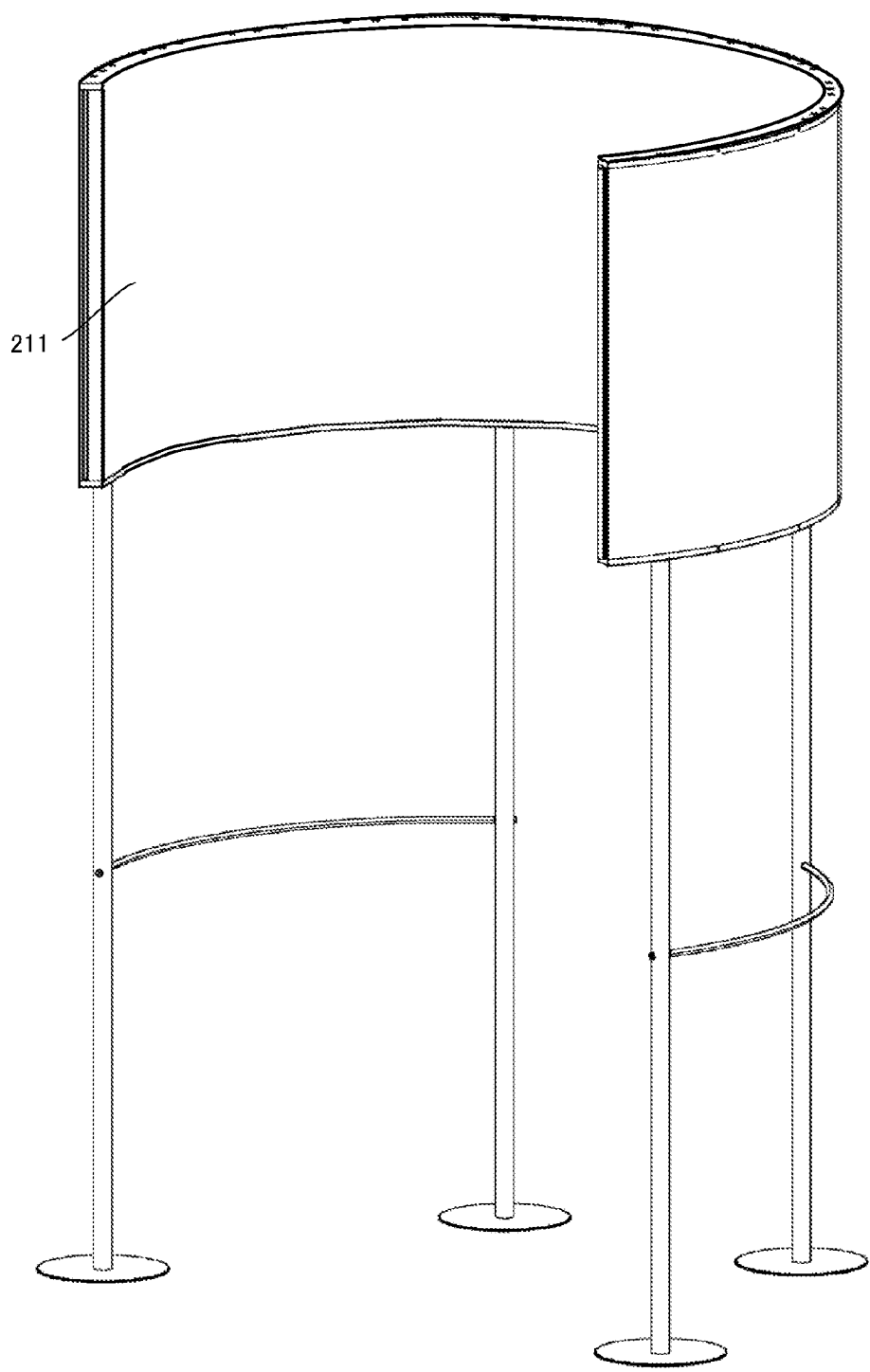
FIG. 19 is a perspective view for showing a further modification example of a mobile terminal booth explained as the embodiment 4.

Furthermore, in the case where a number of plate-like sound absorbing panels are assembled to form a sound absorbing unit as described above, it is inevitable that the reverberation damping performance and the sound absorbing performance are reduced to some extent at the connecting portions. However, as illustrated in FIG. 19, the influence of the connecting portions can be avoided by making use of a single arch-like plate-like sound absorbing panel 211 as a sound absorbing unit. In this case, the sound absorbing material can continuously cover the inner space through the entire arch-like shape.

Embodiment 5

Figure 20:
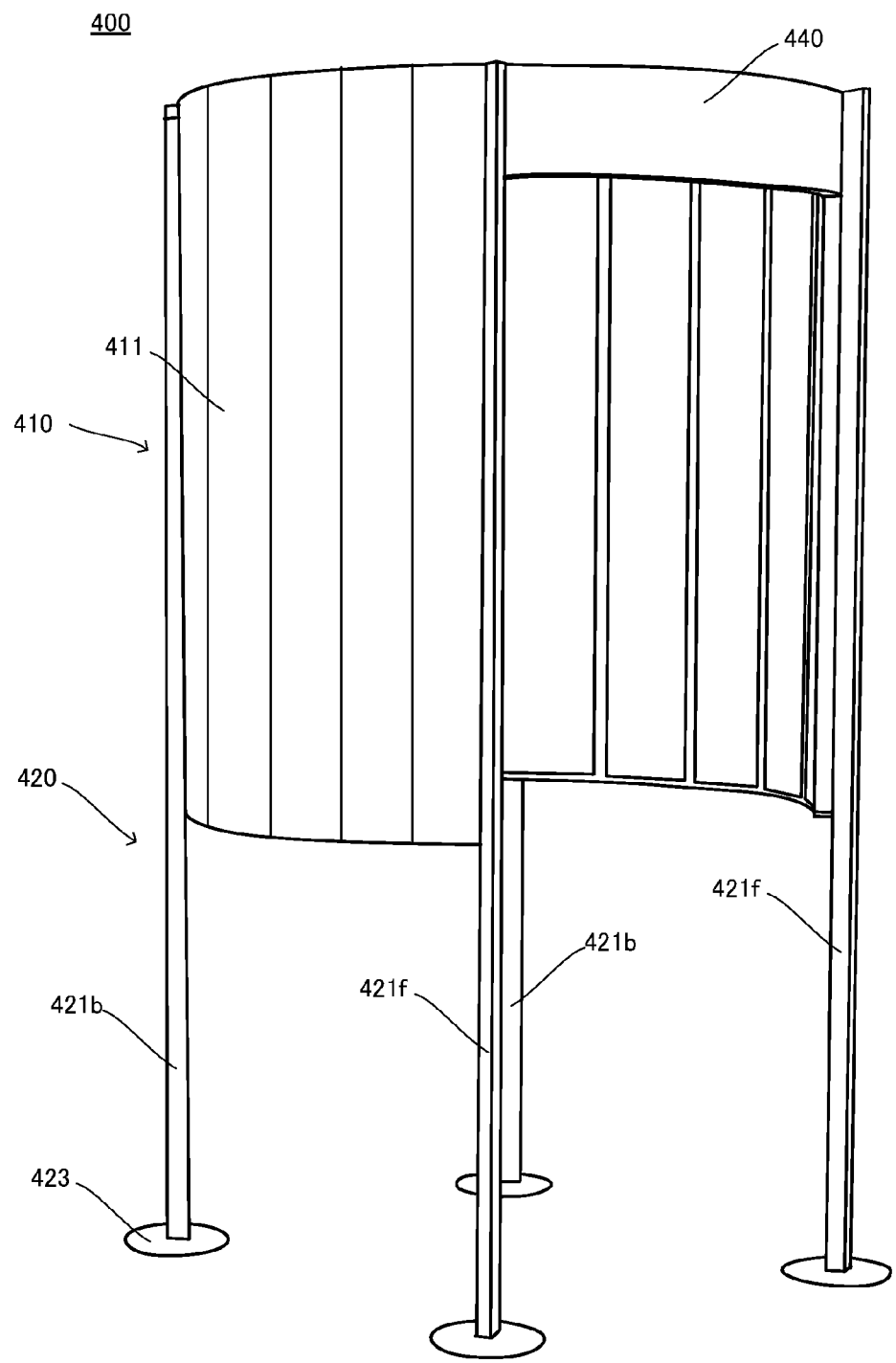
FIG. 20 is a perspective view for showing a mobile terminal booth in accordance with an embodiment 5 of the present invention.

FIG. 20 is a perspective view for showing a mobile terminal booth in accordance with a fifth embodiment of the present invention. This mobile terminal booth 400 includes a sound absorbing unit 410 in the form of a cylinder having a front opning, and a support frame 420 for supporting the sound absorbing unit 410, in the same manner as the mobile terminal booth of the embodiment 1. Also, they can be carried as several constituent parts and assembled in an installation site.

The sound absorbing unit 410 can be assembled by connecting a number of plate-like sound absorbing panels 411 in the form of an arch. Each sound absorbing panel is, for example, 20 cm wide, 120 cm length and 3 cm thick. Also, the support frame 420 includes four pipes 421b and 421f to be vertically connected to the sound absorbing unit 410, and adjuster foots 423 attached to the bottom surfaces of the pipes 421b and 421f.

If the length of the pipes 421b and 421f is 200 cm, the lower end of the sound absorbing unit 410 is located 80 cm from the floor. The sound absorbing unit 410 has the same structure as that of the embodiment 1 except for its size. Additionally, a roof member as shown in FIG. 10 is provided on the top of the sound absorbing unit 410.

Furthermore, the mobile terminal booth of this embodiment 5 is provided with an arch-like connector 440 which bridges between the upper portions of the plate-like sound absorbing panels 411 located at opposite sides of the front opening (entrance) of the sound absorbing unit 410. This arch-like connector 440 serves to reinforce the stability of the mobile terminal booth. Accordingly, while the plate-like sound absorbing panels 411 are pivotally joined with each other, the diameter of the mobile terminal booth can be changed by making use of an arch-like connector having a different span as the arch-like connector 440.

Figure 21:
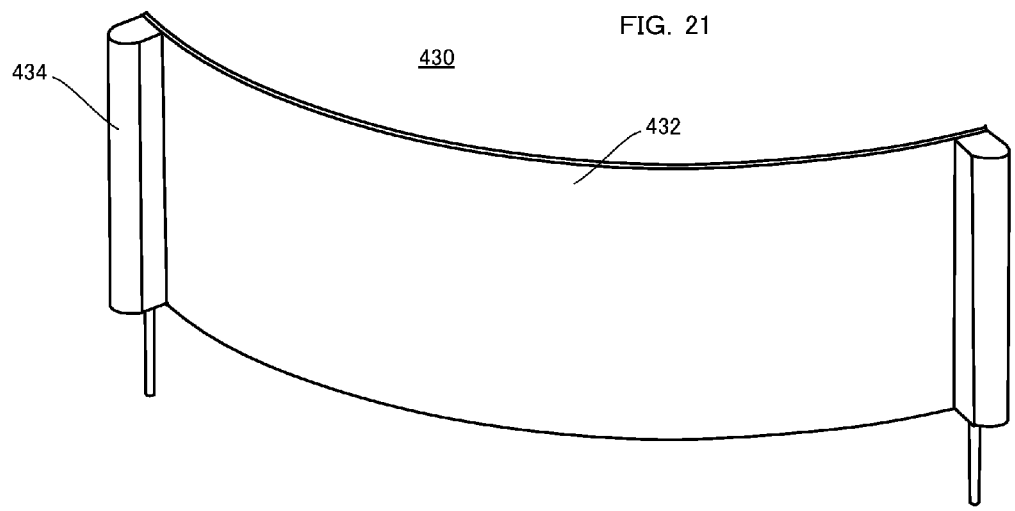
FIG. 21 is a perspective view for showing a replaceable fascia which can be attached to the mobile terminal booth of the embodiment 5.

Furthermore, the inner and outer surfaces of the sound absorbing unit may be used as an advertising space so that certain earnings can be expected. The mobile terminal booth of the embodiment 5 is further provided with a replaceable fascia. FIG. 21 is a perspective view for showing this replaceable fascia. As shown in this figure, the replaceable fascia 430 consists of an advertisement plate 432 made of a plastic and a pair of supporting poles 434 to which the opposite ends of the advertisement plate 432 are fixed.

Figure 22:
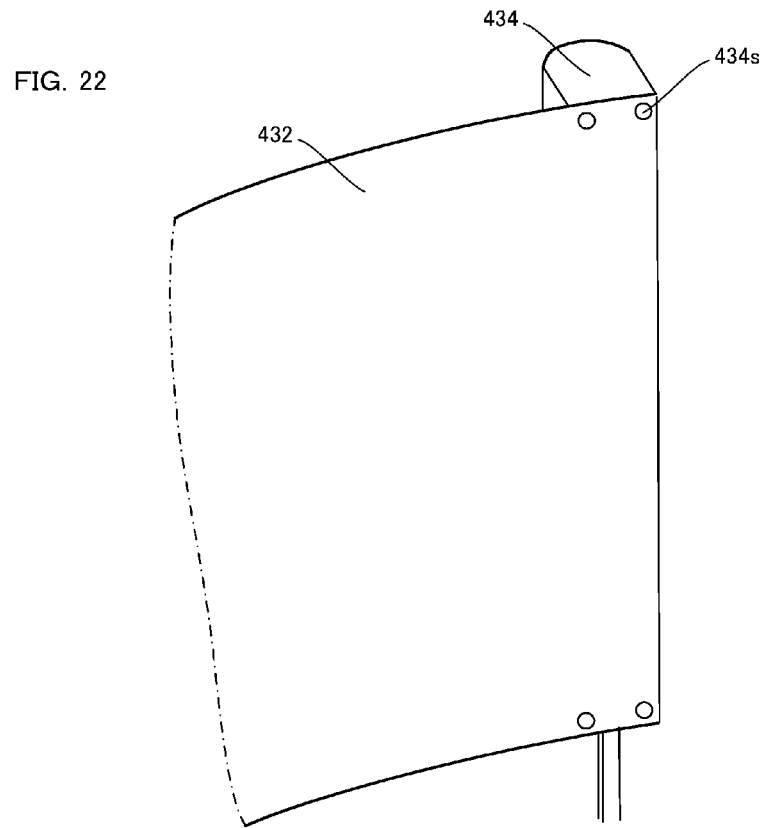
FIG. 22 is a perspective expanded view for partially showing the replaceable fascia shown in FIG. 21 as seen from the back side.
Figure 23:
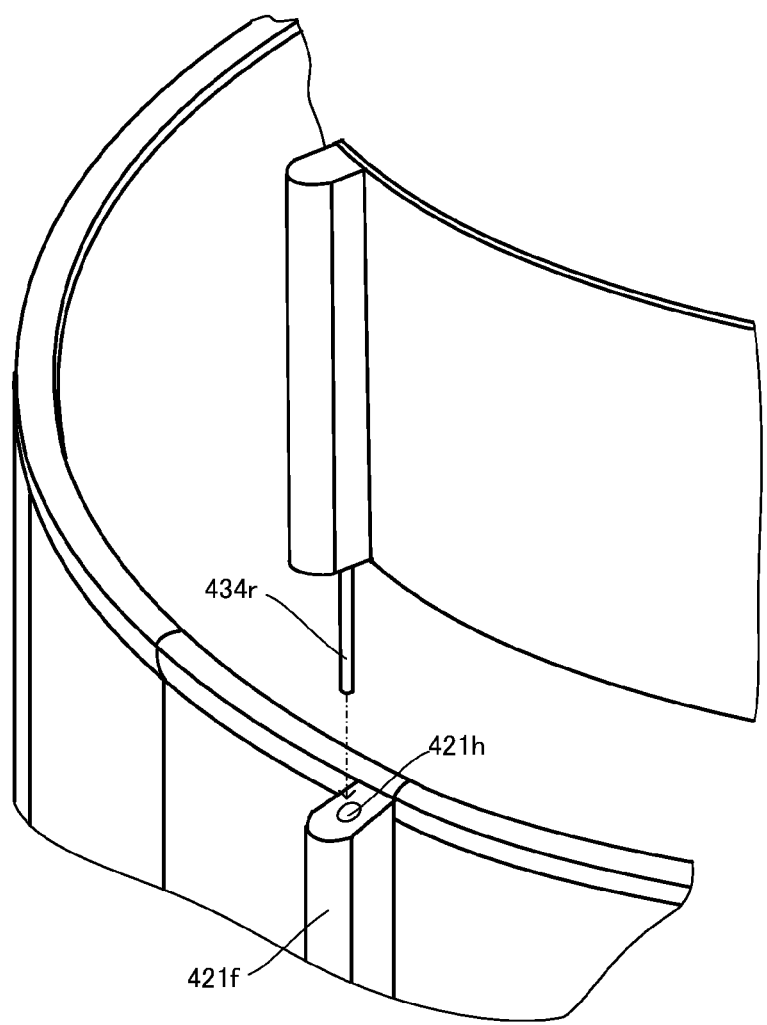
FIG. 23 is a perspective expanded partial view for showing the way of mounting the replaceable fascia shown in FIG. 21 on the mobile terminal booth of the embodiment 5.

As illustrated in FIG. 22, the advertisement plate 432 is fixed to the supporting poles 434 with screws 434s, and can be replaced with another advertisement plate. Also, as illustrated in FIG. 23, the two front side pipes 421f are provided with support holes 421h at their upper ends. On the other hand, the supporting poles 434 are provided with support rods 434r which are projected downward and inserted into the support holes 421h of the front side pipes 421f so that the replaceable fascia can be mounted on the top of the sound absorbing unit 410 (refer to FIG. 24).

Figure 24:
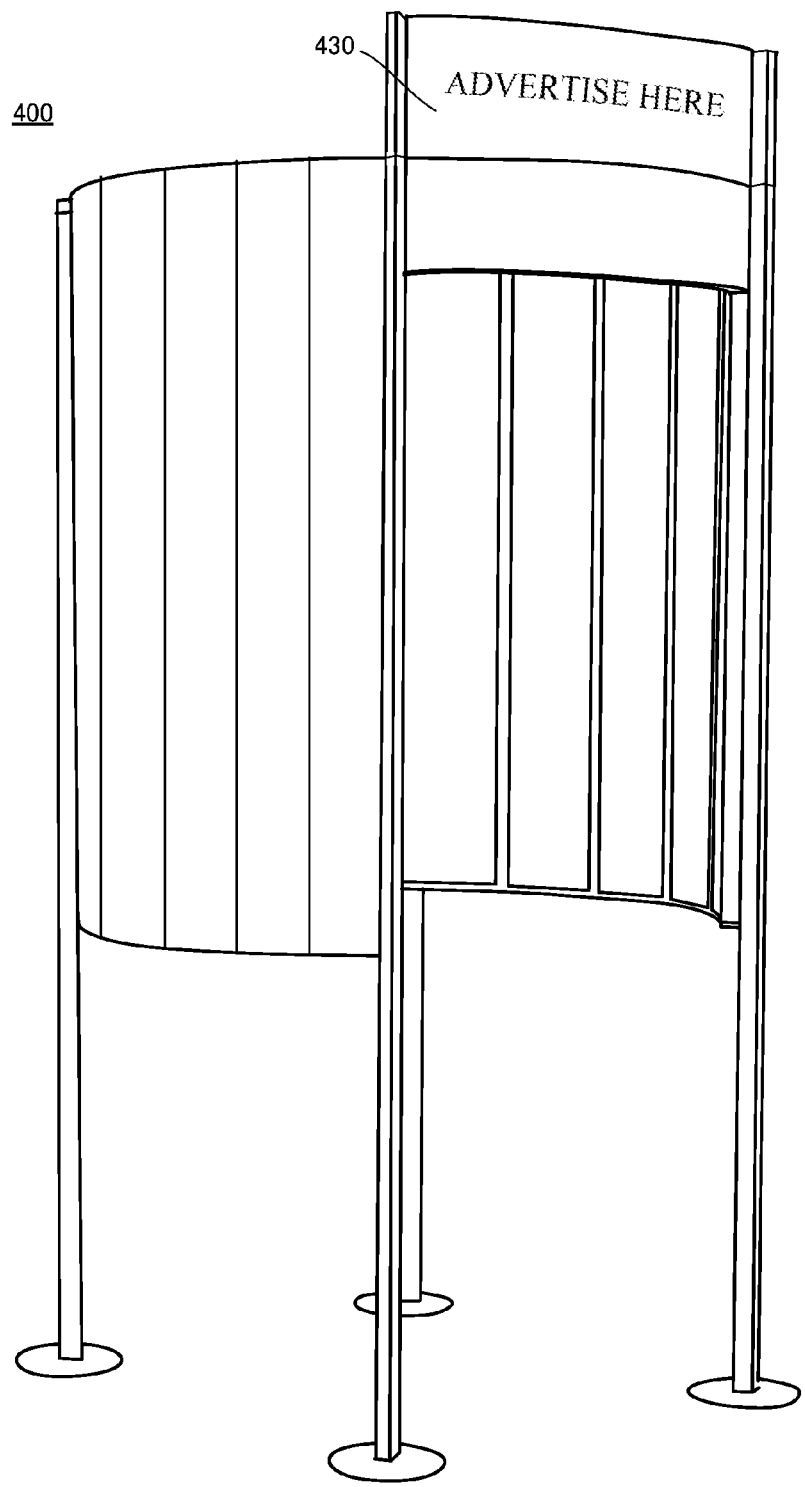
FIG. 24 is a perspective view for showing the mobile terminal booth of the embodiment 5 on which the replaceable fascia shown in FIG. 21 is mounted.
Figure 25:
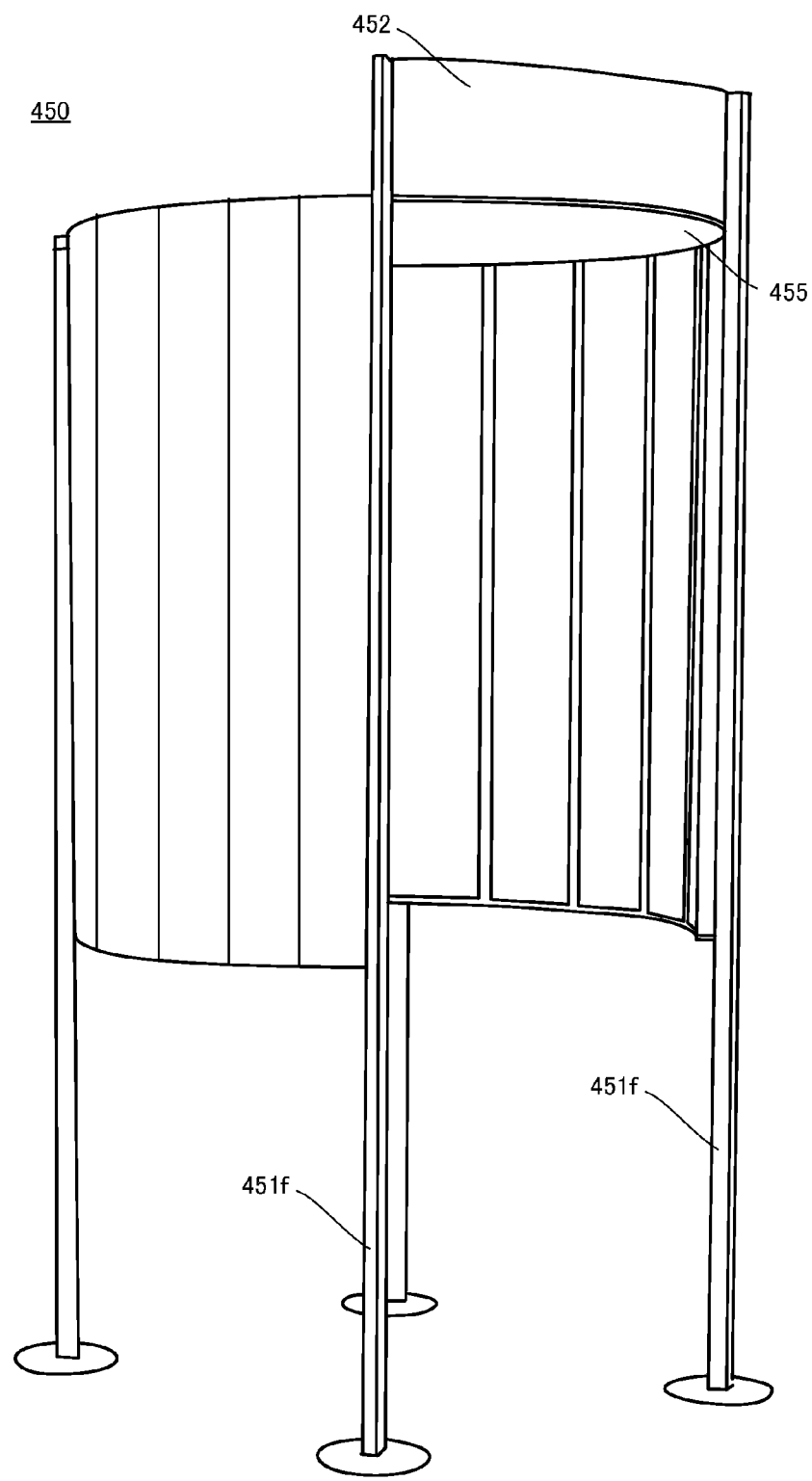
FIG. 25 is a perspective view for showing a modification example of the mobile terminal booth in accordance with the embodiment 5.

FIG. 25 is a perspective view for showing a modification the mobile terminal booth in accordance with the fifth embodiment. This mobile terminal booth 450 is provided with an arch-like connector 452 in place of the arch-like connector 440 as shown in FIG. 20. The arch-like connector 452 is provided to project upward from the top of the sound absorbing unit 410 in the position corresponding to the replaceable fascia 430 as illustrated in FIG. 24. More specifically, the mobile terminal booth 450 has front two pipes 451f which are extending upwards beyond a roof member 455 in the same manner as the supporting poles 434 of the mobile terminal booth 400. The arch-like connector 452 is fixed between the extended portions of the pipes 451f. This arch-like connector 452 serves to reinforce the stability of the mobile terminal booth without narrowing the front opening (entrance) of the sound absorbing unit 450.

Embodiment 6

Figure 26:
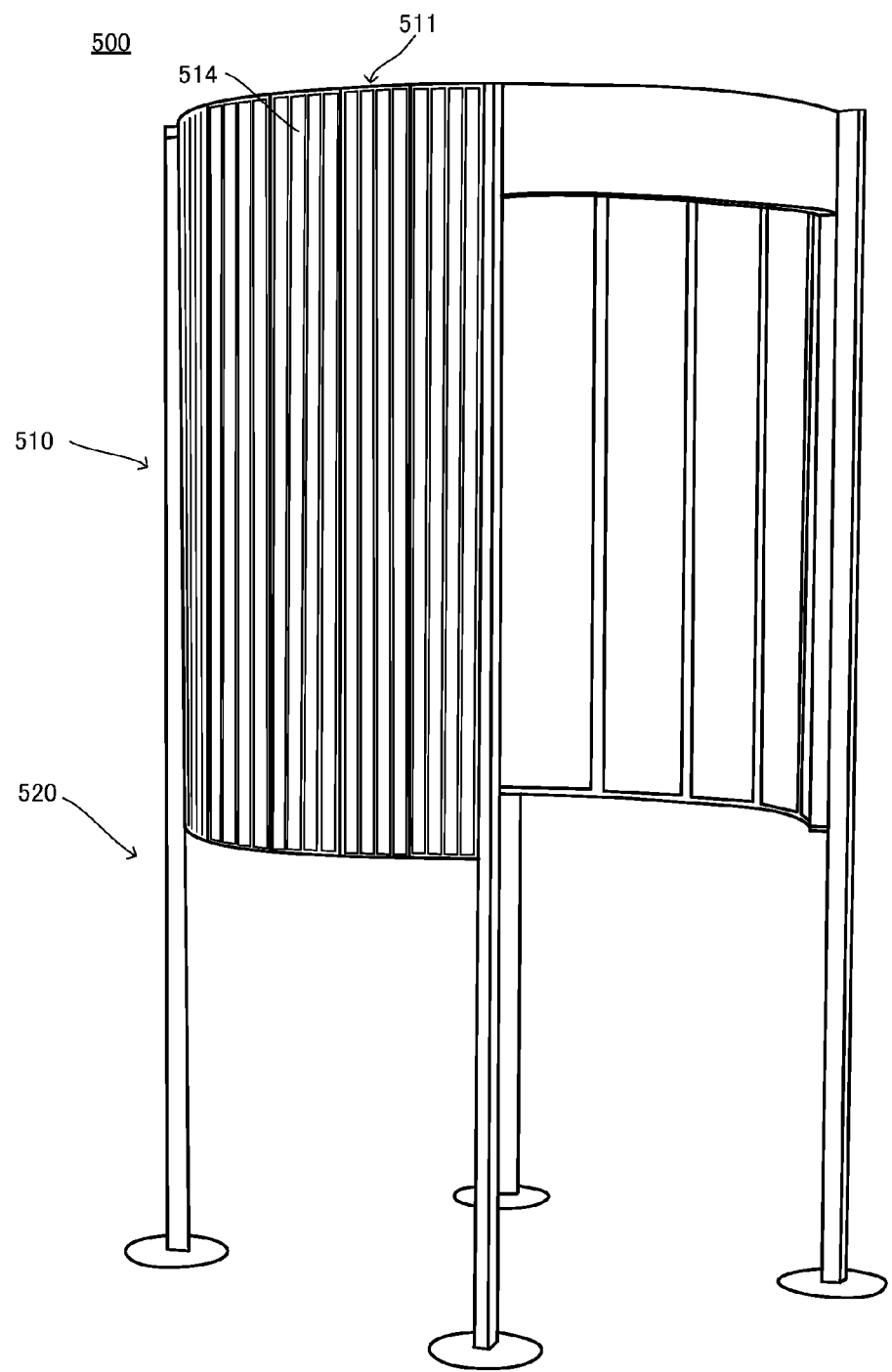
FIG. 26 is a perspective view for showing a mobile terminal booth in accordance with an embodiment 6 of the present invention.

FIG. 26 is a perspective view for showing a mobile terminal booth in accordance with a sixth embodiment of the present invention. This mobile terminal booth 500 differs from the mobile terminal booth of the embodiment 1 in the structure of the sound absorbing unit 510. Specifically speaking, plate-like sound absorbing panels 511 have a different structure.

Figure 27:
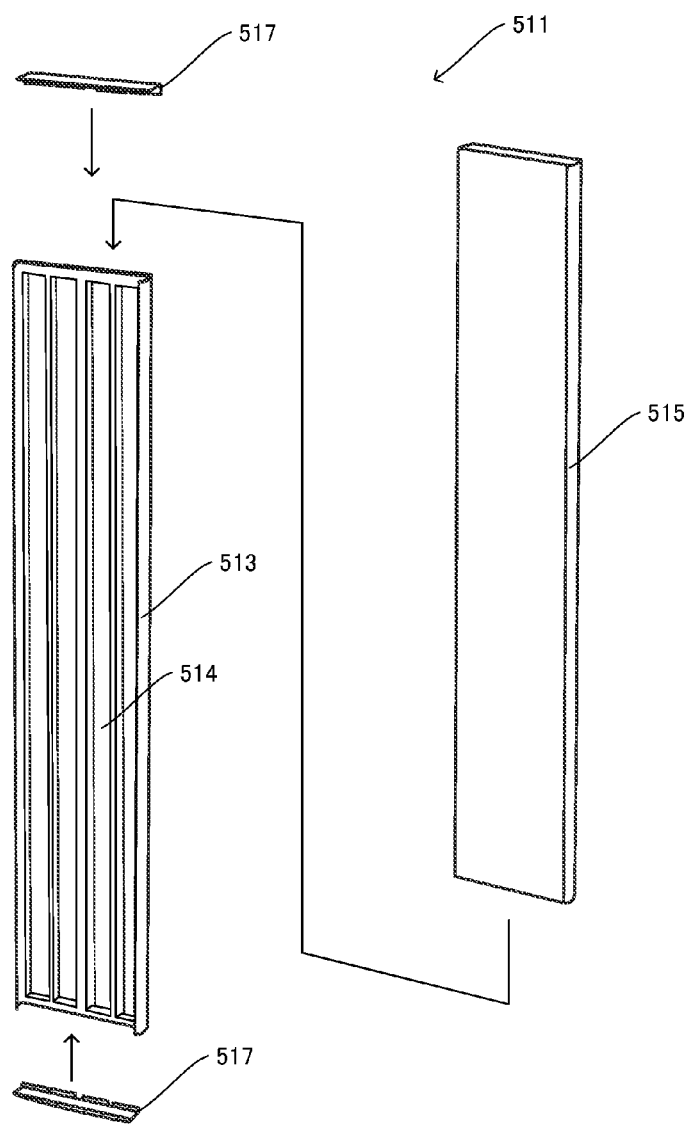
FIG. 27 is an exploded perspective view for showing the structure of the plate-like sound absorbing panel in accordance with the embodiment 6 of the present invention.
Figure 28:
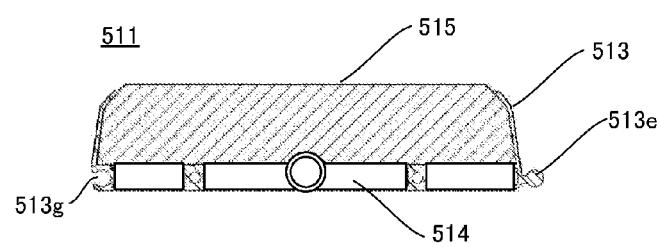
FIG. 28 is a cross sectional view for showing the structure of the plate-like sound absorbing panel used in the mobile terminal booth of the embodiment 6.

FIG. 27 is an exploded perspective view for showing the plate-like sound absorbing panel 511 of this mobile terminal booth 500. FIG. 28 is a cross sectional view for showing the plate-like sound absorbing panel 511. The plate-like sound absorbing panel 511 is assembled by mounting a sound absorbing member 515 on an aluminum panel 513 in the same manner as that of the embodiment 1.

However, the outer side of the aluminum panel 513 is at least partially opened. In this case, a plurality of vertical slits 514 are formed through the aluminum panel 513. Namely, the front side of the aluminum panel 513 is in the form of a grille through which the inside sound absorbing member 515 is exposed. Except for the formation of the grille, the plate-like sound absorbing panel 511 is the same as the plate-like sound absorbing panel 111 of the embodiment 1. As compared with the structure shown in FIG. 2, this structure is less effective to reflect and block sound waves incident from outside, but more effective to inhibit reverberating sound inside the mobile terminal booth. Namely, in the case of the first embodiment, the inner surface of the aluminum panel 113 reflects sound waves that are propagating from the inside space of the mobile terminal booth, passed through the sound absorbing member 115 and incident on the inner side the sound absorbing panel 110, and thereby enhances reverberating sound in the inside space. However, in the case of this embodiment, such sound waves incident on the inner side the sound absorbing panel 110 are transmitted through the vertical slits 514 of the aluminum panel 513 outwards from the inside space of the mobile terminal booth, so that reverberating sound can be inhibited.

Figure 29:
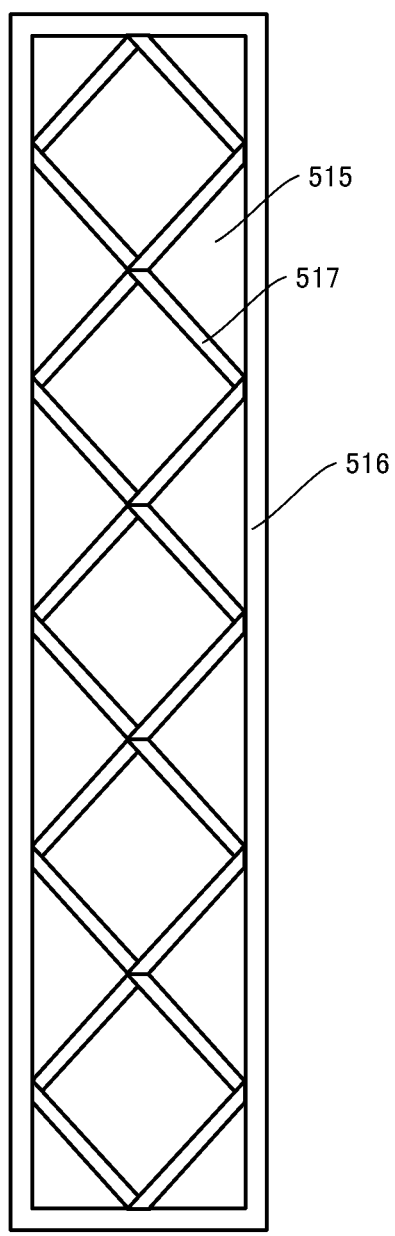
FIG. 29 is a plan view for showing another example of the plate-like sound absorbing panel used in the mobile terminal booth of the embodiment 6.

Accordingly, the grille 513g serves to reduce reverberating sound waves which contains much high-frequency components, and thereby can function as a means of controlling sound inside the mobile terminal booth. Generally speaking, it is effective for the same purpose to (partially) remove the center portion of the aluminum panel 513. For example, FIG. 29 shows another example of such an aluminum panel from which the center portion thereof is removed. The aluminum panel consists of an outer rim 516 and a plurality of strips 517 inside the rim in the form of a criss-crossed pattern. The sound absorbing member 515 is exposed through the criss-crossed pattern.

Embodiment 7

Figure 30:
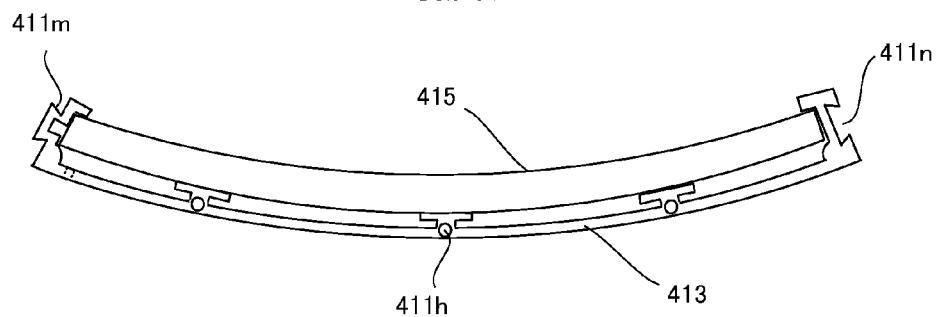
FIG. 30 is a cross-sectional view of the plate-like sound absorbing panel of the mobile terminal booth shown in FIG. 20.

Next, with reference to FIG. 30 through FIG. 39, a method of assembling the mobile terminal booth shown in FIG. 20 will be explained. FIG. 30 is a cross-sectional view of the plate-like sound absorbing panel 411. As shown in this drawing, the opposite side surface of the plate-like sound absorbing panel 411 is provided with a dovetail tenon 411m and a dovetail groove 411n which are extending in the vertical direction. The dovetail tenon 411m and the dovetail groove 411n are formed into corresponding shapes in order to be integrated by engaging with each other.

Figure 33:
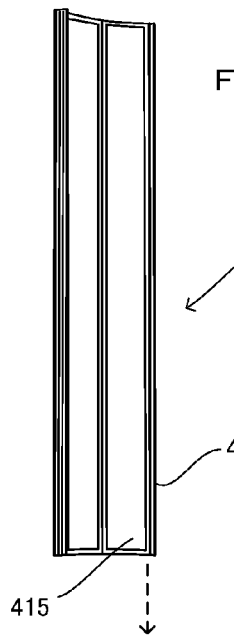
FIG. 33 is a view for explaining a connection method of plate-like sound absorbing panels conducted in the assembling method of the mobile terminal booth according to an embodiment 7 of the present invention.
Figure 34:
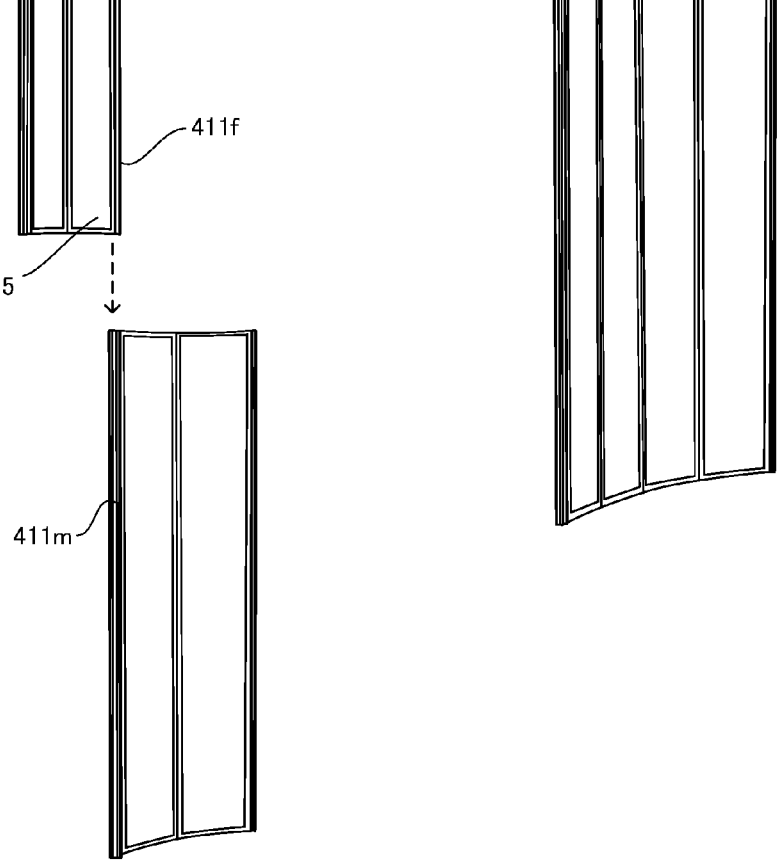
FIG. 34 is a perspective view for showing two plate-like sound absorbing panels which are connected in accordance with the assembling method of the mobile terminal booth according to the embodiment 7 of the present invention.

First, the plate-like sound absorbing panels 411 are assembled into a cylindrical form. This process is performed with two plate-like sound absorbing panels 411 being erected, as illustrated in FIG. 33, by sliding the dovetail groove 411n formed on the side surface of one panel into the dovetail tenon 411m formed on another panel in the vertical direction to integrally join with each other (refer to FIG. 34). While the dovetail groove 411n of another plate-like sound absorbing panel 411 is slid down from the above through the dovetail tenon 411m of another plate-like sound absorbing panel 411 placed on a floor in this example, needless to say, they can be performed inversely.

Figure 35:
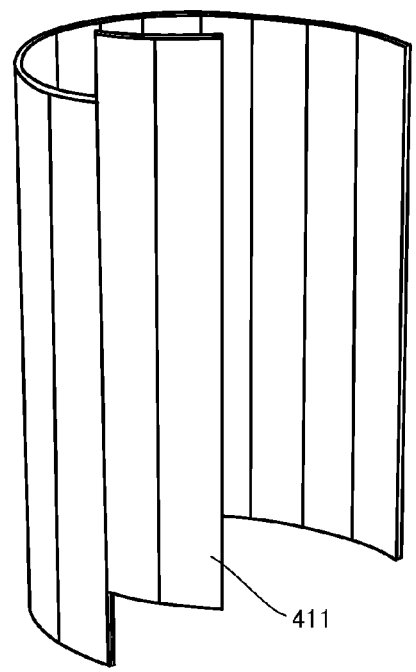
FIG. 35 is a perspective view for showing the sound absorbing unit which is assembled in accordance with the assembling method of the mobile terminal booth according to the embodiment 7 of the present invention.
Figure 36:
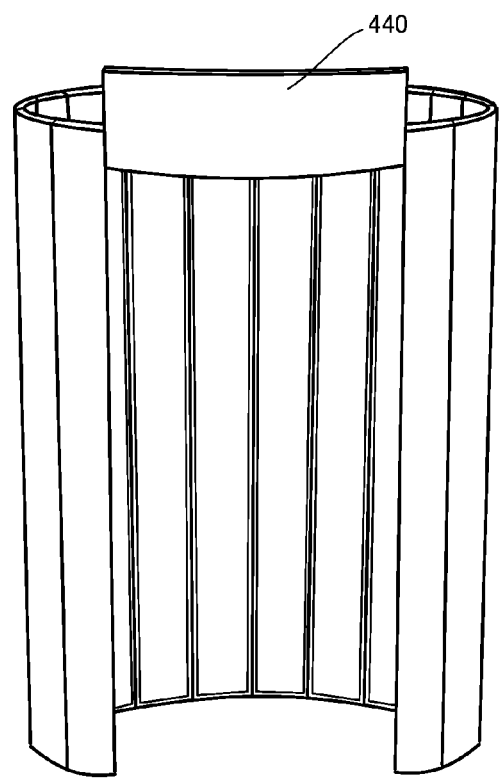
FIG. 36 is a perspective view for explaining a fascia which is attached to the plate-like sound absorbing panel shown in FIG. 34.

The other panels are joined in the same manner in order that the cylindrical surfaces are aligned of all the plate-like sound absorbing panels 411 joined with each other (refer to FIG. 35). After joining all the plate-like sound absorbing panels 411 with each other, finally as illustrated in FIG. 36, the upper portions of the plate-like sound absorbing panels are joined with a fascia 440 which is a connection member in the form of an arch. This fascia 440 is provided with a dovetail tenon and a dovetail groove with which it can be joined in the same manner. This fascia 440 may not be joined in this stage because it is temporarily removed later. However, the structure can be stabilized with the fascia being joined. The above process can be performed in a relatively narrow space on a floor.

Figure 37:
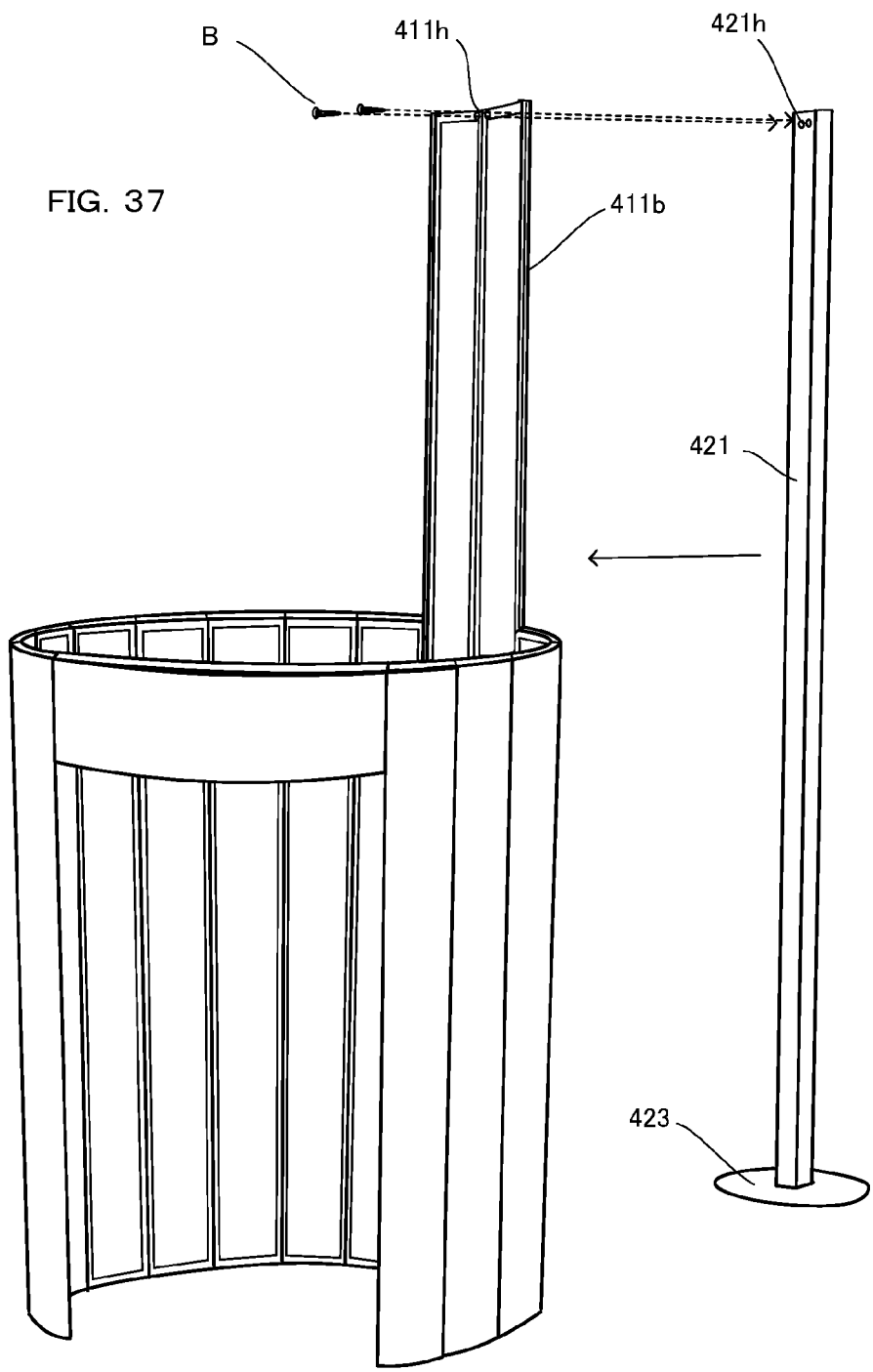
FIG. 37 is a view for explaining a method of connecting a plate-like sound absorbing panel to a pipe after shifting the plate-like sound absorbing panel upward from the sound absorbing unit assembled in accordance with the embodiment of the present invention.

Next, as illustrated in FIG. 37, the pipes 421 will be attached. First, the adjuster foot 423 is attached to the bottom of the pipe 421. The pipe 421 is then erected beside the plate-like sound absorbing panel 411b to be connected. The plate-like sound absorbing panel 411b to be connected is slid upward, while being engaged with the adjacent panels, so that the positions of female screw holes 411h near the upper end are aligned with the positions of support holes 421h near the upper end of the corresponding pipe 421. In this state, the plate-like sound absorbing panel 411b can be supported in a predetermined height by screwing and fixing bolts B into these connecting holes. Meanwhile, in FIG. 37 and FIG. 38, the plate-like sound absorbing panels 411 are distinguished from each other by giving reference numbers 411a to 411g.

Figure 38:
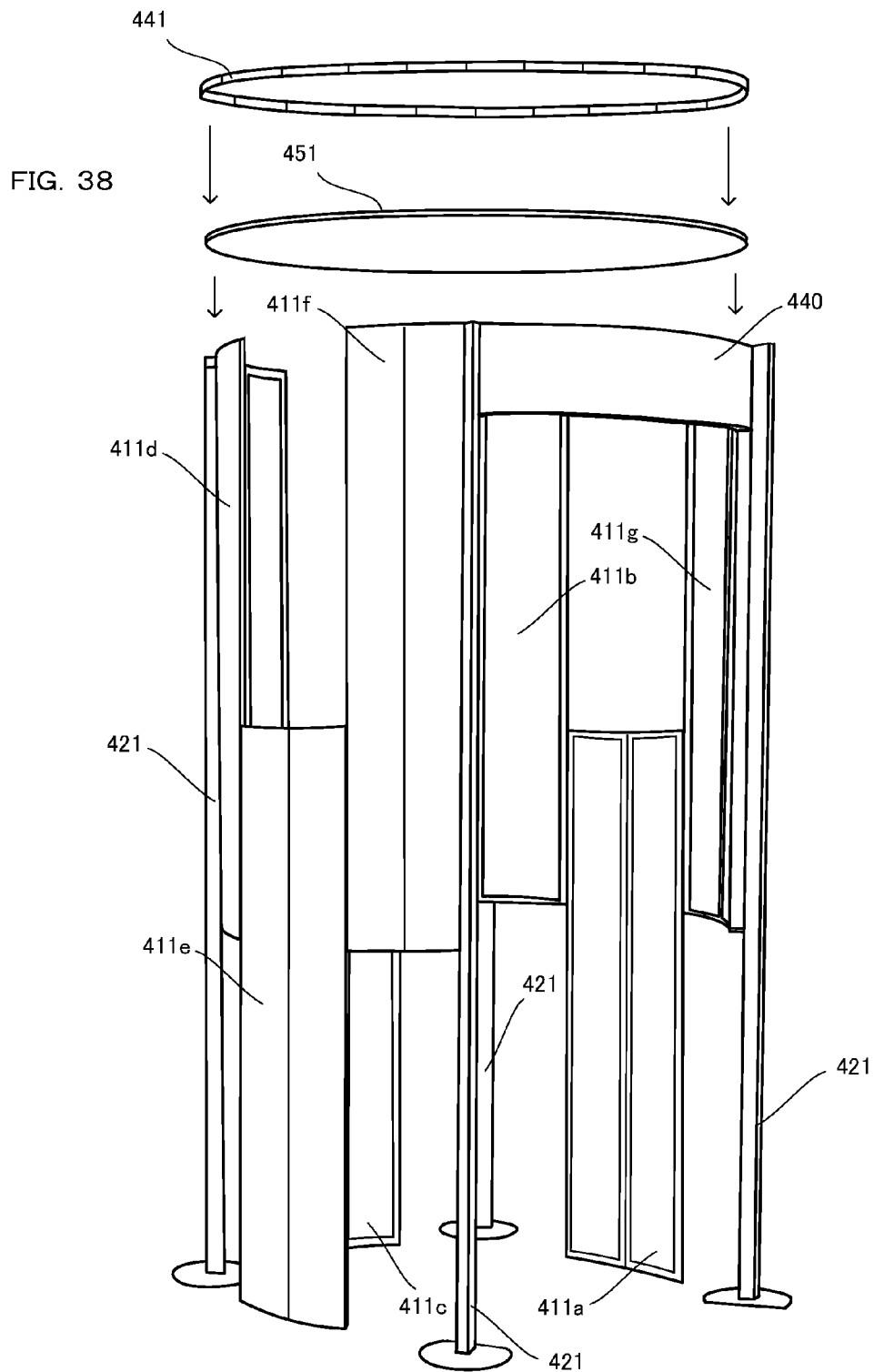
FIG. 38 is a perspective view for showing the mobile terminal booth in the stage after completing the connection of plate-like sound absorbing panels to pipes.

Likewise, the pipes 421 are connected to the plate-like sound absorbing panels 411f and 411g which are located beside the opposite sides of the front opening of the mobile terminal booth by sliding the plate-like sound absorbing panels 411f and 411g upward. In this case, the fascia 440 is once removed for the purpose of fascilitating the operation. Furthermore, the last pipe 421 is connected to the corresponding plate-like sound absorbing panel 411d in the same manner. This results in the state as illustrated in FIG. 38.

Next, the other plate-like sound absorbing panels 411a, 411c and 411e are slid upward to the same height between the plate-like sound absorbing panels 411b, 411d, 411f and 411g which are connected to the pipes 421. The entire structure in the cylindrical form are thereby supported by the four pipes 421 in the predetermined height. In this stage, the plate-like sound absorbing panels 411a, 411c and 411e which are not directly connected to the pipes 421 are supported by the panels adjacent to both sides thereof with the grooves 411m and 411f being engaged with each other.

This state is maintained by friction. However, if necessary, downward sliding may be prevented by temporarily placing support rods under these plate-like sound absorbing panels. In addition, the fascia 440 which has been temporarily removed is joined again.

Figure 39:
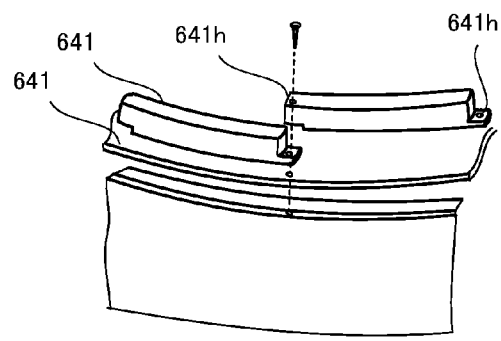
FIG. 39 is a view for explaining the edge fixing rims which are attached to the sound absorbing unit assembled in accordance with the embodiment 7 of the present invention.

Next, the respective plate-like sound absorbing panels 411 and the fascia 440 are fixed at their top portions with an edge fixing rim 441. As illustrated in FIG. 39, this edge fixing rim 441 consists of arch-like members having the same curvature radius as the plate-like sound absorbing panels 411 and the fascia 440 and joined together with engagement sections 441a and 441b at the opposite ends, through which through holes 441h are opened, in a loop form on the upper portions of the plate-like sound absorbing panels 411 and the fascia 440. This edge fixing rim 441 is placed on the upper surfaces of the plate-like sound absorbing panels 411 and the fascia 440 and fixed by screws through the through holes 441h into female screw holes 411h of the plate-like sound absorbing panels 411. Incidentally, a ceiling 451 is placed therebetween when fixing the edge fixing rim 441. The ceiling 451 can thereby be installed at the same time (refer to FIG. 38).

Although not shown in the figure, similar female screw holes are formed also on the bottoms of the plate-like sound absorbing panels 411 in the same manner as on the tops thereof. The plate-like sound absorbing panels 411 are fixed also from the below with the edge fixing rim 441 fixed with screws through these female screw holes. Furthermore, similar female screw holes are formed also on the bottoms of the fascia 440. The fascia 440 is fixed also from the below with a similar edge fixing rim fixed through these female screw holes. The entirety of the sound absorbing unit 410 is thereby supported in a predetermined height together with the plate-like sound absorbing panels 411 which are not directly connected to the pipes 421.

Incidentally, the ceiling 451 is placed under the edge fixing rim 441 in the case shown in FIG. 38. However, the ceiling 451 can be fixed onto the plate-like sound absorbing panels 411a to 411g after attaching the edge fixing rim 441 to the plate-like sound absorbing panels 411a to 411g. In this case, while the number of steps increases, assembling becomes easier.

Furthermore, the plate-like sound absorbing panel shown in FIG. 30 consists of a sound absorbing member 415 and an aluminum panel 413 with an air layer 417 which intervenes therebetween. This structure is particularly effective for attenuating internal sound. Namely, the sound coming in the mobile terminal booth is first absorbed while propagating the inside of the sound absorbing member 415. The remaining sound which has not been absorbed arrives the boundary surface between the sound absorbing member 415 and the air layer 417, and is mainly transmitted through the boundary surface with the reminder being reflected. The sound which has been transmitted through the sound absorbing member 415 propagates through the air layer 417, is reflected by the aluminum panel 413 and returned to the sound absorbing member 415 again. The sound then repeats propagation and reflection with the intervening air layer 417 so as to lose its energy. By this process, it is possible to effectively attenuate sound energy. The intervening air layer 417 has such a thickness as to surely separate the sound absorbing member 415 and the aluminum panel 413. Specifically speaking, a thickness of 5 mm to 1 cm is sufficient.

Figure 31:
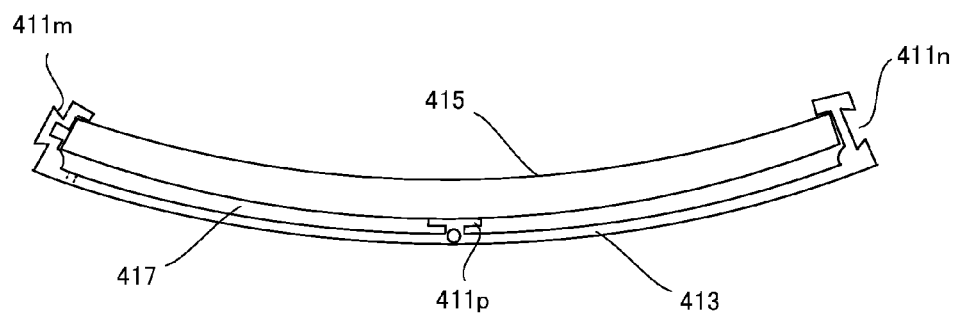
FIG. 31 is a cross-sectional view of another example of the plate-like sound absorbing panel of the mobile terminal booth shown in FIG. 20.
Figure 32:
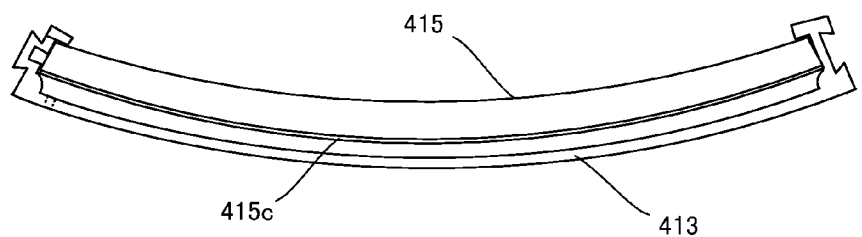
FIG. 32 is a cross-sectional view of a further example of the plate-like sound absorbing panel of the mobile terminal booth shown in FIG. 20.

Incidentally, since the aluminum panel 413 serves as a support member of the sound absorbing member 415, the aluminum panel 413 has to directly contact part of the sound absorbing member 415. If the direct contact area is wide, substantial part of the sound transmitted through the sound absorbing member 415 is reflected by the aluminum panel 413 in the contact area and returned to the inside of the mobile terminal booth. Accordingly, it is preferred in terms of attenuation of sound to make small such a contact area. Specifically speaking, preferably, the sound absorbing member 415 makes direct contact with the aluminum panel 413 by 10% or smaller percentages of the back face of the sound absorbing member 415. For example, as illustrated in FIG. 31, the aluminum panel 413 has a minimized support member 411*p* which supports the back face of the sound absorbing member 415. Also, as illustrated in FIG. 32, the sound absorbing member 415 may be arranged to make contact with the aluminum panel 413 only at the edge portions of the sound absorbing member 415 by providing a relatively thick soft vinyl chloride resin plate 415*c* having a high rigidity.

Embodiment 8

In accordance with the assembling method of Embodiment 7, the plate-like sound absorbing panels 411 are brought to the work site with the sound absorbing members 415 which have been installed in the plate-like sound absorbing panel 411, and assembled as has been discussed above. However, the sound absorbing members 415 may be brought separately from the plate-like sound absorbing panels 411, and installed in the plate-like sound absorbing panel 411 when assembling them on the work site. In this case, since the number of assembling steps increases, the working time tends to be longer. Nevertheless, there are advantages as described below.

First, since the plate-like sound absorbing panel 411 becomes light-weighted, the assembling work becomes easy. Because of this, even a woman can proceed the work without difficulties. Also, since part of the assembling steps is conducted in the user's side, the cost in the maker's side is lowered to suppress the price of the kit.

Furthermore, since the aluminum inner side surfaces are exposed of the plate-like sound absorbing panels, in which the sound absorbing members 415 are to be installed, during the assembling process, the side walls of adjacent plate-like sound absorbing panels can be fastened to each other with screws by the use of the exposed inner surfaces. In the case of the above example, adjacent plate-like sound absorbing panels 411 are connected and fixed to each other at the upper and lower edges with the edge fixing rims 441. In place of, or in addition to this, the side walls of adjacent plate-like sound absorbing panels 411 can be fastened with screws to form the sound absorbing unit 410 which is firmly integrated.

Furthermore, also when the plate-like sound absorbing panel 411 is attached to the pipe 421, the exposed aluminum inner surface of the plate-like sound absorbing panel can be used to effectively and firmly fix the plate-like sound absorbing panel 411 to a plurality of positions of the pipe 421 with screws. In what follows, a specific method will be explained as Embodiment 8. Meanwhile, Embodiment 8 will be explained mainly with respect to the differences from Embodiment 7 without repeating redundant description.

Figure 40:
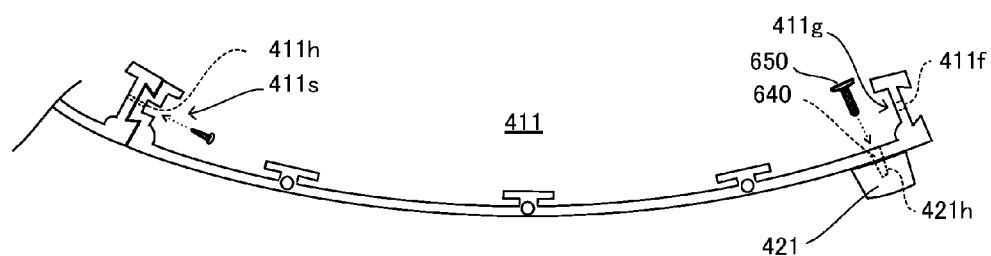
FIG. 40 is a cross-sectional view for showing the plate-like sound absorbing panel of an assembling kit of the mobile terminal booth in accordance with an embodiment 8 of the present invention to explain part of the assembling process.

While the plate-like sound absorbing panel 411 shown in FIG. 40 is approximately same as the plate-like sound absorbing panel 411 shown in FIG. 30, the sound absorbing member 415 is not installed yet. The sound absorbing members 415 will be installed in the aluminum insides of the plate-like sound absorbing panels 411 after the plate-like sound absorbing panels 411 are joined with each other and supported in the predetermined height by the pipes 421.

Also, through holes 640 are provided through the inner surface of the plate-like sound absorbing panel 411 in positions corresponding to the positions where the pipe 421 is connected. The through holes 640 are provided in four positions which are spaced from each other and aligned in the longitudinal direction (the vertical direction) of the pipe 421, i.e., the direction normal to the drawing sheet in FIG. 40.

Figure 41:
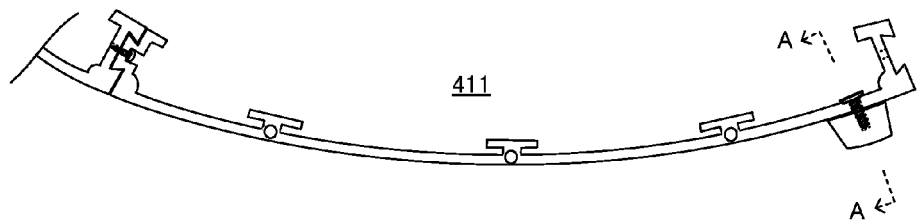
FIG. 41 is a cross-sectional view for showing the plate-like sound absorbing panel of an assembling kit of the mobile terminal booth shown in FIG. 40 to explain part of the assembling process.

Furthermore, through holes 411*h* are opened through one side wall 411*s* of the plate-like sound absorbing panel 411, and female screw holes 411*f* are opened through the other side wall 411*g* in positions corresponding to the through holes 411*h*. The pairs of the through holes 411*h* and the female screw holes 411*f* are provided also in four positions which are spaced from each other and aligned in the direction normal to the drawing sheet in FIG. 40. These through holes 411*h* and female screw holes 411*f* are fastened with screws to form the sound absorbing unit 410 which is firmly integrated (refer to FIG. 41). Particularly, the efficiency of working can be enhanced by fastening the plate-like sound absorbing panel 411 to the pipe 421 with screws as described below.

Four female screw holes 421*h* are opened in four positions of the pipe 421 aligned in the longitudinal direction, and bolts 650 have been temporarily fixed into the female screw holes 421*h* when the assembling kit is prepared (refer to FIG. 42(A)). The bolts 650 are engaged with the through holes 640 of the plate-like sound absorbing panels 411. The through hole 640 consists of a main section 641 and an extension section 642 which has a somewhat larger diameter than the head 650*b* of the bolt 650 (refer to FIG. 43(A)). The main section 641 has a diameter which is smaller than the head 650*b* of the bolt 650 but larger than the shank 650*s* of the bolt 650.

Accordingly, the head 650*b* of the bolt 650 is inserted into the extension section 642 of the through hole 640 (refer to FIG. 42(B) and FIG. 43(B)), and then the shank 650*s* of the bolt 650 is relatively moved to the main section 641 of the through hole 640 by slightly moving downward the plate-like sound absorbing panel 411 (refer to FIG. 42(C) and FIG. 43(C)). Next, the plate-like sound absorbing panel 411 is fastened to the pipe 421 by screwing the bolt 650 (refer to FIG. 42(D)). The working becomes substantially easy by emplying such a procedure.

Embodiment 9

Figure 42:
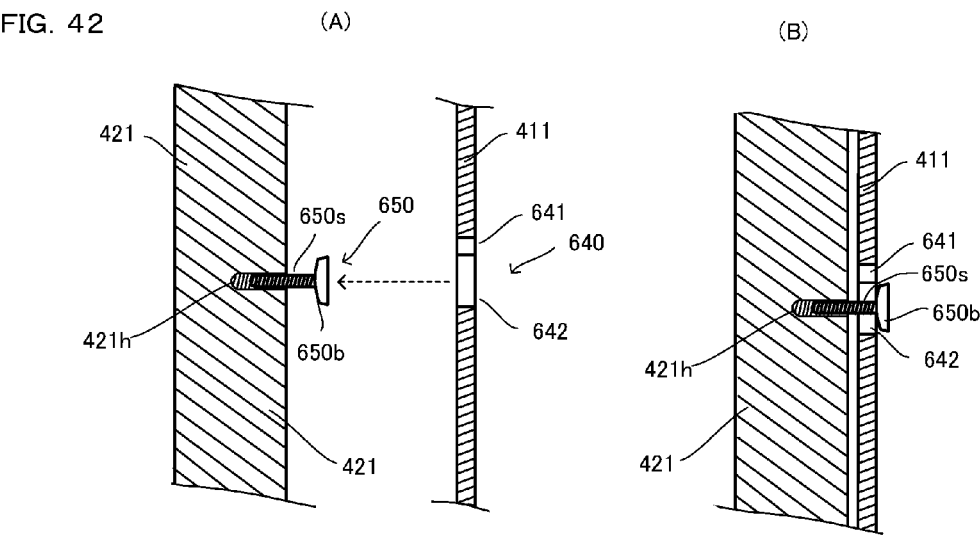
FIG. 42 is a view for explaining the mobile terminal booth assembled in accordance with the embodiment 8 of the present invention, and explaining the process of connecting plate-like sound absorbing panels by the use of bolts temporarily fixed to a pipe as a support rod.
Figure 43:
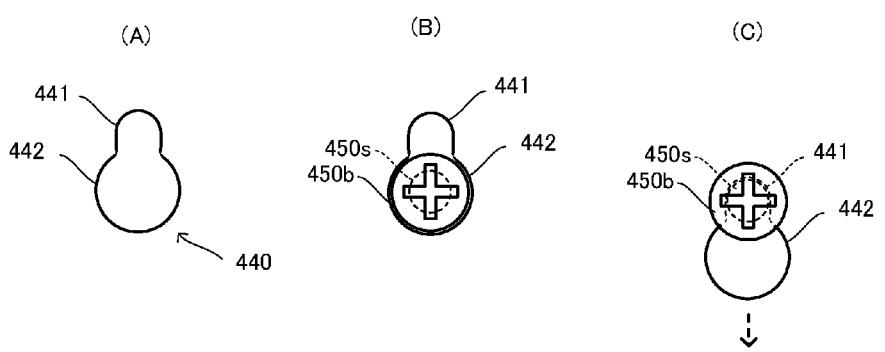
FIG. 43 is a view for explaining the mobile terminal booth assembled in accordance with the embodiment 8 of the present invention, and shows the process shown in FIG. 42 with an enlarged view of the bolt temporarily fixed to the pipe and the periphery of the screw hole of a plate-like sound absorbing panel.

Referring to FIG. 42 and FIG. 43 again, the support structure for the mobile terminal booth 400 can be realized by a simple structure such that the bolt 650 screwed into the pipe (pillar) 421 is engaged with the through hole 640 opened through the inner surface of the plate-like sound absorbing panel 411. The explanation of the above embodiment 8 is applicable also in the case where the pillar side is replaced by a wall. Namely, it is possible to screw the bolts 650 into a wall of a room and engage the through holes 640 of the plate-like sound absorbing panel 411 with the bolts 650.

Figure 44:
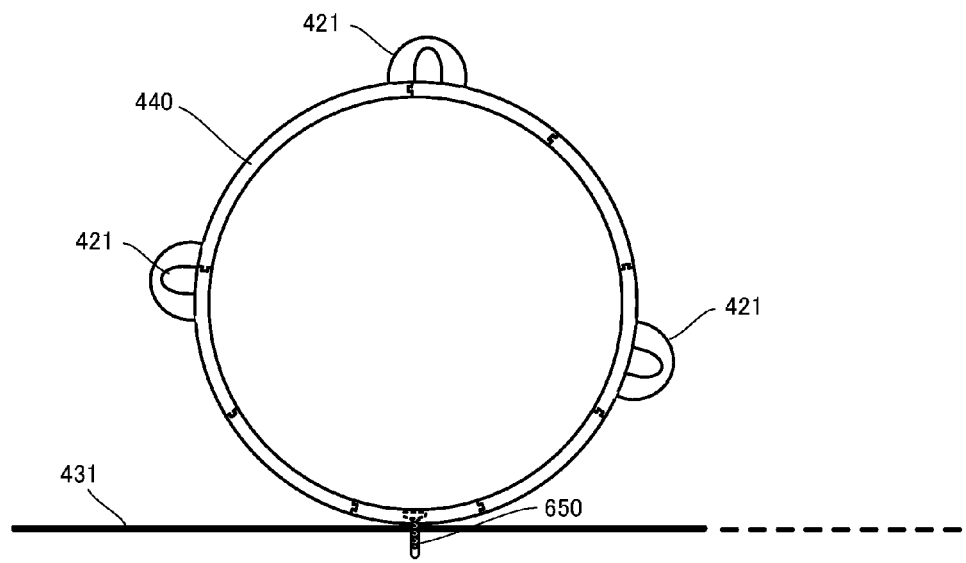
FIG. 44 is a view of a mobile terminal booth fixed to a wall as viewed from the above in accordance with an embodiment 9.

For example, as illustrated in FIG. 44, in place of one of the pipes 421 which is dispensed with, the bolts 650 are screwed into a wall 431, and the plate-like sound absorbing panel 411 is engaged with the bolts 650. The positions where the bolts 650 are screwed are four positions spaced from each other and aligned in the vertical direction as described above. In this case, since the wall 431 does not move, the mobile terminal booth 400 shall not fall down even at the time of earthquake.

Figure 45:
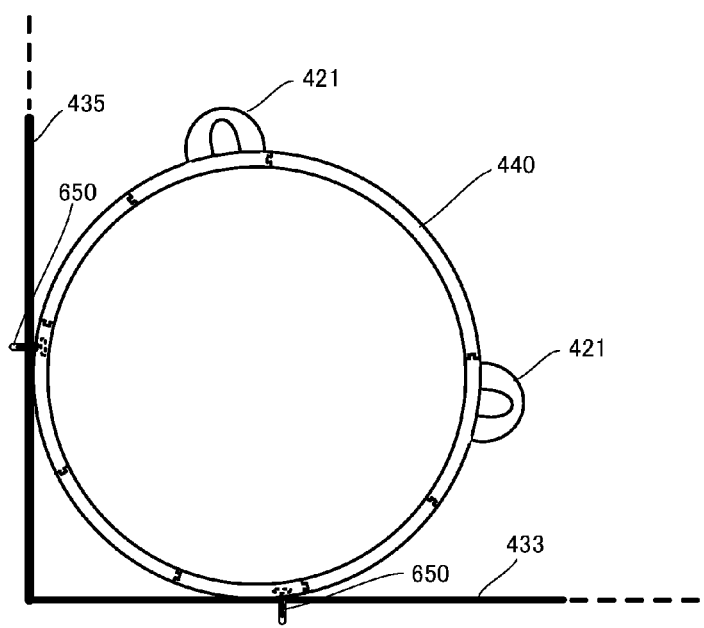
FIG. 45 is a view of a mobile terminal booth fixed to a wall at a corner as viewed from the above in accordance with the embodiment 9.
Figure 46:
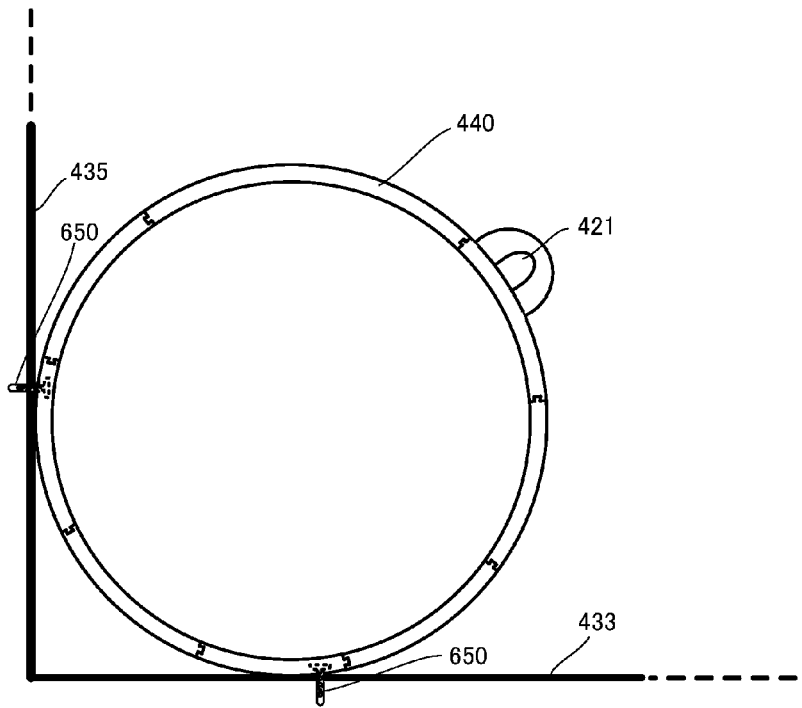
FIG. 46 is a view of another example of a mobile terminal booth fixed to a wall at a corner as viewed from the above in accordance with the embodiment 9.

Furthermore, when the mobile terminal booth 400 is installed at a corner where walls 433 and 435 meet at a right angle as illustrated in FIG. 45, in place of two of the pipes 421 which are dispensed with, the bolts 650 are screwed into the walls 433 and 435, and the plate-like sound absorbing panels 411 are engaged with the bolts 650. In this case, since the mobile terminal booth 400 is fixed to the two walls, the supporting structure becomes substantially stable. When fixed to the two walls in this manner, in practice, the mobile terminal booth 400 can be sufficiently supported only with one pipe 421 as illustrated in FIG. 46.

Figure 50:
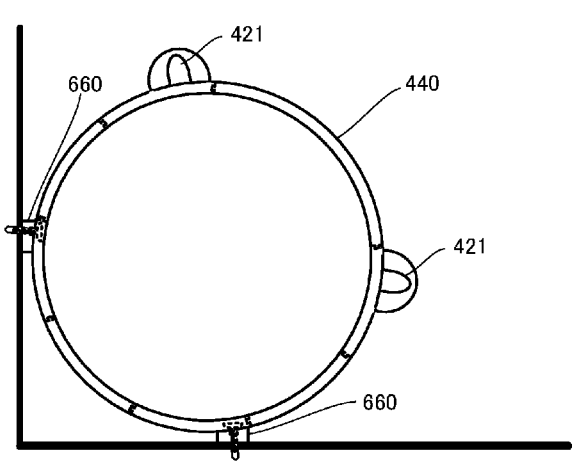
FIG. 50 is a view of the mobile terminal booth in accordance with the embodiment 9 fixed to a wall with the auxiliary member shown in FIG. 49 as viewed from the above.
Figure 49:
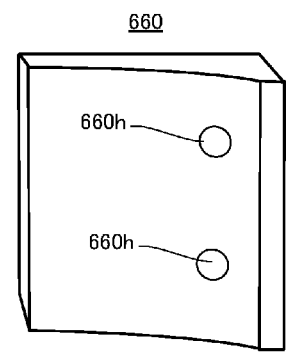
FIG. 49 is a perspective view for showing an auxiliary member which is used to fix the mobile terminal booth to a wall in accordance with the embodiment 9.

In this example, the plate-like sound absorbing panels 411 are directly fixed to the walls with the bolts 650. However, it is possible to more stably fix a plane surface (wall) to a curved surface (plate-like sound absorbing panel) as illustrated in FIG. 50 by having auxiliary members 660 as illustrated in FIG. 49 intervene therebetween. Namely, the auxiliary member 660 is provided with a pair of through holes 660h to intervene therebetween at each of four positions spaced from each other in the vertical direction. In this case, the female screw holes 421h of the wall, the through hole 640s of the plate-like sound absorbing panel 411 and the bolts 650 are also paired in the same manner. The mobile terminal booth 400 is fixed to the two walls at 16 points in total.

Figure 47:
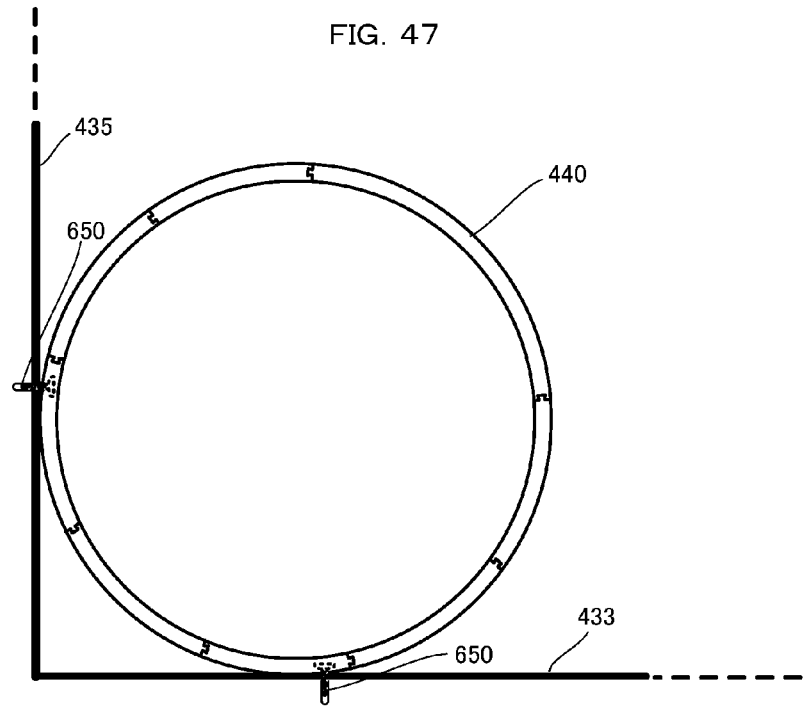
FIG. 47 is a view of an example of a mobile terminal booth fixed to a wall as a wall-mounted type at a corner as viewed from the above in accordance with the embodiment 9.
Figure 48:
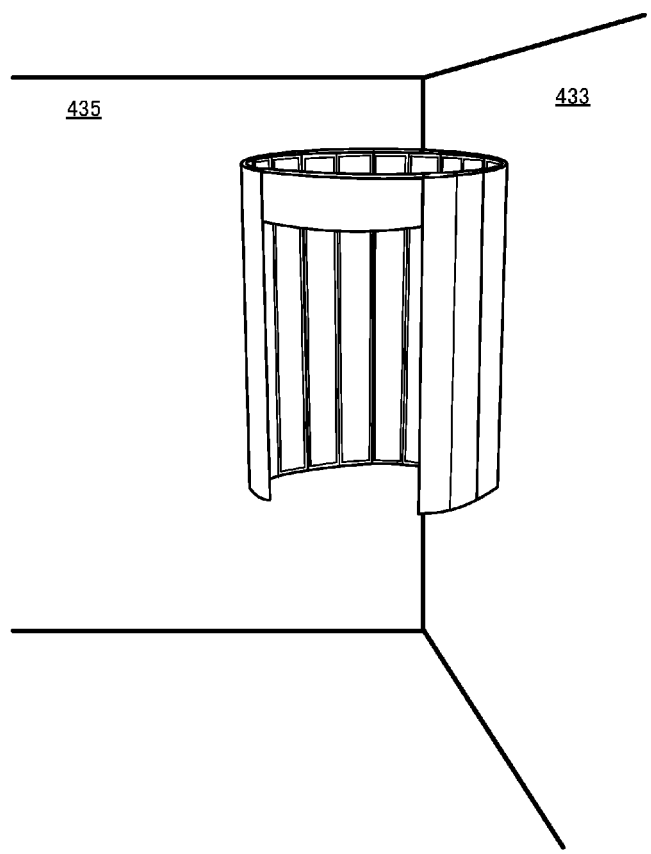
FIG. 48 is a view of the mobile terminal booth fixed to the wall as the wall-mounted type at the corner in accordance with the embodiment 9.

Accordingly, the fixing structure by the use of the bolts 650 becomes thereby more reliable so that the mobile terminal booth 400 can be installed as a wall-mounted type with no pipe as illustrated in FIG. 47 and FIG. 48. Incidentally, any generally available wall-mounting technique can be used other than the method utilizing the bolts 650 and the auxiliary members 660. For example, a wall-mounting device provided for wall mounted TV or the like can be used for this purpose.

Incidentally, in the case of a rectangular mobile terminal booth such as illustrated in FIG. 13 through FIG. 17, FIG. 61 and FIG. 72, the entirety of one side surface comes in contact with a wall so that supporting the mobile terminal booth becomes stable as a wall mounted structure. This is true for general polygonal booths in common.

Embodiment 10

The present applicant actually assembled and used the mobile terminal booth as described above. As a result, it is confirmed that the mobile terminal booth has sufficient functions to achieve the above objects. On the other hand, needless to say, there is a problem that, while one person is making use of a mobile terminal booth, another person cannot use the mobile terminal booth. Also, the mobile terminal booth is not heavy, e.g., 40 kg or the about. Because of this, there is concern that the mobile terminal booth may fall down with an earthquake or the like.

Figure 51:
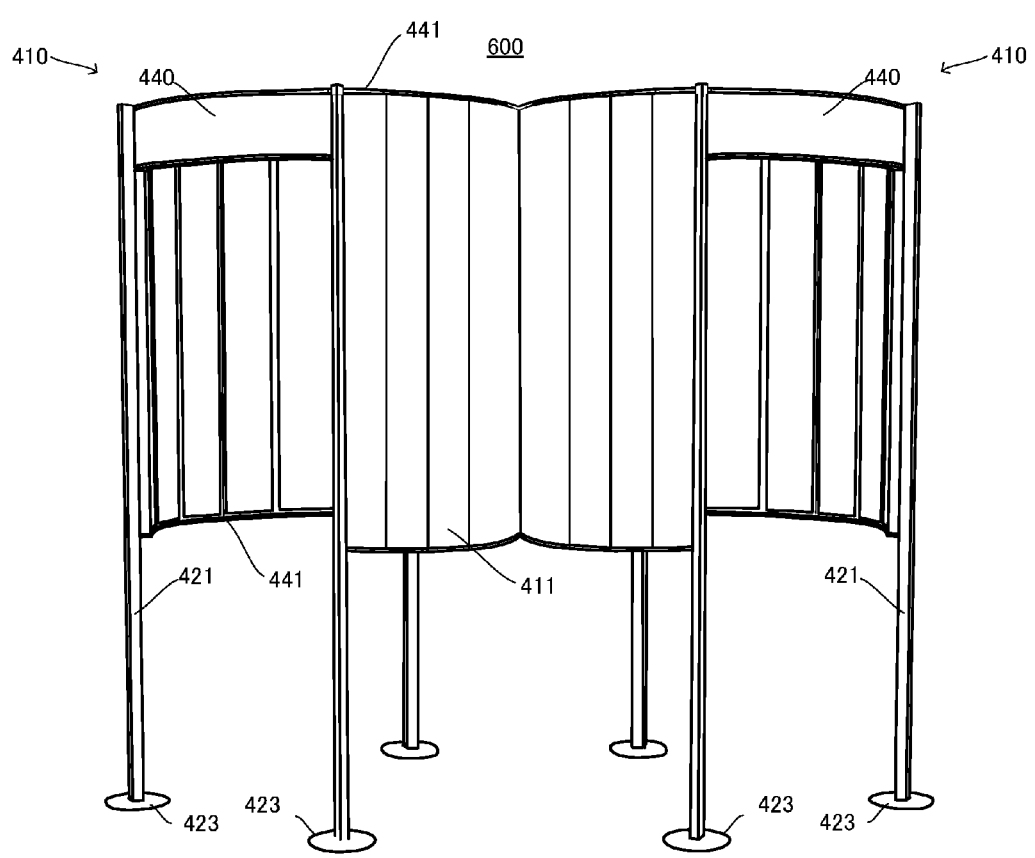
FIG. 51 is a front view for showing a multiple-type mobile terminal booth in accordance with an embodiment 10 of the present invention.

Hence, this embodiment proposes a multiple-type mobile terminal booth which can be used by a plurality of users and is less prone to fall down even at the time of earthquake or the like. Accordingly, the mobile terminal booth shown in FIG. 20 is linked to another mobile terminal booth to form a multiple-type mobile terminal booth. FIG. 51 is a front view for showing a multiple-type mobile terminal booth in accordance with the embodiment of the present invention, and FIG. 52 is a plan view for showing the multiple-type mobile terminal booth in accordance with the embodiment of the present invention.

Figure 52:
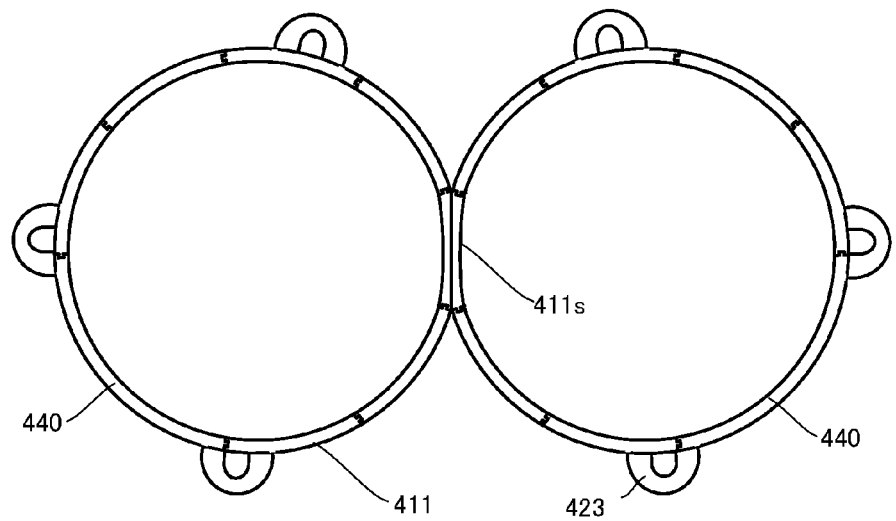
FIG. 52 is a plan view for showing the multiple-type mobile terminal booth shown in FIG. 51.
Figure 53:
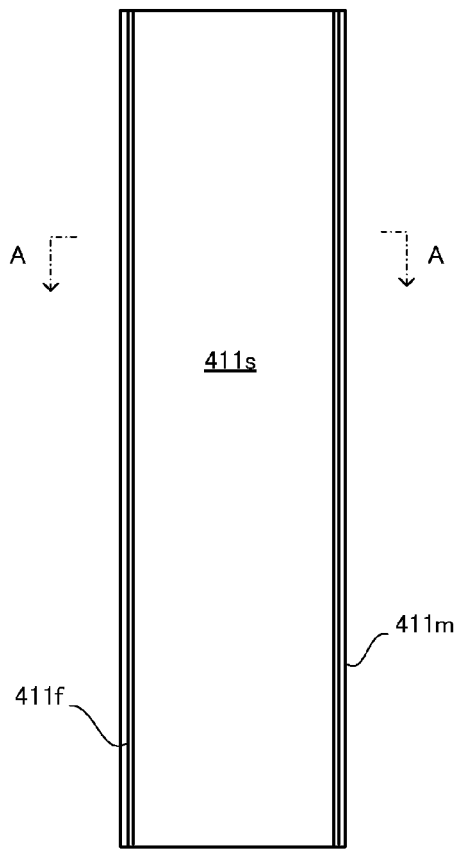
FIG. 53 is a front view showing a linking sound absorbing panel for use in the multiple-type mobile terminal booth shown in FIG. 51.
Figure 54:
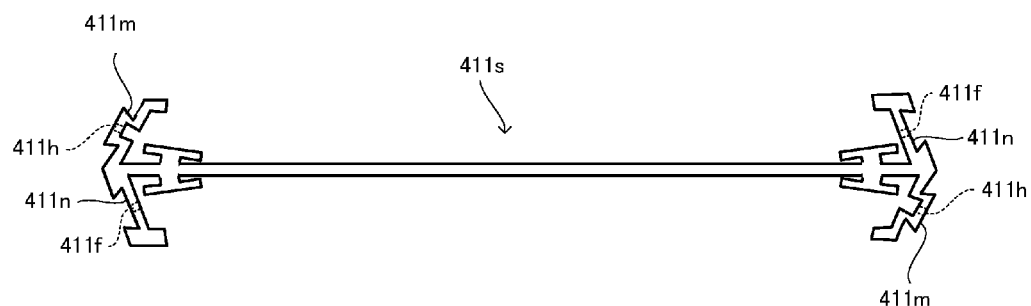
FIG. 54 is a cross-sectional view along A-A line of FIG. 53 showing the linking sound absorbing panel.
Figure 55:
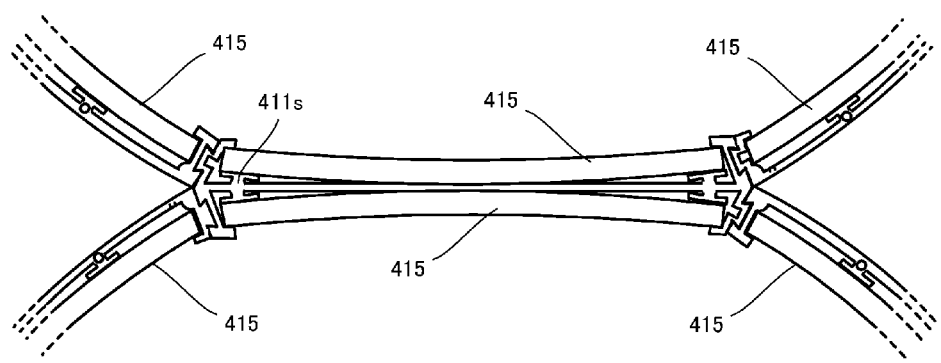
FIG. 55 is an enlarged cross sectional view showing the vicinity of the linking portions between the usual plate-like sound absorbing panels and the linking absorbing panel in the multiple-type mobile terminal booth shown in FIG. 51.

This multiple-type mobile terminal booth 600 consists of two simple mobile terminal booths linked through a linking sound absorbing panel 411s as illustrated in FIG. 52 which is a plan view. FIG. 53 and FIG. 54 are a front view and a cross-sectional view showing this linking sound absorbing panel 411s. FIG. 55 is an enlarged cross sectional view of a main part of the two simple mobile terminal booths which are linked through the linking sound absorbing panel 411s.

As illustrated in FIG. 54, the linking sound absorbing panel 411s is provided with dovetail tenons 411m and dovetail grooves 411n extending in the longitudinal direction in the same manner as those of the plate-like sound absorbing panel 411. However, these dovetail tenons 411m and dovetail grooves 411n are paired at the opposite edges of the panel so that the sound absorbing members 415 can be installed in both sides without discrimination between inner and outer sides.

Accordingly, the linking absorbing panel 411s and the normal plate-like sound absorbing panels 411 are joined and integrated through the dovetail tenons 411m and the dovetail grooves 411n in the same manner as in the method of assembling the simple mobile terminal booth as explained above. The linking absorbing panel 411s and the normal plate-like sound absorbing panels 411 can be fixed by the use of the through holes 411h and the female screw holes 411f.

Figure 56:
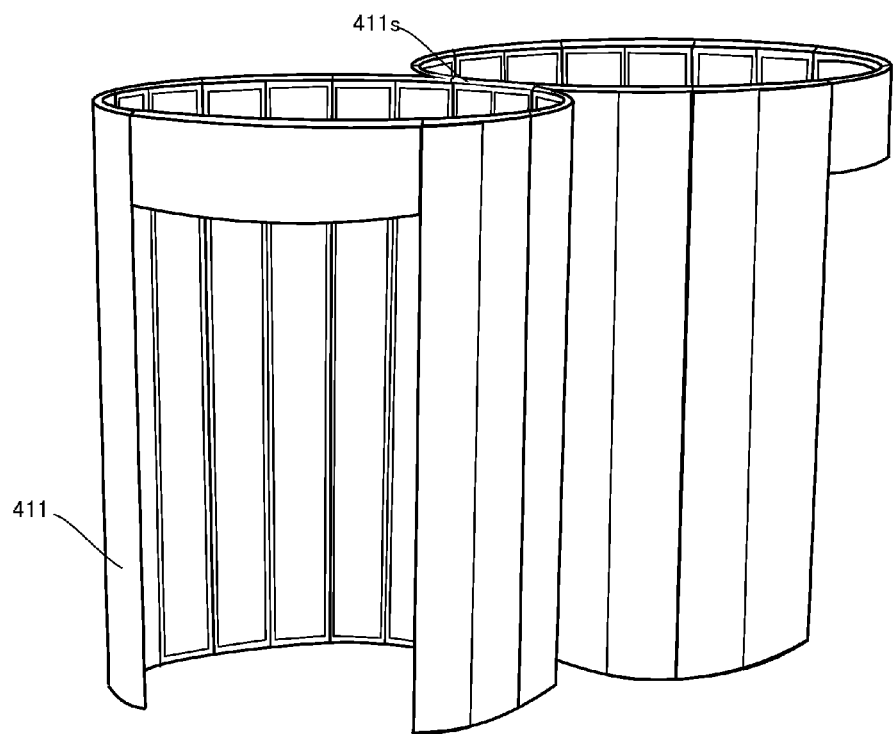
FIG. 56 is a perspective view showing the cylindrical sound absorbing unit bodies of the multiple-type mobile terminal booth shown in FIG. 51.

This multiple-type mobile terminal booth 600 can be assembled in the approximately same manner as the above simple mobile terminal booth. Namely, in the case of the simple mobile terminal booth, the plate-like sound absorbing panels 411 are joined to form the cylindrical sound absorbing unit body as illustrated in FIG. 36. On the other hand, in the case of the multiple-type mobile terminal booth 600, two cylindrical sound absorbing unit bodies are assembled. However, these two cylindrical sound absorbing unit bodies share one sound absorbing panel, i.e., the linking absorbing panel 411s to assemble a cylindrical sound absorbing unit body of the multiple-type mobile terminal booth 600 as illustrated in FIG. 56. Thereafter, the pipes 421 are fixed in the same manner as illustrated in FIG. 37 to fix the plate-like sound absorbing panels with screws in a predetermined height.

Figure 57:
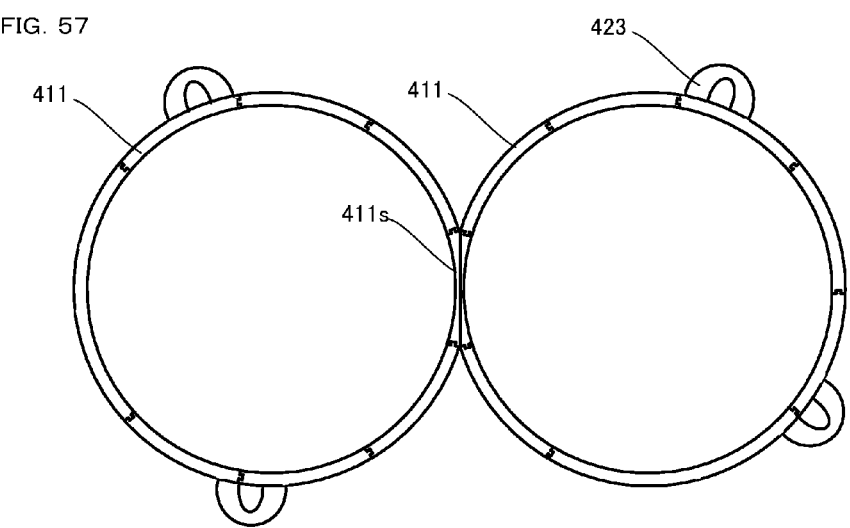
FIG. 57 is a perspective view showing another example of the cylindrical sound absorbing unit bodies of the multiple-type mobile terminal booth shown in FIG. 51.

In the case of a simple mobile terminal booth, four pipes 421 are provided. However, the multiple-type mobile terminal booth 600 are provided with six pipes 421 in total. This is because the linked simple booths are supported by each other. Furthermore, as illustrated in FIG. 57, the number of pipes can be reduced to four in total.

It is possible to reassemble an existing simple mobile terminal booth in the form of a multiple-type mobile terminal booth 600 by the use of an extension kit. Namely, the extension kit is provided for forming a multiple-type mobile terminal booth 600 and includes an additional linking absorbing panel 411s as compared with an assembling kit for a normal simple mobile terminal booth. On the other hand, the extension kit includes only five plate-like sound absorbing panels 411 in place of seven panels included in the assembling kit for a normal simple mobile terminal booth, and only two pipes 421 in place of four panels included in the assembling kit for a normal simple mobile terminal booth.

Figure 58:
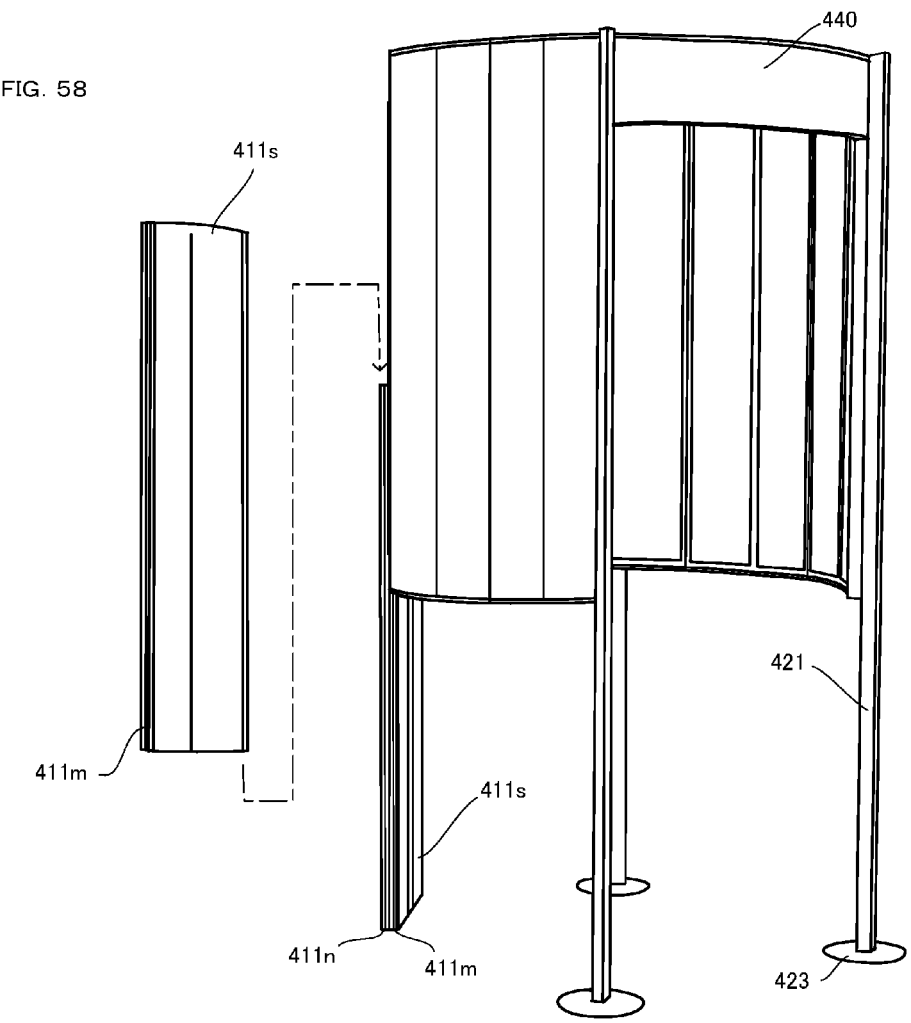
FIG. 58 is a view showing the process of extending a simple mobile terminal booth to the multiple-type mobile terminal booth in accordance with an embodiment of the present invention.

The extension of a mobile terminal booth is performed as follows. First, of the plate-like sound absorbing panels 411 of an existing simple mobile terminal booth, one plate-like sound absorbing panel 411 is exchanged by a linking absorbing panel 411s. In this example, since the pillar 421 to be detached has been attached to the plate-like sound absorbing panel 411 to be exchanged by the linking absorbing panel 411s, the pillar 421 is detached in advance of detaching the plate-like sound absorbing panel 411 which is to be exchanged by the linking absorbing panel 411s. In this case, the linking absorbing panel 411s is lowered to a floor as illustrated in FIG. 58.

One of the pairs of the dovetail tenon 411m and the dovetail groove 411n of this linking absorbing panel 411s is engaged with the existing simple mobile terminal booth in place of the detached plate-like sound absorbing panel 411. The other pair is exposed in the outside of the existing simple mobile terminal booth.

An extension sound absorbing unit corresponding to that shown in FIG. 36 can be assembled by engaging the detached plate-like sound absorbing panel 411 with the lowered linking absorbing panel 411s through the dovetail tenon 411m and the dovetail groove 411n which are exposed of the linking absorbing panel 411s (refer to the left half of FIG. 58), and engaging five plate-like sound absorbing panels 411 included in the extension kit. This extension sound absorbing unit differs from that shown in FIG. 36 in that one of the plate-like sound absorbing panels 411 is replaced by the linking absorbing panel 411s which is partially engaged with the existing simple mobile terminal booth.

Namely, the extension sound absorbing unit corresponding to that shown in FIG. 36 can be assembled by the use of detached plate-like sound absorbing panel 411 and the linking absorbing panel 411s provided with the dovetail tenon 411m and the dovetail groove 411n, which are exposed, and lowered to the floor, together with the five plate-like sound absorbing panels 411 included in the extension kit.

Next, the plate-like sound absorbing panels 11 are slid upwards and connected to the pipes 421 in the same manner as shown in FIG. 37. In doing so, the pipe 421 detached from the existing simple mobile terminal booth is also used. Furthermore, the linking absorbing panel 411s is also slid upwards and fixed with screws as well as the plate-like sound absorbing panels 411. The linking absorbing panel 411s is fixed also to the plate-like sound absorbing panels 411 of the existing simple mobile terminal booth. Also, the sound absorbing members 415 are installed in the panels respectively followed by attaching the edge fixing rims 441 and the ceiling 451 to complete the multiple-type mobile terminal booth 600.

Figure 59:
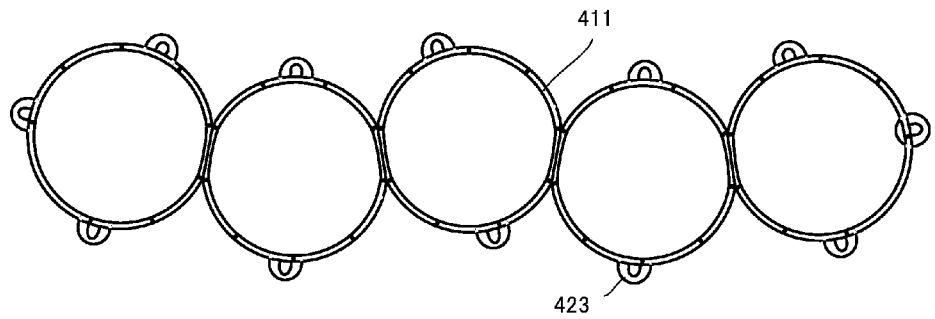
FIG. 59 is a plan view for showing a multiple-type mobile terminal booth in accordance with the embodiment of the present invention in which the number of extended booths is further increased.
Figure 60:
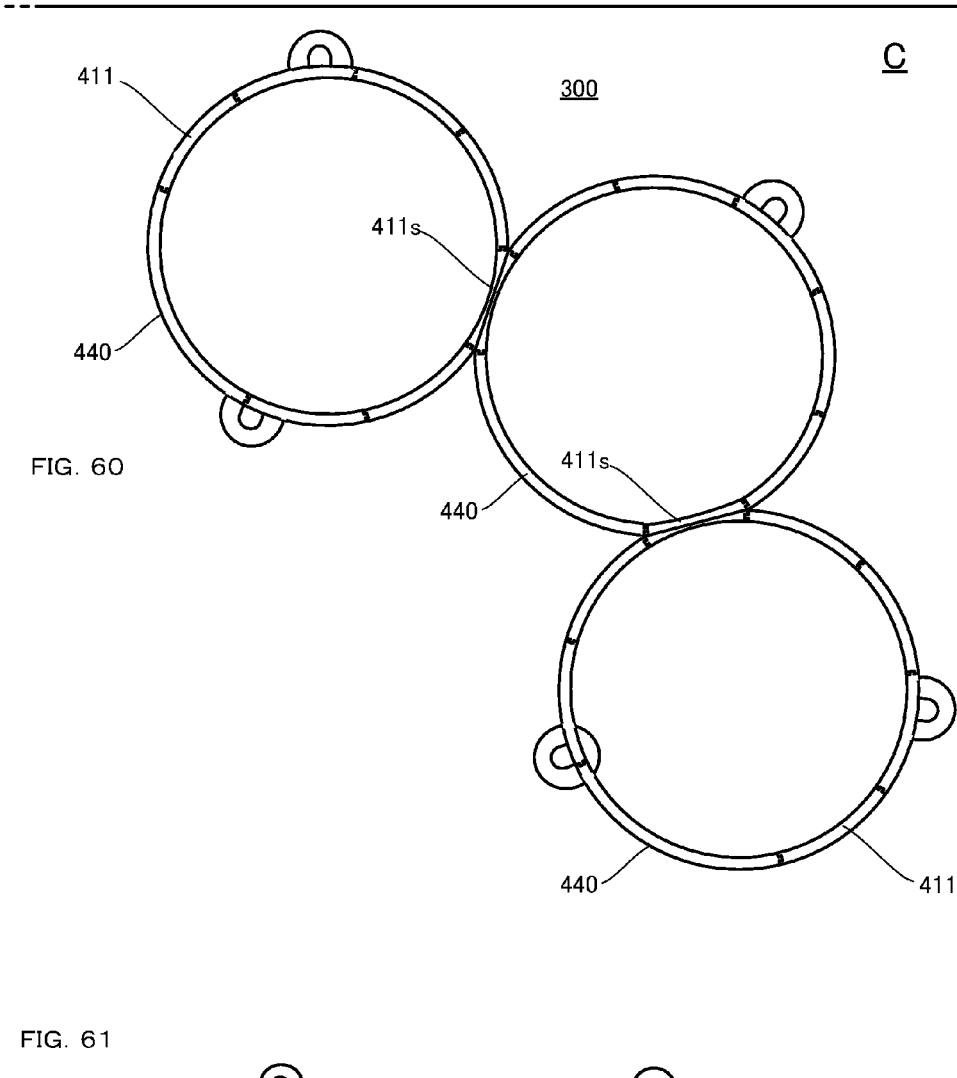
FIG. 60 is a plan view for showing a multiple-type mobile terminal booth in accordance with an embodiment of the present invention which is suitable for installation at a right corner of a room.

The above method can be repeated in order to link further mobile terminal booths. FIG. 59 shows five booths linked on a straight line (actually slightly meandering). Preferably, the pipes 421 are shifted to appropriate positions in accordance with the linking configuration. Also, the position of the front opening of the sound absorbing unit may be selected in accordance with the installation position and arrangement of the booth. For example, in the case of the example shown in FIG. 60, a multiple-type mobile terminal booth 300 is assembled in an appropriate configuration suitable for placing in space C at a right corner of a room by linking three booths at an angle. In this case, the pipes 421 are attached to appropriate positions by taking into consideration the total balance thereof.

Figure 61:
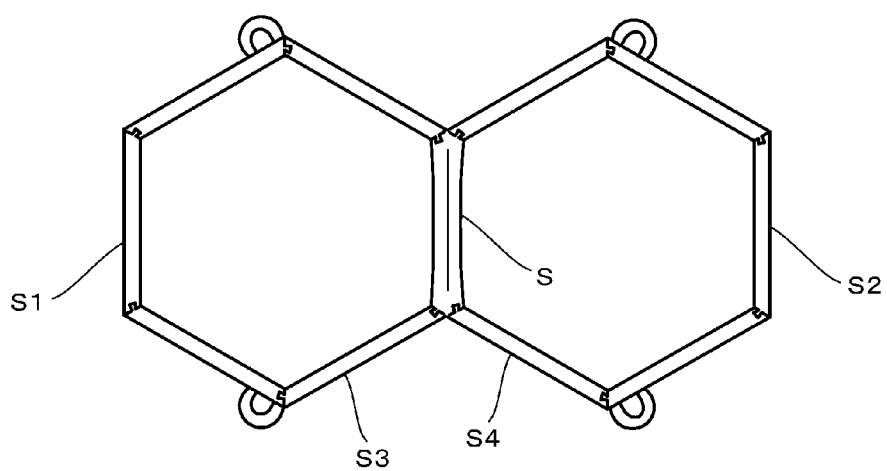
FIG. 61 is a schematic view for showing an exemplary modification of the multiple-type mobile terminal booth in accordance with the embodiment 10 of the present invention.

The sound absorbing unit of this embodiment is of a columnar shape having a circular cross section, i.e., in a cylindrical form. However, it is possible to naturally share one panel in the case of a sound absorbing unit having a polygonal cross section such as a hexagon, an octagon or a rectangle. As a specific example, a multiple-type mobile terminal booth may consist of sound absorbing units having a hexagonal cross section as illustrated in FIG. 61. In this case, the two sound absorbing units share one side S of a hexagon. Also, for example, the front opening may be formed on the sides S1 and S2 or the side S3 and S4 as entrances.

In accordance with the multiple-type mobile terminal booth of this embodiment, even when there are more users, the capacity can be increased by the extension so that the user-friendliness can be enhanced in a variety of places where many people gather.

Embodiment 11

The mobile terminal booths of the above embodiments have entrances which are not perfectly closed but opened in a plan view. This is effective to lessen feeling of suffocation in a narrow space and unpleasant sound resulting from reverberation in the inside thereof. On the other hand, since the entrance is always opened, a user may feel bothersome the sound entering a booth such as low-pitched sound of a drum reverberating in the booth.

Figure 62:
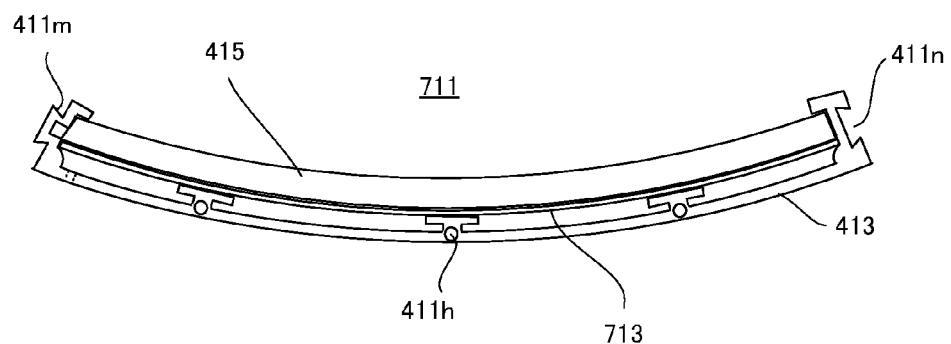
FIG. 62 is a view for showing the structure of a plate-like sound absorbing panel used in a mobile terminal booth according to an embodiment 11.

In this example, the plate-like sound absorbing panel 411 of the mobile terminal booth shown in FIG. 20 is replaced by a plate-like sound absorbing panel 711 as illustrated in FIG. 62. The plate-like sound absorbing panel 711 includes a vibration proof panel 713 made of an FRP (Fiber Reinforced Plastics) between the aluminum panel 413 and the sound absorbing member 415 shown in FIG. 30 as compared with the plate-like sound absorbing panel 411 shown in FIG. 30. By this configuration, low frequency resonance can be suppressed so that, when a loud noise is made outside, there are effects of lessening reverberating sound in the booth.

Figure 63:
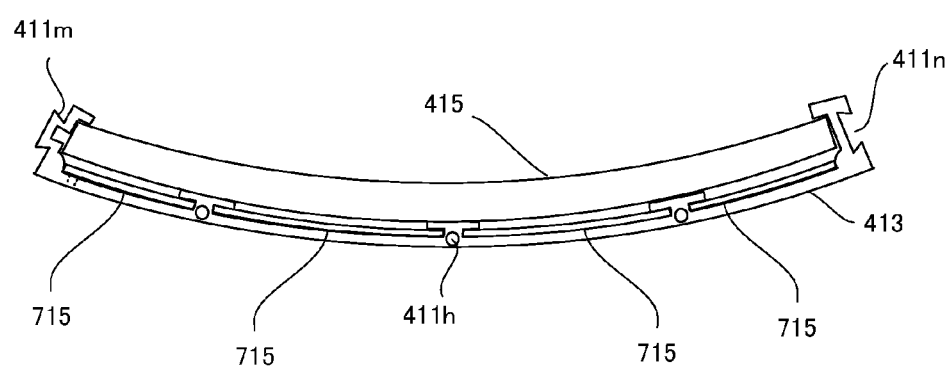
FIG. 63 is a view for showing the structure of another example of the plate-like sound absorbing panel used in the mobile terminal booth according to the embodiment 11.

Also, in this case, it becomes more effective if vibration proof panels 715 are provided in tight contact with the aluminum panel 413 as illustrated in FIG. 63. In this case, there is an air layer between the sound absorbing member 415 and the vibration proof panels 715. This structure has an advantage that its absorbing performance is higher as compared with the case where the entirety integrally comes in contact. Also, the cost can be lowered because of the saved material corresponding to the air layer to contribute weight reduction.

Figure 64:
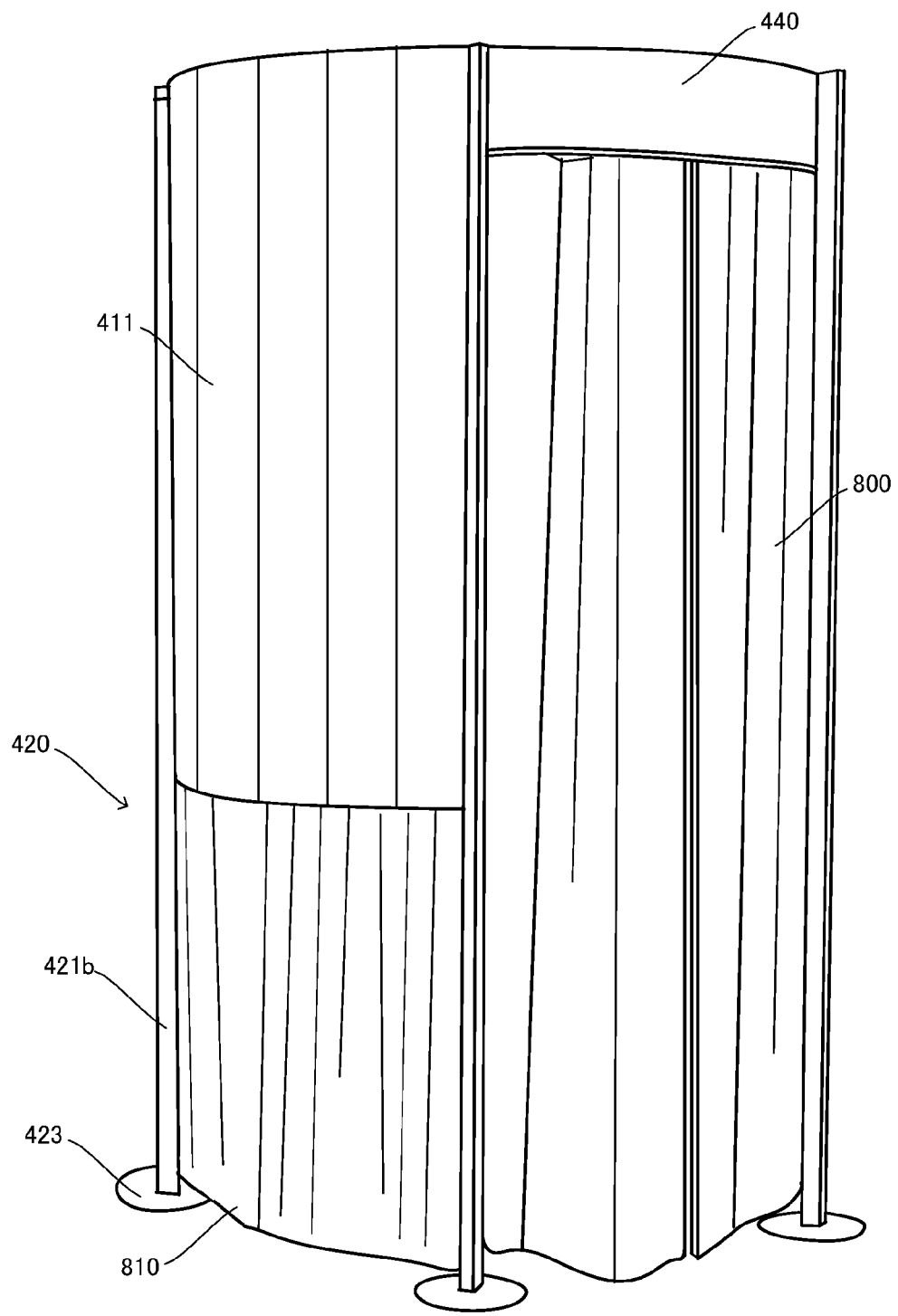
FIG. 64 is a view for showing the mobile terminal booth in accordance with the embodiment 11 of the present invention with a curtain attached thereto.

Furthermore, as illustrated in FIG. 64, double sound insulating curtains 800 provided across an entrance are effective for blocking high frequency noise. The sound insulating curtains are preferably made of a see-through material in order not to have the user feel blocked. For example, the sound insulating curtains may be made of a double-woven lace fabric which is relatively thick, or transparent vinyl sheet which is relatively thick. Also, the sound insulating curtains is preferably extending downward close to a floor, and the noise insulation effects are further enhanced if other sound insulating curtains 810 are provided to cover the other openings. The other structures are the same as those of the mobile terminal booth shown in FIG. 20.

Embodiment 12

In the following explanation, several function extensions will be explained which can be implemented in the mobile terminal booth of the present invention, other than those explained in the above embodiments.

Convenience is enhanced by installing the above mobile terminal booths in a variety of places and utilizing the booths as hub bases of information. In this case, users can be provided with information and services which are appropriate for the installation sites by connecting the Internet through the mobile terminal booths. Namely, in the case where the above mobile terminal booths are connected to the Internet through wired/wireless LANs, a variety of services can be provided in addition to those explained in the above. Several specific examples are as follows.

Flexible organic EL displays are mounted along the curved surfaces of the inside and outside of the sound absorbing units. These displays are controlled by a terminal (PC or android terminal) connected to the Internet, and used as a digital signage system. On the other hand, the mobile terminal booths are installed in station yards, lobbies of buildings, streets or the like. An advertisement server is provided on the Internet to remotely control the digital signage systems of the mobile terminal booths and manage advertisements displayed on the digital signage systems.

Companies and individuals desiring to display advertisements on the digital signage systems make application for advertisement by accessing the advertisement server and designating the places of desired mobile terminal booths, the advertisement image to be displayed, the time period for displaying and so forth. This is enabled by bidding as well known.

Usage of the mobile terminal booth may be provided as a pay service. For example, face authentication is performed with a camera which is installed in the mobile terminal booth to perform face authentication of a visitor who enters the mobile terminal booth. Specifically speaking, while the entrance is always monitored with the camera, when a visitor entering the mobile terminal booth is detected, face authentication is performed by collating the visitor with data registered in a server on the Internet. When the face authentication is successful, the image is no longer stored and transmitted thereafter with consideration given to the privacy of the user. However, leaving the booth is detected to charge in accordance with the use time. In this case, the camera is always monitoring through the entrance so that it can serve as a security camera.

Also, in the case where electric power is necessary for the Internet connection or the like, a solid hydrogen source fuel cell system may be provided to continue operation even when there is a problem in a power transmission system. For example, a buttery may be embedded in the pillars. In the case where the mobile terminal booth is installed outside, a solar battery may be installed in the ceiling.

It is costly to introduce Internet connection in a mobile terminal booth together with a monitor. While such costs may be involved for all the booths, many users have own Internet connection environments, for example, through smartphones. Accordingly, user-specific services can be provided without increasing cost by the use of these connection environments and monitors.

For this purpose, an ultrasonic wave beacon system is installed inside the fascia 430 of this mobile terminal booth. This ultrasonic wave beacon is transmitted at a different frequency from each booth. When a user enters a booth and launches a dedicated application in his smartphone, an inner microphone receives the ultrasonic wave. The position of the user can thereby be determined by reading the code number corresponding to the frequency of the ultrasonic wave.

Even when the smartphone is located within doors where no GPS signal of a satellite is available, the position of the smartphone can be determined in a range of several hundreds meters by a positioning function based on a base station. Accordingly, the above code numbers is required only to distinguish mobile terminal booths from each other in a range of several kilo meters at most.

In order to surely determine that a user is located in a mobile terminal booth, a security token (one-time password generation device) may be embedded in the fascia 430 of this mobile terminal booth. Then, a four digit number is displayed in a position which can be viewed from the inside. When a user enters a booth, the dedicated application is launched as described above. The authentication can be performed by inputting the four digit number displayed on the security token and transmitting the four digit number to a server. Namely, if the correct number is input, it is confirmed that the accessing user is surely located in the mobile terminal booth.

The above mobile terminal booths provide cylindrical inner spaces except those shown in FIG. 13 through FIG. 17, FIG. 61 and FIG. 72. This demonstrates a certain effect in generating stereophonic sounds. Accordingly, it is possible to provide an excellent acoustic environment by installing speakers in the inside thereof. Such speakers are preferably positioned on both sides of the entrance and facing inward.

Furthermore, the cylindrical internal space of the above mobile terminal booth is effective in the visual sense. Namely, the internal cylindrical surface is covered with a white cloth in the form of a screen onto which an image is projected from a projector which is arranged inward and located on the upper position of the entrance. For example, flight simulation can effectively be performed by connecting a personal computer to the projector. Also, a 3D laser scanner is installed on the top of the ceiling of a mobile terminal booth to scan the outside situation which is then displayed on the inside surface through the projector. Furthermore, if a medical operation robot can remotely be controlled in this mobile terminal booth with the inner cylindrical surface as a monitor, it is possible to concentrate the operation in a space whose sound environment is improved, resulting in a higher success rate.

Furthermore, since the above mobile terminal booth is used by a single person in usual cases, the position of the head can be assumed to be substantially fixed. Accordingly, with a silver screen attached to the inner cylindrical surface, it is possible to effectively enjoy 3D images together with stereophonic sound. For example, a plurality of cameras are provided inside the mobile terminal booth to detect the position of eyes of the user, adjust 3D images in accordance with the position of eyes in order to follow the motion of the eyes.

The mobile terminal booth of the present invention may be used to serve also as a guide booth which is installed, for example, in a crowded street, a crowded indoor area or the like to provide people speech guidance. Also, a display with a touch panel may be mounted on the inner front side of the mobile terminal booth (for example, the inner surface of the arch-like connector 440 shown in FIG. 20) to provide speech guidance. Furthermore, if an Internet connectivity function and a stationary videophone system are implemented in the touchscreen, it is possible to have a video teleconference.

In accordance with the mobile terminal booth of the present invention, a space suitable for using mobile terminals can be provided to raise convenience of users of mobile terminals. For example, if the mobile terminal booth is installed in a lobby of a hotel, guests can comfortably use mobile terminals, and manners are improved to make better the atmosphere in the hotel. Furthermore, the outer side of the sound absorbing unit may be used as an advertising space so that certain earnings can be expected. For example, a speaker is installed in the mobile terminal booth for running an audio commercial. This audio commercial may always be running, but halted a predetermined period after detecting a user who enters the mobile terminal booth by a human sensor in order not to hinder conversation. This predetermined period is no longer than thirty seconds, for example, three seconds to twenty seconds, preferably five seconds to ten seconds. When the user exits the mobile terminal booth, the audio commercial resumes. Music may be associated with this commercial.

In accordance with the mobile terminal booth of the present invention, the sound absorbing unit partially confines and provide a private space where a mobile terminal can be used in a comfortable manner. Also, since this space is confined by a sound absorbing unit, users do not feel suffocated in a narrow space with unpleasant reverberating sound and can have telephone conversations with comfort and less stress. Furthermore, the voice does not leak in the backward and lateral directions beyond the sound absorbing unit, and is absorbed in the mobile terminal booth without being reflected in the forward direction. Accordingly, the user need hardly worry about others who may hear conversation, and cause a nuisance to others nearby even if speaking loudly. On the other hand, the person at the other end of conversation can hear the voice clearly without reflection noise.

Figure 65:
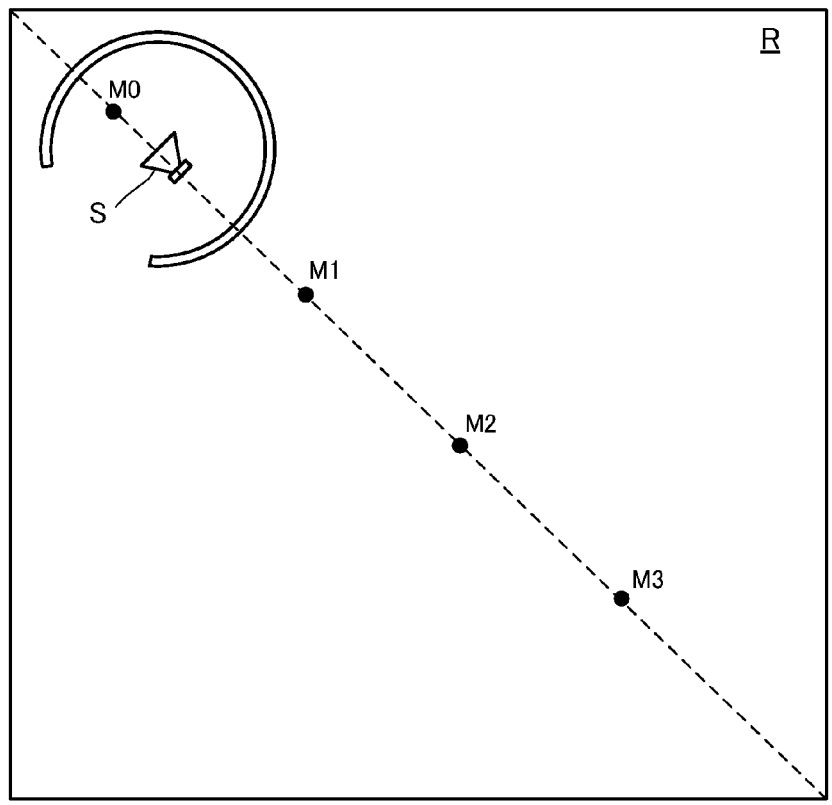
FIG. 65 is a view for explaining an experiment conducted for the purpose of evaluating the advantages of the multiple-type mobile terminal booth shown in FIG. 20.

In order to objectively evaluate the advantages of the above mobile terminal booths, the level of noise was measured inside and outside of the mobile terminal booth in relation to external noise as a reference of 70 dB over the entire bandwidth. As a result, an NC value measured in the inside of the booth was 45, and an NC value measured in the outside was 55. Incidentally, the NC value is an index indicative of wide band noise, and if the NC value is 45, a small meeting can be conducted with a 1.5 m table. On the other hand, if the NC value is 55, no meeting is possible, and telephone conversation is hardly made. Accordingly, this mobile terminal booth is suitable for use in making telephone conversation by easily escaping from noise in an noisy environment such as a noisy office or a street.

furthermore, one of the advantages of the mobile terminal booth is that contents of conversations becomes hard to listen from outside the booth. In order to objectively evaluate this advantage, a speaker S is installed in the mobile terminal booth, and the sound pressure level of sound output from the mobile terminal booth was measured with a microphone which was installed outside. FIG. 65 shows a measurement method. The size of a room R is 4191 mm×3864 mm in which a mobile terminal booth is placed in order not to contact a wall. A speaker S is located in the center of the inside of the mobile terminal booth, and microphones are arranged in the position M0, M1, M2, M3 and M4 to measure sound pressure levels at various frequencies.

In this case, the microphone positions M0 is 300 mm apart from the speaker S inside of the mobile terminal booth, and the microphone position M1, M2 and M3 are 1000 mm, 2000 mm and 3000 mm apart from the speaker S outside the mobile terminal booth. These microphone positions M0, M1, M2 and M3 are aligned in a diagonal line of the room as illustrated in the figure.

FIG. 69 is a graphic diagram showing the sound pressure level data measured at the microphone position M1 in relation to the sound pressure levels measured at the microphone position M0 as a reference of 70 dB over the entire noise bandwidth. The abscissa is the frequency. The dotted line of this diagram indicates the sound pressure levels measured at the microphone position M1 in the condition in which the microphones are arranged in the lateral direction of the entrance of the mobile terminal booth as illustrated in FIG. 65.

Figure 66:
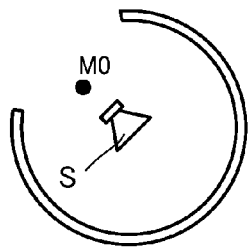
FIG. 66 is a view for explaining the case where the multiple-type mobile terminal booth shown in FIG. 65 is rotated.

Also, in FIG. 69, the data shown with a double dot chain line is data indicating the sound pressure levels which were measured in a situation shown in FIG. 65 where the mobile terminal booth was rotated by 45 degrees to the right as shown in FIG. 66. Namely, the sound pressure levels were measured in a situation where the microphones were positioned aside the back of the mobile terminal booth. However, the direction of the speaker S is reversed to face the back of the mobile terminal booth.

Figure 67:
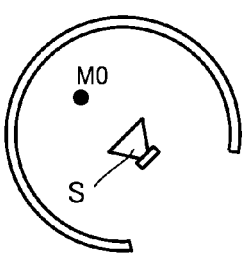
FIG. 67 is a view for explaining another example of the case where the multiple-type mobile terminal booth shown in FIG. 65 is rotated.

Also, in FIG. 69, the data shown with a single dot chain line is data indicating the sound pressure levels which were measured in a situation shown in FIG. 65 where the mobile terminal booth was rotated by 45 degrees to the left as shown in FIG. 67. Namely, the sound pressure levels were measured in a situation where the speaker S was positioned aside the back of the mobile terminal booth with the microphone located to face the entrance.

Figure 68:
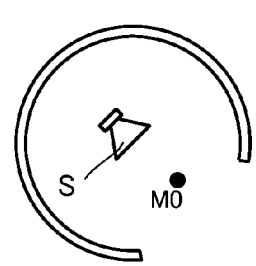
FIG. 68 is a view for explaining a further example of the case where the multiple-type mobile terminal booth shown in FIG. 65 is rotated.

Furthermore, in FIG. 69, the data shown with a thin solid line is data indicating the sound pressure levels which were measured in a situation shown in FIG. 65 where the mobile terminal booth was rotated by 45 degrees to the left as shown in FIG. 68. However, in this case, the direction of the speaker S is reversed to face the entrance of the mobile terminal booth.

Still further, in FIG. 69, the data shown with a thick solid line is data indicating the sound pressure levels which were measured in a situation shown in FIG. 65 where the mobile terminal booth was removed. Namely, this data represents normal sound pressure levels without using the mobile terminal booth so that the advantages of the mobile terminal booth can be understood by comparing this data with the other data.

Incidentally, the microphone position M0 was always determined as a position 300 mm apart from the front surface of the speaker S in correspondence with the orientation of the speaker S and the mobile terminal booth. In other words, the sound pressure levels measured in the microphone position M0 represent base sound pressure levels as the output of the speaker S. In this case, the base sound pressure levels were used as a reference of 70 dB over the entire noise bandwidth.

The data shown in FIG. 70 and FIG. 71 indicates the results of measurement conducted in the method entirely identical to that shown in FIG. 69 except that the position of the microphone was 2000 mm and 3000 mm away from the speaker S. Namely, the data shown in FIG. 70 is the result of measuring in the microphone position M1, and the data shown in FIG. 71 is the result of measuring in the microphone position M2. The other conditions were as described above.

What is understood from the above measurement date is as follows. First, there was little sound blocking effect with the mobile terminal booth at low frequencies up to about 125 Hz. This is considered because, while the room was small, the sound is apt to propagate at low frequencies and considered to cause resonation. However, while there are differences in voice tone between men and women, the frequencies of conversation usually fall within a range of about 250 Hz to 4 kHz so that there is no problems even if no sound blocking effect is expected at the low frequency range.

The sound pressure levels in frequencies higher than about 250 Hz, i.e., in the human voice frequency band exhibited attenuations of several dB or higher as compared with the case where the mobile terminal booth was not used. Particularly, in the case where the mobile terminal booth is placed just laterally as illustrated in FIG. 65, or in the case where the mobile terminal booth is set reversed as illustrated in FIG. 67, attenuations of more than ten dB or significant higher attenuations were exhibited. Furthermore, it is important to which direction the speaker S is oriented, i.e., to which direction a user is facing when using the mobile terminal booth. As understood from the comparison between the data indicated by the thin solid line and the data indicated by the thick solid line, the sound blocking effect can be enhanced by making use of the mobile terminal booth toward the inner wall.

This effect is slightly diminished when the microphone is placed away from the speaker S by 2000 mm and 3000 mm. However, since the sound pressure levels without the mobile terminal booth, i.e., the base reference levels are lowered and difficult to hear as the distance increases, the absolute sound pressure levels are even low irrespective of the distance from the mobile terminal booth.

Since this experiment was conducted in a small space such as a small meeting room, sounds reflected on walls seems to be influenced in the results. Nevertheless, it was confirmed that certain effects can be expected. It is considered that further effects can be expected in a more open environment such as a large room, a lobby or the like.

While the present invention has been particularly shown and described with reference to a preferred embodiment thereof, it will be understood by those skilled in the art that the present invention is not limited to the precise form described in this specification. The apparatus of the present invention can be implemented without departing from the spirit and scope of the present invention as specified in the patent claims. Accordingly, it is to be understood that the description of this application is only illustrative but not presented to limit the invention.

As has been discussed above, the sound absorbing unit of the mobile terminal booth according to the present invention can be designed in the form of a shape having a cross section of a polygon such as a hexagon, an octagon or a rectangle without difficulty, besides the columnar shape having a circular cross section, i.e., in a cylindrical form. For example, while the plate-like sound absorbing panel 111 in the above embodiment has a certain curvature radius corresponding to the circular cross section of the sound absorbing unit, a sound absorbing panel in the case of a hexagonal columnar shape is provided to have a flat configuration corresponding to one side of the hexagon. Also, in this case, the dovetail tenon and the dovetail groove are obliquely arranged to form a hexagonal cross section as a whole after assembling.

In the above embodiment, the sound absorbing unit of the mobile terminal booth is in the form of a columnar shape having a circular cross section, i.e., in a cylindrical form. However, the present invention is not limited to this configuration, but it will easily be understood that the above embodiment is applicable without difficulty to the case where the sound absorbing unit has a cross section of a polygon such as a hexagon, an octagon or a rectangle without difficulty. For example, the plate-like sound absorbing panels 111, 211, 311 and 411 of the above embodiment has a certain curvature radius corresponding to the circular cross section of the sound absorbing unit, a sound absorbing panel in the case of a hexagonal columnar shape is provided to have a flat configuration corresponding to one side of the hexagon. Also, in this case, the dovetail tenon and the dovetail groove of the embodiment 10 are obliquely arranged to form a hexagonal cross section as a whole after assembling.

As a specific example, the sound absorbing unit of the above mobile terminal booth may be designed to have a cross section of a nonagon as illustrated in FIG. 72. In this case, the plate-like sound absorbing panels 811$b$, 811$d$, 811$f$ and 811$g$ have the functionality equivalent to those of the plate-like sound absorbing panels 111$b$, 111$d$, 111$f$ and 111$g$ and the plate-like sound absorbing panels 411$b$, 411$d$, 411$f$ and 411$g$ of the above example. Also, the plate-like sound absorbing panels 811$a$, 811$c$ and 811$e$ have the functionality equivalent to those of the plate-like sound absorbing panels 111$a$, 111$c$ and 111$e$ and the plate-like sound absorbing panels 411$a$, 411$c$ and 411$e$ of the above example. Furthermore, the fascia 840 has the functionality equivalent to those of the fascia 140 of the above example. These are used as flat panels to replace the plate-like sound absorbing panels which are curved for the purpose of form a cylindrical shape when assembled, and therefore can be assembled by the similar assembling method as the above example. Also, similar effects can be expected.

Furthermore, in the above embodiment, the sound absorbing unit is composed of the plate-like sound absorbing panels each of which consists of a laminate of a plurality of sound absorbing layers and integrally bonded by an adhesive. However, while the present invention is not limited to this, the sound absorbing layers may be sewed together, or bonded by another bonding technique such as a ultrasonic welding method, a bonding method utilizing static electricity or the like to integrally bond the sound absorbing layers. Also, depending upon the thicknesses of the sound absorbing layers, the plurality of sound absorbing layers may be simply crimped without performing a particular bonding technique.

In accordance with the mobile terminal booth of the present invention, a space suitable for using mobile terminals can be provided to raise convenience of users of mobile terminals. For example, if the mobile terminal booth is installed in a lobby of a hotel, guests can comfortably use mobile terminals, and manners are improved to make better the atmosphere in the hotel. In addition, if the outside of sound absorption unit is used as an advertisement space, a certain advertisement income can be anticipated.

EXPLANATION OF SYMBOLS 11 narrowing passage
12 sound absorbing member
20 sound absorbing material
100 mobile terminal booth
101 plate-like sound absorbing panel
110 sound absorbing unit
111 plate-like sound absorbing panel
111$a$ to 111$g$ plate-like sound absorbing panel
113 aluminum panel
113$e$ lobe
113$g$ lobe receptor
115 sound absorbing member
115$c$ soft polyvinyl chloride plate
115$a$ sound absorbing sheet
115$b$ vinyl film
115$d$ cloth
115$h$ circular opening
117 panel cap
120 support frame
121 pipe
123 adjuster foot
140 fascia
201 roof member
203 cut-out portion
205 base plate
207 sound absorbing member 209 through hole
211 plate-like sound absorbing panel
300 multiple-type mobile terminal booth
310 sound absorbing unit
311 plate-like sound absorbing panel
317 panel cap
320 support frame
321 pipe
323 arch member
325 disk plate
327 hex nut
329 through hole
330, 340, 350 sound absorbing unit
361L, 361R left and right sides
361B back panel
361T roof member
400 mobile terminal booth
410 sound absorbing unit
411 plate-like sound absorbing panel
411a to 411g plate-like sound absorbing panel
411d plate-like sound absorbing panel
411f female screw hole
411h through hole
411h female screw hole
411m dovetail tenon
411n dovetail groove
411s linking absorbing panel
413 aluminum panel
415 sound absorbing member
420 support frame
421 pipe
421 support rod
421b, 421f pipe
421h support hole
423 adjuster foot
430 fascia
431 wall
432 advertisement plate
433 and 435 wall
434 supporting pole
434r support rods
434s screw
440 arch-like connector
441 edge fixing rim
441a and 441b engagement section
441h through hole
450 mobile terminal booth
451 ceiling
452 arch-like connector
455 roof member
500 mobile terminal booth
510 sound absorbing unit
511 plate-like sound absorbing panel
513 aluminum panel
513g grille
514 slit unit
515 sound absorbing member
516 outer rim
517 strip
600 multiple-type mobile terminal booth
611f female screw hole
611h through hole
640 through hole
641 main section
642 extension section
650 bolt
650b head
650s shank
660 auxiliary member
711 sound absorbing panel
713 vibration proof panel
715 vibration proof panel
800 sound insulating curtain
810 sound insulating curtain
811 to 811g plate-like sound absorbing panel
840 fascia

The invention claimed is:
1. A mobile terminal booth comprising:
a sound absorbing unit which is placed in a public place and partially partitions the public space as viewed from the above to provide an internal space where a user of a mobile terminal can have a telephone conversation; and
a plurality of support posts which support said sound absorbing unit at a predetermined height,
the sound absorbing unit comprising:
a laminate consisting of a plurality of sound absorbing layers; and
an external panel providing an external sound blocking surface and supporting the laminate which provides an internal sound absorbing surface which is made of a sound absorbing material exposed to the internal space so that noisy sound generated in the internal space is absorbed by the internal sound absorbing surface, wherein
there is an air layer intervening between an outer surface of the laminate and an inner surface of the external aluminum panel.
2. The mobile terminal booth of claim 1, wherein said external panel is made of a metal.
3. The mobile terminal booth of claim 1, wherein a soft resin plate is provided on an outer surface of the laminate.
4. The mobile terminal booth of claim 3, wherein the soft resin plate is a soft polyvinyl chloride plate.
5. The mobile terminal booth of claim 1, wherein said sound absorbing layers are joined together in the form of said laminate with an adhesive.
6. The mobile terminal booth of claim 1, wherein said sound absorbing layers are joined together in the form of said laminate by sewing said sound absorbing layers together.
7. The mobile terminal booth of claim 1, wherein said sound absorbing layers are joined together in the form of said laminate by a ultrasonic welding method.
8. The mobile terminal booth of claim 1, wherein said sound absorbing layers are joined together in the form of said laminate by a bonding method utilizing static electricity.
9. The mobile terminal booth of claim 5, wherein said adhesive is a viscous adhesive which does not solidify after formation of said laminate, and maintains its viscosity when the mobile terminal booth is used.
10. The mobile terminal booth of claim 9, wherein said laminate is formed with a resin sheet interposed between each adjacent ones of said sound absorbing layers.
11. The mobile terminal booth of claim 10, wherein said resin sheet is a vinyl film having a thickness of 0.1 mm to 0.5 mm.
12. The mobile terminal booth of claim 11, wherein said resin sheet is provided with a plurality of openings, and wherein said sound absorbing layers are directly adhered with each other by said adhesive through said openings, and indirectly adhered with each other by said adhesive through said resin sheet other than said openings.

13. The mobile terminal booth of claim 12, wherein said sound absorbing unit is provided with an entrance at a corner which is always opened without providing a door.

14. The mobile terminal booth of claim 13, wherein said sound absorbing layers are made from at least one of a needle felt, bestray, softray, glass wool, thermo wool, phenol resin, and polyurethane.

15. The mobile terminal booth of claim 14, further comprising: a plurality of support posts which support said sound absorbing unit at a predetermined height.

16. The mobile terminal booth of claim 15, wherein said sound absorbing unit includes a plurality of sound absorbing panels which are joined to confine said partitioned space.

17. The mobile terminal booth of claim 16, further comprising: a roof member which covers the top of said mobile terminal booth and encloses the inside space of said mobile terminal booth from the above.

18. The mobile terminal booth of claim 16, wherein said sound absorbing unit is in the form of an arc in a plan view.

* * * * *